United States Patent [19]

Suetake et al.

[11] Patent Number: 5,742,842
[45] Date of Patent: Apr. 21, 1998

[54] DATA PROCESSING APPARATUS FOR EXECUTING A VECTOR OPERATION UNDER CONTROL OF A MASTER PROCESSOR

[75] Inventors: Seiji Suetake; Hideyuki Iino; Koichi Hatta; Tatsuya Nagasawa; Koichi Kuroiwa; Hiroyuki Fujiyama; Kenji Shirasawa; Noriko Kadomaru; Shinichi Utsunomiya; Makoto Miyagawa, all of Kawasaki, Japan

[73] Assignee: Fujitsu Limited, Kawasaki, Japan

[21] Appl. No.: 601,704

[22] Filed: Feb. 15, 1996

Related U.S. Application Data

[63] Continuation of Ser. No. 27,234, Jan. 28, 1993, abandoned.

[30] Foreign Application Priority Data

| Jan. 28, 1992 | [JP] | Japan | 4-013107 |
| Jan. 28, 1992 | [JP] | Japan | 4-016927 |
| Jan. 31, 1992 | [JP] | Japan | 4-016928 |
| Dec. 26, 1992 | [JP] | Japan | 4-359457 |

[51] Int. Cl.[6] .................................................. G06F 9/38
[52] U.S. Cl. .................. 395/800; 395/376; 364/730; 364/DIG. 1; 364/232.21; 364/231.8; 364/230.4
[58] Field of Search ............................ 395/800, 375, 395/376; 364/736, 132, 730, 133

[56] References Cited

U.S. PATENT DOCUMENTS

| 4,128,880 | 12/1978 | Cray, Jr. ................... 395/800 |
| 4,541,046 | 9/1985 | Nagashima et al. ......... 395/800 |
| 4,633,389 | 12/1986 | Tanaka et al. .............. 395/800 |
| 4,710,867 | 12/1987 | Watanabe ................... 395/800 |
| 4,760,518 | 7/1988 | Potash et al. ................ 395/287 |
| 4,858,115 | 8/1989 | Rusterholz et al. ......... 395/800 |
| 4,888,679 | 12/1989 | Fossum et al. ............. 395/800 |
| 4,894,768 | 1/1990 | Iwasaki et al. ............. 395/200 |
| 4,942,518 | 7/1990 | Weatherford et al. ...... 395/800 |
| 4,956,800 | 9/1990 | Kametani ................... 364/736 |
| 5,029,123 | 7/1991 | Nishida et al. ............. 364/768 |
| 5,073,970 | 12/1991 | Aoyama et al. ............ 395/800 |
| 5,123,095 | 6/1992 | Papadopoulos et al. .... 395/375 |
| 5,179,702 | 1/1993 | Spix et al. .................. 395/650 |
| 5,187,796 | 2/1993 | Wang et al. ................ 395/800 |
| 5,430,884 | 7/1995 | Beard et al. ................ 395/800 |

OTHER PUBLICATIONS

Randy Allen et al, "Vector Register Allocation", IEEE Transactions on Computers, vol. 41, No. 10, Oct. 92, pp. 1290–1317.

Michael J. Mahon et al, "Hewlet–Packard Precision Architecture: The Processor ", Hewlett–Packard Journal, Aug. 1986, pp. 4–22.

*Primary Examiner*—Mehmet B. Geckil
*Attorney, Agent, or Firm*—Staas & Halsey

[57] ABSTRACT

A slave processor for executing for example a vector operation is connected to a master processor. A vector length for a vector operation set to the slave processor can be changed without intervention of the master processor. When the master processor activates the slave processor, the slave processor outputs a busy signal immediately (at most one cycle later). The master processor reads the value of a busy register representing a busy/ready status of the slave processor in a slave access cycle at highest speed (in two cycles at most). Regardless of whether the master processor and the slave processor was designed as series products or general purpose products, they can be effectively connected.

11 Claims, 49 Drawing Sheets

BUSY# : ACTIVE STATUS INDICATION WRITE DATA SIGNAL
READY : INACTIVE STATUS INDICATION SIGNAL

S1 : WRITE OPERATION SIGNAL
S2 : WRITE ENABLE SIGNAL

| Mode | Status | Access | Response |
|---|---|---|---|
| Co-processor mode | Busy | Read | Except for a read access to the busy register, "CPST: busy" is outputted. The access data is not sent to the data bus. (Case 1) |
| | | Write | Except for a write access to the abort register, "CPST: busy" is outputted. The access data is not received from the data bus. (Case 2) |
| | | Invalid address/ privilege violation | An error response is not outputted. Instead, "CPST: busy" is outputted, taking priority over the error response. (Case 5) |
| | Ready | Invalid address/ privilege violation | "CPST: error" is outputted. An error interrupt does not take place. (Case 6) |
| Slave mode | Busy | Read | The busy register is always accessed. The result is sent to the data bus. In addition, "CPST: ready" is outputted. (Case 3) |
| | | Write | Except for a write access to the abort register, "CPST: error" is outputted. (Case 4) |
| | | Invalid address/ privilege violation | An error interrupt takes place. "CPST: error" is outputted. (Case 7) |
| | Ready | Invalid address/ privilege violation | Ditto (Case 8) |

Fig. 42

DATA PROCESSING APPARATUS FOR EXECUTING A VECTOR OPERATION UNDER CONTROL OF A MASTER PROCESSOR

This application is a continuation of application Ser. No. 08/027,234, filed Jan. 28, 1993, now abandoned.

BACKGROUND OF THE INVENTION

1. Field of the Invention

The present invention relates to a data processing apparatus such as a slave processor or a co-processor which executes a vector operation under the control of a master processor and, in particular, to a data processing apparatus capable of changing a vector length while executing a vector operation sequence without a tradeoff of a decrease of performance of the vector operation.

In addition, the present invention relates to an access method in which a master processor accesses a data processing apparatus such as a slave processor.

Moreover, the present invention relates to a connection method of two types of processors which are a host processor and a slave processor.

2. Description of the Related Art

In recent years, as high functions of data processing systems are being required, a computer system having at least one processor which is connected to a data processing apparatus which is dedicated to executing an arithmetic operation, a drawing process, and so forth is gaining popularity.

BACKGROUND OF THE RELATED ART

As one of such data processing apparatus, a vector processor which has a plurality of vector pipelines arranged in parallel for executing a vector operation is known.

This data processing apparatus can execute a vector operation of vector data with a predetermined vector length (the number of vector elements) at high speed.

When a vector operation is executed, if there are vector elements which are not required for execution, unnecessary vector elements are removed and thereby shortened vector data is created. After the vector operation is completed, vector elements obtained as the result of the operation are restored in relevant positions. Thus, the number of calculations is decreased and thereby the efficiency of the vector operations is improved.

At this point, both the original vector length and the shorter vector length or other vector lengths should be stored. In a conventional data processing apparatus which executes a vector operation, when the vector length is changed, the following procedure is performed. First, in the data processing apparatus, the vector operation is completed. Next, an external processor connected to the data processing apparatus rewrites the content of a vector length register which stores the vector length of the vector operation. The vector length register is provided in the data processing unit. Then, the external processor commands the data processing apparatus to restart the vector operation.

However, in the conventional procedure, the external processor should perform a bus access rights acquisition process for a bus which connects the external processor and the data processing apparatus, rewrite the content of the vector length register in the data processing apparatus, and then execute a restart process for the data processing apparatus.

Thus, while the external processor is changing the vector length of a vector operation of the data processing apparatus, the data processing apparatus cannot execute the vector operation. Therefore, the process performance of the vector operation is significantly decreased.

Second Problem of the Related Art

On the other hand, in a computer system with at least one processor (for example, a master processor) connected to a data processing apparatus (for example, a slave processor), when the master processor sends a start command to the slave processor, the slave processor interprets the start command using a decoder circuit thereof and then sends to the master processor a signal representing that the slave processor is active.

FIG. 1 is a block diagram showing a computer system of a related art reference. In this figure, a first microprocessor (hereinafter referred to as the MPUA) 101, which is a slave processor, and a second microprocessor (hereinafter referred to as the MPUB) 102, which is a master processor, are connected to a data bus 103 and an address bus 104.

The MPUA 101 is controlled by the MPUB 102.

A busy signal BUSY# (hereinafter simply referred to as the BUSY# signal) is sent from the MPUA 101 to the MPUB 102 through the data bus 104, the address bus 103, and a control line, or through the data bus 104.

When the MPUB 102 activates (starts) the MPUA 101, the MPUB 102 writes "ON information" in write data DIN at a predetermined bit thereof (this bit is hereinafter referred to as the start bit). Thus, the MPUA 101 can interpret that the start bit of the write data DIN has "ON information". Thereby, the MPUA 101 sends the BUSY# signal to the MPUB 102 and activates a command processing unit so as to execute a data process.

FIG. 2 is a block diagram showing major portions of the MPUA 101 or the MPUB 102 of FIG. 1. The MPUA 101 or MPUB 102 comprises a data input portion 201, a command start register 202, a command buffer 203, a decoder unit 204, a command output portion 205, an other-process portion 206, a busy output portion 207, and an internal data bus 208.

When the MPUB 102 activates the MPUA 101, it writes the write data DIN with "ON information" at the start bit thereof into the command register 202 of the MPUA 101.

As a result, the command buffer 203 outputs a start command according to the "ON information".

This start command is interpreted by the decoder 204. The interpreted result is sent to the command output portion 205. Thus, the other process portion 206 which executes a vector operation and so forth is activated. In this example, via BUSY output portion 207, the interpreted result is sent to the MPUB 102 as the BUSY# signal representing that the MPUA 101 has received the start command and is active. Next, the decoder unit 204 successively reads from the command buffer 203 commands used for executing a vector operation and decodes them. The decoded result is sent to the other process portion 206 through the command output portion 205. Thus, the other process portion executes the vector operation and so forth.

As a result, after the MPUA 102 interprets the start command and the other process portion 206 is activated, the MPUB 102 can determine whether the MPU 101 is busy (active) or ready (inactive).

More specifically, in the related art reference, after the master processor sends a start command to the slave processor, until the slave processor interprets the command and then sends to the master processor a signal representing that the slave processor is active, a command execution cycle for several clock pulses is required.

For example, as shown in FIG. 3, in an execution cycle T0 determined according to a basic clock CLK, write data DIN sent to the data input portion 201 is sent to the internal data bus 208 in the next execution cycle T1. In an execution cycle T2, the write data DIN is stored in the command buffer 203. In an execution cycle T3, the write data DIN is interpreted by the decoder 204.

As a result, in an execution cycle T4, the BUSY# signal is sent to the MPUB 102. During this period, depending on the program for use, another MPU (not shown in FIG. 1) or the like may access the MPUB 101.

Now, assume that the microprocessor MPUA 101, having a register which stores a vector length for use in executing a vector operation (hereinafter, this register is referred to as the vector length register), executes a vector operation and that the operation executed by the other process portion 206 according to a command based on "ON information" has with respect to multiplication of data, a vector length of 8. In this case, the MPUB 102 writes the write data DIN with "ON information" in the start bit thereof for the MPUA 101 so as to activate it. When the MPUA 101 becomes ready (inactive), the MPUB 102 changes the content of the vector length register of the MPUA 101.

In this case, after the MPUA 101 starts executing a vector operation according to "ON information", it references a vector length value stored in the vector length register of the MPUB 102 so as to determine how many times the MPUA 101 should execute calculations for the vector operation.

However, unless the MPUA 101 has sent the busy signal BUSY# before it has interpreted the "ON information", the MPUB 102 will determine that the MPUA 101 is ready before the MPUA 101 references the content of the vector length register. Thus, the MPUB 102 will change the content of the vector length register. As a result, since the MPUA 101 starts executing the vector operation according to the "ON information" and references the content of the vector length register which has been changed, it will execute calculations for the vector operation an incorrect number of times.

As described above, in the related art reference, in a period in which the MPUA 101 must not be accessed, there is a period in which the MPUA 101 does not output the busy signal BUSY#. In this period, an external processor such as the MPUB 102 may access the MPUA 101. As a result, the reliability of the overall process of the computer system will degrade.

THIRD PROBLEM OF RELATED ART

Next, with reference to FIG. 4, a computer system with the construction where a central processing unit (hereinafter, referred to as the CPU 401) is connected to a slave processor which executes a vector operation or the like through a 64-bit data bus 404 and a 32-bit address bus 405 will be described as a related art reference. The slave processor 402 has an internal bus 403. The CPU 401 writes required information into the internal register 403 of the slave processor 402 and then activates the slave processor 402. After the operation of the slave processor 402 is completed, the CPU 401 reads required information from the internal register 403 and determines the completion of the slave processor 402.

In this register access operation, the address bus 405 and the data bus 404 are used. The address bus 405 is used to designate the number of the internal register 403. The data bus 404 is used to send and receive data. This register access operation is referred to as a slave access operation. The slave access operation can be categorized as a slave write operation and a slave read operation.

FIG. 5 is a timing chart showing a slave read cycle as an example of a slave access operation. In the following description, it is assumed that a signal with (I) is sent from the CPU 401 to the slave processor 402, whereas a signal with (O) is sent from the slave processor 402 to the CPU 401.

In a cycle referred to as the TSS (Timing Slave Start) cycle in synchronization with a basic clock CLK of (a), the slave processor 402 receives address data ADRS(I) (b) sent to the address bus 405, a chip select signal CS#(I) (c) representing that an address has been determined and the slave processor 402 has been selected, a read/write signal R/W#(I) (d) representing a read operation or a write operation, and so forth and determines whether or not the slave processor 402 has been accessed thereby.

Next, when the slave processor 402 has determined the access thereto, at the end of the slave read cycle (referred to as the TSE (Timing Slave End) it sends slave read data DATA(O) (e) to the data bus 404 and outputs a data complete signal DC#(O) (f) representing the completion of the slave read cycle thereof. Hereinafter, the chip select signal CS#(I), the read/write signal R/W#(I), and the data complete signal DC#(O) are referred to as the CS#(I) signal, the R/W#(I) signal, and the DC#(O) signal, respectively.

Now, a slave access cycle consisting of the TSS cycle and the TSE cycle is referred to as the highest speed slave access cycle. For an access cycle which is not completed with two cycles, depending on the type of the internal register 403, a required number of cycles are inserted between the TSS cycle and the TSE cycle.

As described above, in a slave access cycle such as a slave read cycle, the smaller the number of cycles, the shorter the access time. Ideally, the slave access cycle should be as short as possible.

In a variety of events, the CPU 401 accesses the internal register 403 of the slave processor 402. For example, as was described above, the CPU 401 writes required information into the internal register 403 of the slave processor 402 and then activates it. After the operation of the slave processor 402 is completed, the CPU 401 reads required information from the internal register 403 and determines that the operation of the slave processor 402 has completed. However, this access operation is performed before the operation of the slave processor 402 after the end thereof. Thus, in this access operation, the register is frequently accessed. The access time of the register is negligibly smaller than the entire operation time of the slave processor 402. Thus, even if the above access cycle is not the highest speed slave access cycle, the access time does not significantly affect the entire operation of the system.

On the other hand, while the slave processor 402 is active, a particular internal register 403 may be frequently accessed by the CPU 401.

For example, an internal register 403 which represents whether the slave processor 402 is active may be used. Thus, the CPU 401 can determine whether or not the slave processor 402 is active. This register is referred to as a busy register.

Since this register may be frequently accessed by the CPU 401, the access time thereof should be the highest speed slave access cycle so as to reduce the influence of the access time relative to the overall system operation.

FIG. 6 shows the data format of a conventional busy register which can perform a slave read access in the highest speed slave read cycle consisting of a TSS cycle and a TSE cycle. FIG. 7 shows the construction of a conventional slave processor 402.

FIG. 6 shows the data format of a busy register for a data bus with a bus width of 64 bits. This register is a read-only register. Even if the slave processor 402 is active, the CPU 401 can read the content of this register. The register stores "0"s at the high order 63 bits thereof. The least significant bit of the register is a busy bit BSY which stores "1" or "0" which represent a busy state or a ready state, respectively. The busy bit BSY is hereinafter referred to as the BSY bit. The busy bit BSY accords with the busy signal BUSY# of FIG. 1.

FIG. 7 shows the construction of a conventional slave processor 402 which can perform a slave read access for the busy register with the above data format.

In the figure, reference numeral 707 is the other process portion which executes, for example, a vector operation.

Reference numeral 706 is an address decoder which decodes address data ADRS(I) received from the CPU 401 through the address bus 405 in a TSS cycle (see FIG. 5).

Reference numeral 701 is a busy register read access determination circuit which determines the decoded results and states of the CS#(I) and R/W#(I) signals which are sent to the control bus (not shown in the figure). Thus, the busy register read access determination circuit 701 can determine whether or not a read access to the busy register has occurred.

When the determination circuit 701 has not determined an occurrence of a read access to the busy register, it performs the following control operation. First, the determination circuit 701 controls a 64-bit 3-to-1 selector 702 by using a control signal CNT-A so that the selector 702 selects one of store data and normal slave read data which are sent from the other process portion 707. In addition, the determination circuit 701 controls a 64-bit output latch 703 by using a control signal CNT-B so that the latch 703 latches the store data or the normal slave read data received from the 64-bit 3-to-1 selector 702. Moreover, the determination circuit 701 controls a three-state buffer 704 by using a control signal CNT-C so that the buffer 704 stores the store data or the normal slave read data received from the 64-bit output latch 703. Thus, the store data or the normal slave read data is sent to the data bus 404 as output data DATA(O).

The store data is 64-bit data sent from the other process portion 707 to a main memory unit (not shown in FIG. 4) and stored therein when the slave processor 402 is the bus master. On the other hand, the normal slave read data is data which is read from the other process portion 707 by the CPU 401 (see FIG. 4) or the like when the slave processor 402 is the bus slave.

In contrast, when the busy register read access determination circuit 701 has determined an occurrence of a read access to the busy register, in a TSE cycle following a TSS cycle (see FIG. 5), it performs the following control operation. First, the determination circuit 701 controls the 64-bit 3-to-1 selector 702 by using the control signal CNT-A so that the selector 702 selects a busy register value where a busy BSY bit received from a BSY bit generation circuit 705 is stored at the least significant bit of the busy register and "0"s are stored at the high order 63 bits thereof. In addition, the determination circuit 701 controls the 64-bit output latch 703 by using the control signal CNT-B so that the latch 703 latches the busy register value received from the 64-bit 3-to-1 selector 702. Moreover, the determination circuit 701 controls the three-state buffer 704 by using the control signal CNT-C so that the buffer 64 stores the busy register value received from the 64-bit output latch 703. Thus, the busy register value as the output data DATA(O) is sent to the data bus 404. As described above, the busy register is not actually present. Rather, when the 64-bit 3-to-1 selector 702 receives the BSY bit from the BSY bit generation circuit 705, a busy register value is generated.

When the CPU 401 sends a start command to the slave processor 402 and thereby the slave processor 402 becomes active, the BSY bit generation circuit 705 generates the BSY bit with a value of "1". In contrast, when the slave processor is inactive, the BSY bit generation circuit 705 makes the BSY bit have a value of "0". This BSY bit generation circuit 705 is equivalent to the circuit which generates the busy signal BUSY# of the related art reference shown in FIG. 2.

On the other hand, the input data DATA(I) received from the CPU 401 (see FIG. 4), the main memory unit, or the like through the data bus 404 is sent to the other process portion 707 through an input buffer (not shown in the figure).

Thus, when the CPU 401 performs a read access of the busy register of the slave processor 402, in the TSS cycle the busy register start read access determination circuit 701 detects this read access. In the next TSE cycle, the busy register value is sent from the BSY bit generation circuit 705 to the data bus 404 through the 64-bit 3-to-1 selector 702, the 64-bit output latch 703, and the three-state buffer 704.

Because of improvements in semiconductor technologies in recent years, the data bus width has increased to 16 bits. 32 bits. 64 bits. 128 bits, and so forth. In the related art reference of FIG. 7, the bus width is 64 bits. According to the data bus width of 64 bits, each of the 3-to-1 selector 702, the output latch 703, and the three-state buffer 704 has a width of 64 bits.

However, as the bus width of the data bus 404 increases, the busy register read access determination circuit 701 shown in FIG. 7 should increase the number of bits of the control signals CNT-A, CNT-B, and CNT-C to be driven in the 64-bit 3-to-1 selector 702, the 64-bit output latch 703, and the three-state buffer 704. Thus, the wiring length becomes long and thereby the load imposed on each control signal increases. As a result, the signal propagation delay of each control signal increases. Consequently, even if an occurrence of a read access to the busy register can be detected in the TSS cycle, before the basic clock CLK (see FIG. 5) at the beginning of the next TSE cycle becoming high, the state of each control signal cannot be determined. Consequently, the highest speed slave read access of the busy register cannot be assured.

To solve this problem, in the TSS cycle, the CPU 401 should designate the address data ADRS(I) and so forth to be sent to the slave processor 402 as soon as possible.

However, such countermeasures result in a prolonged setup which is one characteristic of AC (Alternate Current) signals. Thus, the timing at which the CPU 401 designates the address data ADRS(I) and so forth to be sent to the slave processor 402 becomes complicated.

In addition, to decrease the signal propagation delay, expensive parts need to be used thereby raising the cost of the product.

Moreover, the prolongation of the signal propagation delay results in an increase of critical path for the slave processor 402. To reduce the critical path, it is possible to latch the control signal CNT-A, the control signal CNT-B, and the control signal CNT-C in the busy register read access determination circuit 701. Thus, between the TSS cycle and the TSE cycle, one clock cycle is inserted. More specifically, the highest speed slave read cycle to the busy register cannot be accomplished. The more frequently the CPU 401 accesses the busy register of the slave register 402, the more the performance of the entire system degrades.

This problem is not limited to an access of the busy register. Rather, the same problem takes place for all registers which may be frequently accessed from the outside.

FOURTH PROBLEM

Last, as with the above-mentioned computer system having the construction where a data processing apparatus is connected to at least one microprocessor, when the microprocessor and the data processing apparatus have been designed with the same design concept, they can be directly connected. However, since a conventional general purpose microprocessor has a different design concept from a data processing apparatus, they cannot be connected without a large number of adapter circuits.

SUMMARY OF THE INVENTION

The present invention is made relative to the above-mentioned view points. An object of the present invention relates to a computer system with the construction where a data processing apparatus is connected to at least one processor so as to connect signals with high reliability, efficiency, and applicability between the data processing apparatus and the processor.

The first aspect of the present invention is a data processing apparatus for executing a vector operation or a scalar operation, including a scalar data storage portion for storing scalar data used for the scalar operation; a vector length storage portion for storing vector length data, the vector length data representing the number of vector data elements used for the vector operation; a command storage portion for storing at least one command and if necessary operand data used for the command, the command including a command for causing the vector operation or the scalar operation to be executed; and a process execution portion for successively executing the commands stored in the command storage portion, the process execution portion being adapted to execute a data move command before or during the execution of commands used for the vector operation and the scalar operation so as to move data between any two of the command storage portion, the vector length storage portion, and the scalar storage portion.

Thus, while a vector operation is being executed, without an intervention of the external unit, the vector length data obtained in the scalar operation can be moved to the vector length storage portion.

In addition, when a vector operation is started, the vector length data loaded and stored as operand data in the command storage portion can be moved to the vector length storage portion.

Moreover, while a vector operation is being executed, scalar data loaded and stored as operand data in the command storage portion can be moved to the scalar data storage portion. Therefore, scalar data exceeding the storage capacity of the scalar data storage portion can be stored in the command storage portion.

As a result, a data processing apparatus where the vector length or scalar data can be updated, can be provided without a tradeoff in the performance of a vector operation.

The second aspect of the present invention is a data processing apparatus connected to an external apparatus for processing data. The data processing apparatus is started according to start information sent from the external unit. Further, the data processing apparatus includes a data write detection portion for generating a write operation signal when the external unit writes data to the data processing apparatus, and an operation control portion for sending a busy signal to the external unit. The busy signal represents a busy status in which the data processing apparatus prohibits the external unit from accessing the data processing apparatus regardless of whether or not the start information is set in the data written from the external unit for the data processing apparatus when the data processing apparatus is in a ready status in which the external unit can access the data processing apparatus and the data write detection portion outputs the write operation signal. The data processing apparatus further includes a start information detection portion for determining whether or not the start information has been set in the data written from the external unit to the data processing apparatus, wherein the operation control portion is adapted to stop the output of the busy signal and send to the external unit a ready signal representing that the data processing apparatus is in a ready status when the start information detection portion has not detected the start information after the busy signal was outputted.

Thus, when the external unit accesses the data processing apparatus, the data processing apparatus can immediately activate the busy signal regardless of whether or not the start information has been set in the write data. Therefore, malfunctions which occur when the content of a register of the data processing apparatus is changed while the apparatus is warming up are significantly prevented.

After the busy signal was outputted, if the start signal was not detected, the operation control portion changes the busy signal to the ready signal. Thus, even if start information has not been set in the write data due to a mistake, a situation where the busy signal is continuously outputted is prevented. As a result, control of the busy signal can be precisely performed.

The third aspect of the present invention is a data processing apparatus for exchanging data with an external unit so as to process data. The apparatus includes an access object signal storage portion for storing an access object signal exchanged according to a predetermined access request when the predetermined access request is received from the external unit, and a connection portion for connecting the access object signal storage portion to a predetermined bit line group with the same bits as the number of bits of the access object signal of bit lines connected to a data bus connected to the external unit when the predetermined access request is received.

Thus, it is not necessary to reconnect all bits of the data bus, for example 64 bits, for an access object signal. Therefore, the number of driven bits of control signals for the access object signal storage portion according to the access request signal is small and thereby the wiring length thereof is short. Thus, the signal propagation delay of the control signals can be decreased.

As a result, the timing design of the entire system including the data processing apparatus can be easily performed. Thereby, expensive parts can be omitted and the cost of the entire system can be reduced.

Particularly, in a slave read access of the busy register of the slave processor, a slave read cycle at the highest speed can be assured.

In the construction including the data buffer portion, when a retry request for a read operation is inputted after a particular access request has been inputted and an access operation for the access object signal has been executed, data stored in the data buffer portion can be immediately sent to the data bus. The buffer which stores data to be retried can be omitted.

The fourth aspect of the present invention is a data processing apparatus connected to an external unit for exchanging data with the external unit so as to process data, the apparatus having a first connection mode and a second connection mode, the first connection mode being adapted to connect the data processing apparatus to a microprocessor which was designed with the same design concept as the data processing apparatus, the second connection mode being adapted to connect the data processing apparatus to a general purpose microprocessor.

Thus, since the data processing apparatus can be directly connected to a microprocessor which was designed with the same design concept, the maximum performance can be obtained. On the other hand, when the data processing apparatus is connected to a general purpose microprocessor, satisfactory performance can be obtained with a small number of adapter circuits.

These and other objects, features and advantages of the present invention will become more apparent in light of the following detailed description of a best mode embodiment thereof, as illustrated in the accompanying drawings.

BRIEF DESCRIPTION OF DRAWINGS

One skilled in the art can easily understand additional features and objects of this invention from the description of the preferred embodiments and some of the attached drawings. In the drawings:

FIG. 42 is a schematic diagram showing the construction of the MPU according to the fifth preferred embodiment;

DESCRIPTION OF PREFERRED EMBODIMENTS

Next, the five preferred embodiments of the present invention will be described in succession.

Basic Construction of Apparatus for the Preferred Embodiments

Figure 8:
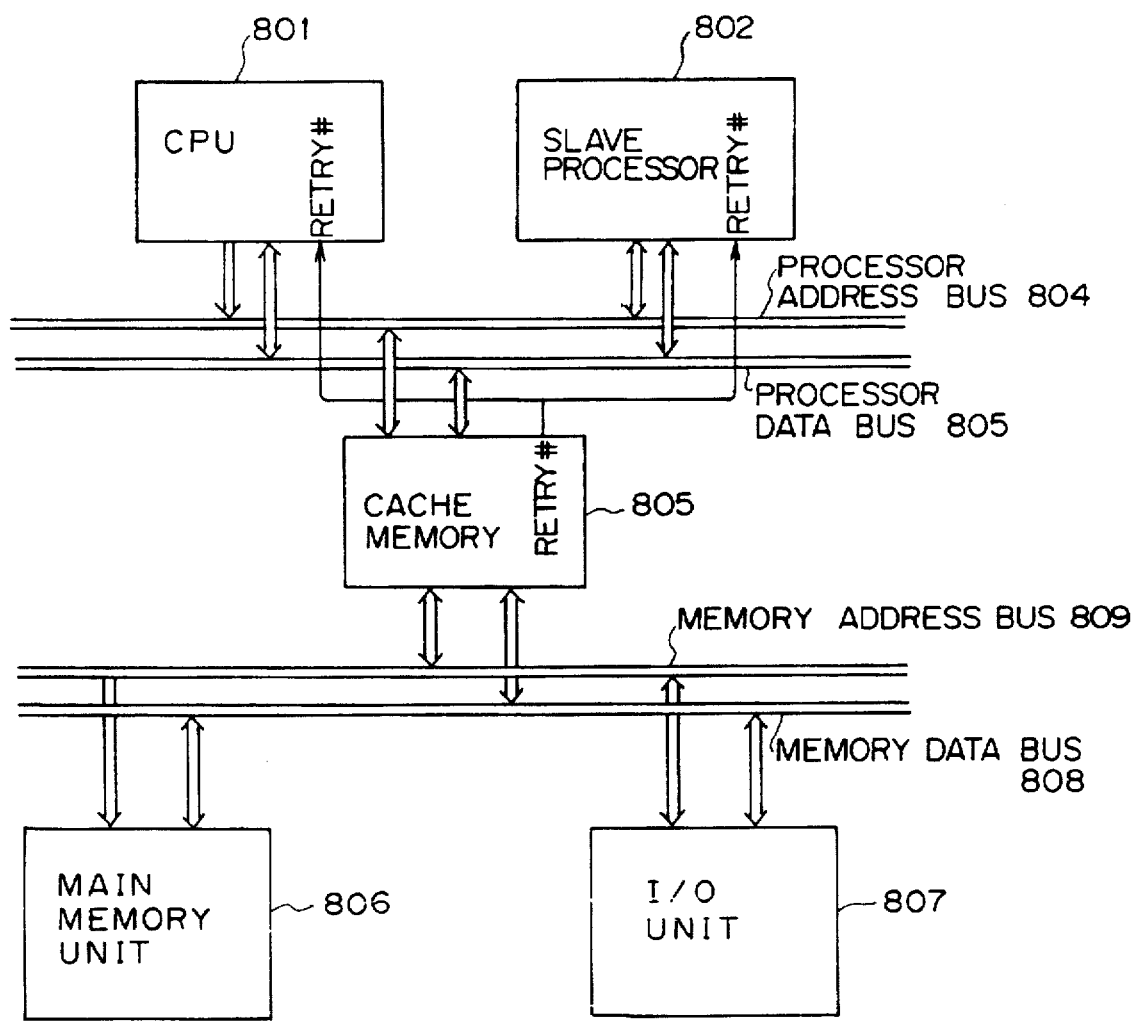
FIG. 8 is a schematic diagram showing the basic construction of first to fifth preferred embodiments according to the present invention.

FIG. 8 shows the basic construction of the data processing apparatus for the preferred embodiments which will be described next.

In the figure, reference numeral 801 is a central processing unit (hereinafter referred to as the CPU 801). The CPU 801 is connected to a slave processor 802 through a 64-bit processor data bus 803 and a 32-bit processor address bus 804. In addition, the CPU 801 is connected to a main memory unit 806 and an I/O unit 807 through the buses 803 and 804, a cache memory 805, a 64-bit memory data bus 808, and a 32-bit memory address bus 809.

The CPU 801 accesses a program or data stored in the main memory unit 806 through the cache memory 805 or the I/O unit 807 through the cache memory 805 so as to execute a control process at high speed.

High level operations such as a vector operation are executed by the slave processor 802 instead of the CPU 801. The slave processor 802 is accessed from the CPU 801 through the processor data bus 803 and the processor address bus 804. The slave processor 802 obtains bus access rights for the processor data bus 803 and the processor address bus 804 from the CPU 801 and temporarily monopolizes these buses. Thus, while the slave processor 802 is accessing the main memory unit 806 through the cache memory 805, it executes a vector operation by using a pipeline process.

First Preferred Embodiment

Next, the first preferred embodiment according to the basic construction shown in FIG. 8 will be described.

In this embodiment, the slave processor 802 shown in FIG. 8 is a vector processor which executes a vector operation. In this preferred embodiment, a construction with which the first problem of the above-mentioned related art can be solved, is disclosed.

Figure 1:
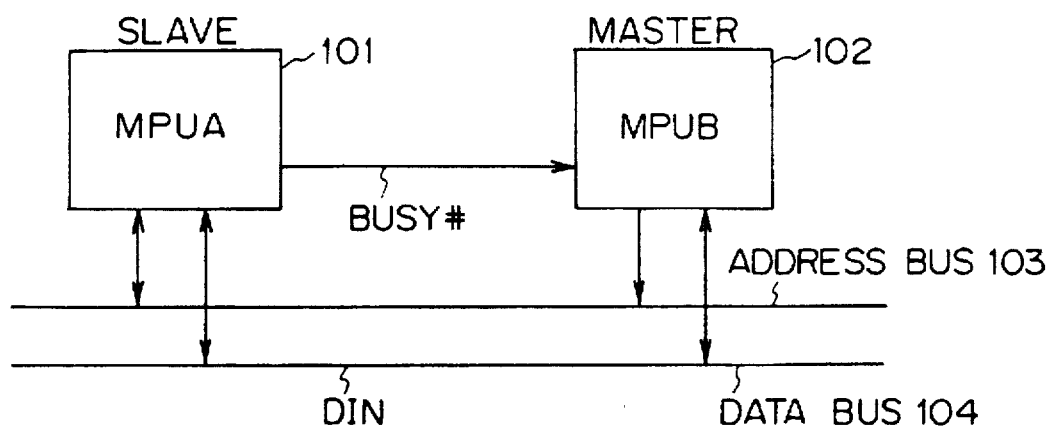
FIG. 1 is a schematic diagram for explaining a data processing apparatus with respect to a second problem of a related art reference.
Figure 2:
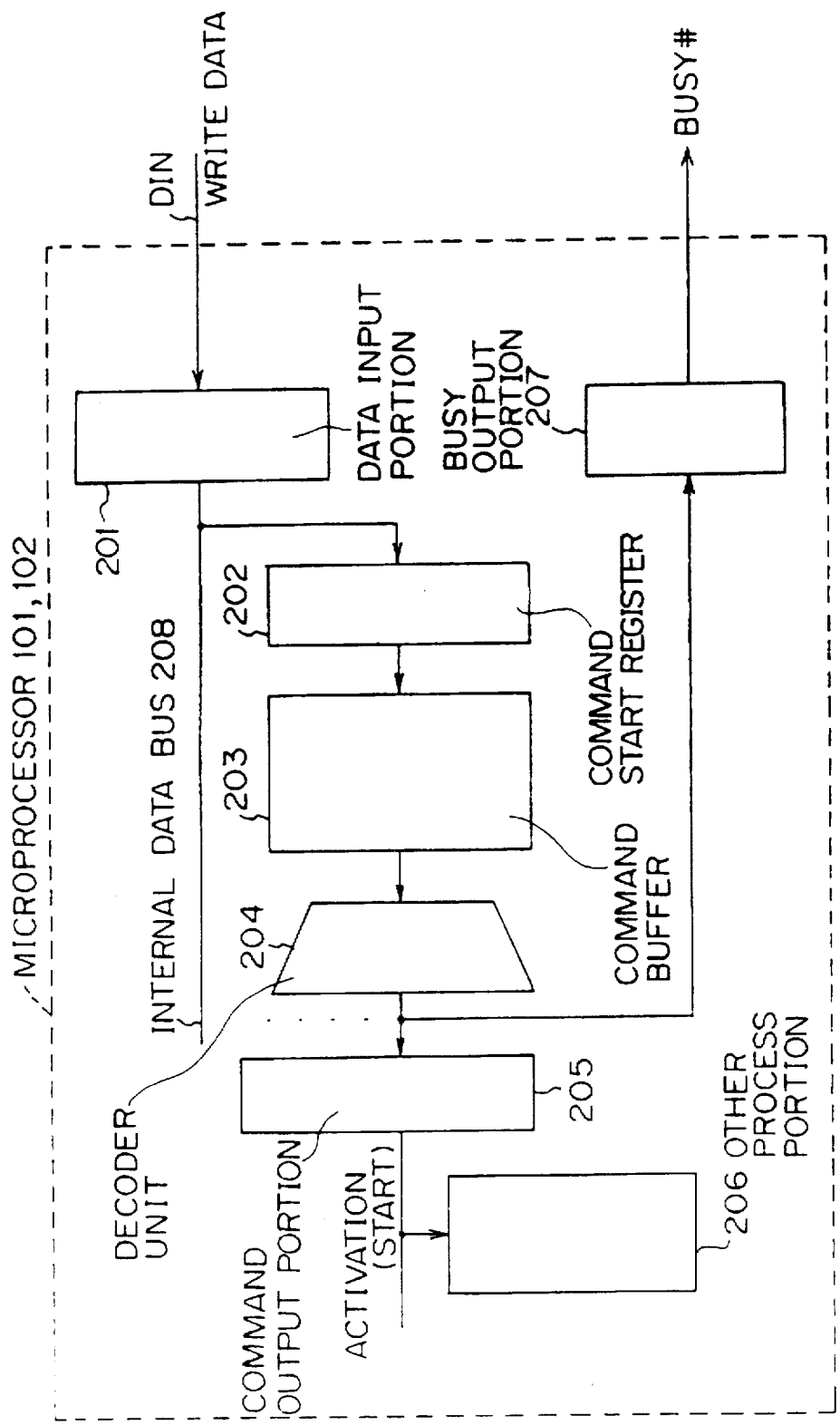
FIG. 2 is a block diagram showing the construction of the microprocessor 101 of FIG. 1.
Figure 3:
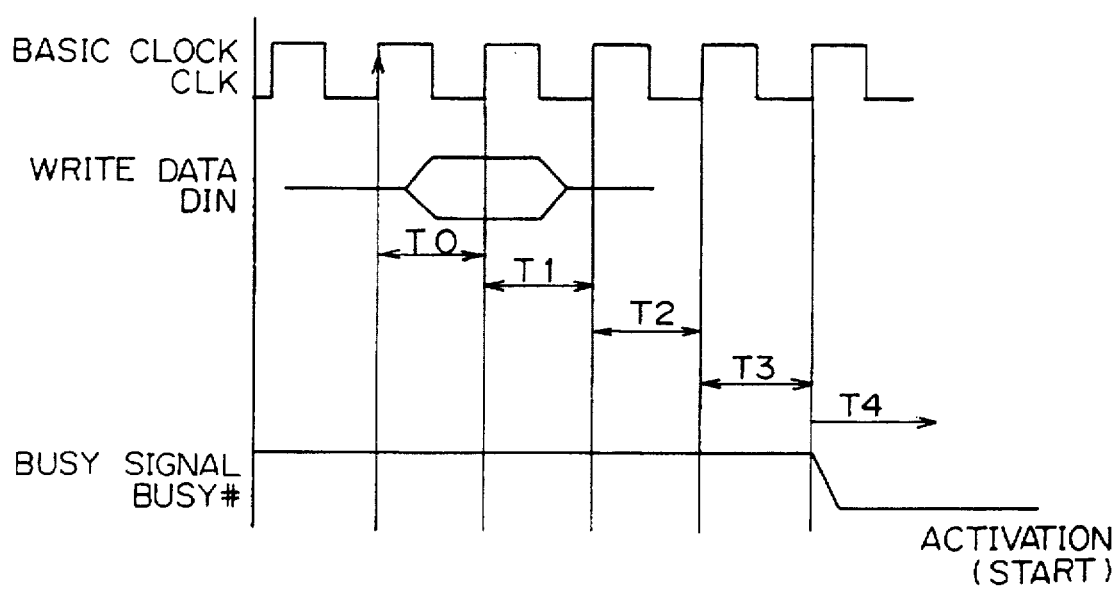
FIG. 3 is an operational timing chart for a data processing apparatus with respect to the second problem of a related art reference.
Figure 9:
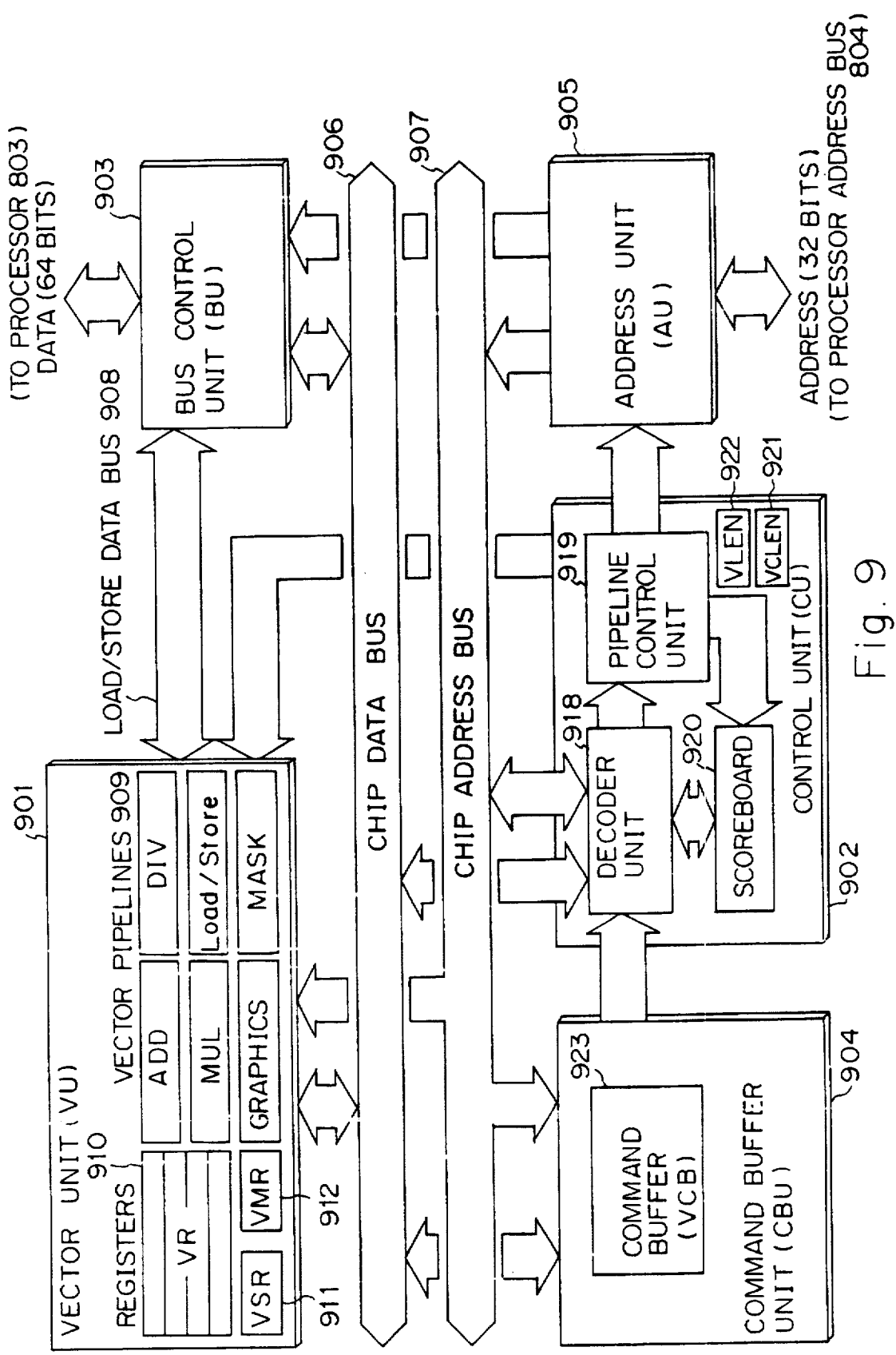
FIG. 9 is a schematic diagram showing the construction of a slave processor according to the first preferred embodiment.

FIG. 9 is a block diagram of the slave processor 802 of FIG. 2 according to the first embodiment.

The slave processor includes five units which are a vector unit (VU) 901, a control unit (CU) 902, a bus control unit (BU) 903, a command buffer unit (CBU) 904, and an address unit (AU) 905, each of which is connected to a chip data bus 906 and a chip address bus 907.

The VU (vector unit) 901 includes a plurality of vector pipelines 909, a plurality of vector registers (VR) 910, a plurality of scalar registers (VSR) 911, and a plurality of mask registers (VMR) 912. The vector pipelines 909 can operate in parallel. The VU 901 executes a vector operation, a scalar operation, a mask operation, and so forth. The prefix "V" of abbreviations VSR and VMR represents that these registers are provided in the vector processor.

Figure 10:
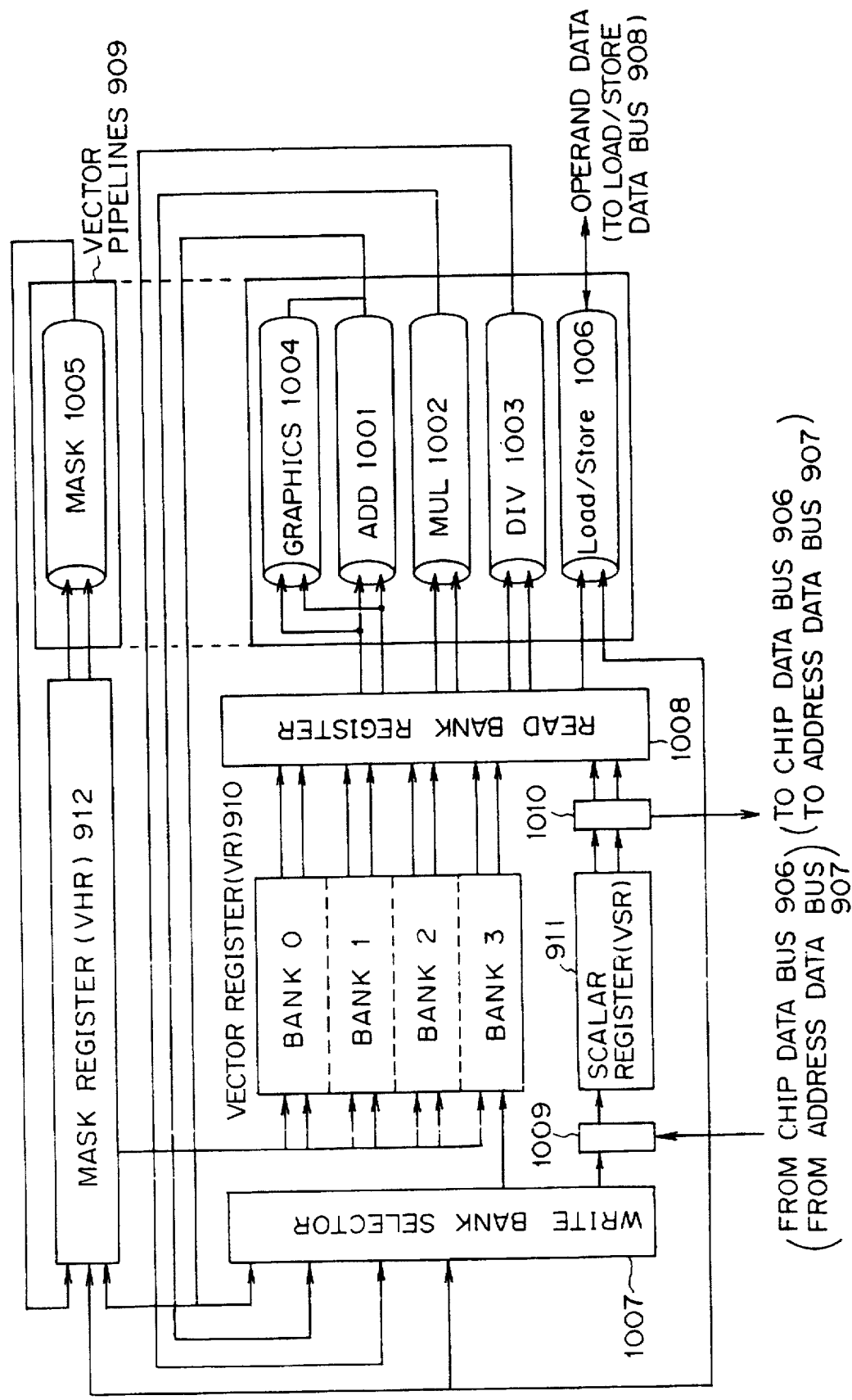
FIG. 10 is a schematic diagram showing the construction of a vector unit (VU) 901 of FIG. 9.

FIG. 10 is a block diagram showing the construction of the VU 901.

The vector pipeline 909 comprises a plurality of operation pipelines 1001 to 1005 and a plurality of load/store pipelines 1006.

The operation pipelines consist of an adder pipeline (ADD) 1001, a multiplier pipeline (MUL) 1002, a divider pipeline (DIV) 1003, a graphics processor pipeline (GRAPHICS) 1004, and a mask operation pipeline (MASK) 1005. When a vector operation command is received, the operation pipelines execute calculations a number of times according to the plurality of vector data stored in the VR 910 or to the plurality of mask data stored in the VMR 912.

Three types of pipelines which are the ADD 1001 or GRAPHICS 1004, the MUL 1002, and the DIV 1003 are connected with two independent data buses to two output ports of any one of five registers of four banks of the VR 910 and the VSR 911 or the output ports of any two registers thereof through a read bank selector 1008. One operation pipeline executes dependently from or in parallel with another operation pipeline, a vector operation or a scalar operation for two rows of vector data successively received from one bank of the VR 910 connected thereto, for both a row of vector data received from one bank of the VR 910 and scalar data received from the VSR 911 connected thereto, or for two rows of scalar data received from the VSR 911 connected thereto. Since the ADD 1001 and the GRAPHICS 1004 share the data bus, one pipeline selectively operates according to the type of command received.

The MASK 1005 is connected to the VMR 912 which will be described later. The VMASK 1005 executes a logical operation for mask data referenced when a conditional operation command is executed for vector data stored in the VMR 912.

The load/store pipeline 1006 is a pipeline which sends operand data between the VR 910, the VMR 912, or the VSR 911 and the main memory unit 806 shown in FIG. 8 through the load/store data bus 908, and the BU 903 (which are shown in FIG. 9), the processor data bus 803) the cache memory 805, and the memory data bus 808 (which are shown in FIG. 8).

A store data bus of the load/store pipeline 1006 is connected to an output port of the read bank register 1008 and thus, can be connected to the output port of one of four banks of the VR 910 or the selector 1010. Thus, the load/store pipeline 1006 can store in the main memory unit 806 shown in FIG. 8 each of the rows of vector data successively received from one of the banks of the VR 910 or scalar data received from the VSR 911.

On the other hand, a load data bus of the load/store pipeline 1006 is connected through the write bank selector 1007 to either the input port of one of the four banks of the VR 910, the input port of the VSR 911 connected to the selector 1009, or the input of the VMR 912. Thus, the load/store pipeline 1006 can load one row of vector data of any bank of the VR 910, scalar data of the VSR 911, or mask data of the VMR 912 from the main memory unit 806 shown in FIG. 8.

However, the load/store pipeline 1006 selectively executes a load operation or a store operation.

The VR (vector register) 910 has a total of 8 KB of storage capacity. The VR 910 stores an operand for use in a vector operation or the result of a vector operation.

The VR 910 is divided into, for example, four banks. Now assume that vector data stored in the VR 910 is an operand of 64 bits and that the vector length which is the number of elements in a row of vector data is 128. Each bank stores two rows of vector data and thereby all the banks store a total of eight rows of vector data. When vector data stored in the VR 910 is an operand of 32 bits and the vector length thereof is 128, each bank stores four rows of vector data and thereby all the banks store 16 rows of vector data. When vector data stored in the VR 910 is an operand of 64 bits and the vector length thereof is 64, each bank stores four rows of vector data and thereby all the banks store 16 rows of vector data. When vector data stored in the VR 910 is an operand of 32 bits and the vector length thereof is 64, each bank stores eight rows of vector data and thereby all the banks store 32 rows of vector data. Thus, for a vector operation, an operand of 32 bits or 64 bits can be selected. In addition, the vector length can be selected in the range from 0 to 256. According to the selection of the number of operand bits and the vector length, the number of rows of vector data is automatically determined.

One bank has two output ports and one input port. These ports can be accessed at the same time. To each output port, vector data of any of two or more data rows stored in the relevant bank is outputted. Thus, as described above, an operation pipeline connected to two output ports of one bank through the read bank selector 1008 can execute a vector operation for two rows of vector data successively received from the relevant bank, or for both one row of vector data successively received from the bank and scalar data received from the VSR 911 through the selector 1010. In addition, as described above, the load/store pipeline 1006 connected to one output port of one bank of the VR 910 through the read bank selector 1008 can successively store one row of vector data received from the bank of the main memory unit 806 shown in FIG. 8. On the other hand, from one input port of one bank, vector data is written to any row of vector data in the bank. Thus, one operation pipeline connected to one input port of one bank through the write bank selector 1007 can write the result of the vector operation to any row of vector data. In addition, one load/store pipeline 1006 connected to one input port of one bank through the write bank selector 1007 can successively load each row of vector data from the main memory unit 806 shown in FIG. 8 into any row of vector data in the bank.

The VSR (scalar register) 911 stores an operand used for a scalar operation, the start address (base address) in a load/store operation, the interval value (slide value) between each element of vector data stored in the VR 910, and so forth. The number of VSRs 911 is, for example, 32. The size of each register is, for example, 32 bits. Two of these registers can be used as a 64-bit register. As with the VR 910, the VSR 911 has two output ports and one input port. These ports can be accessed at the same time.

In addition, the VMR (mask register) 912 stores mask data which is referenced when a conditional operation command is executed for vector data stored in the VR 910. Each element of mask data has a binary logical value which represents validity of execution of a vector operation for a corresponding element of vector data. Thus, the size of a mask data element is one bit. In addition, a row of mask data stored in the VMR 912 and the number of elements thereof accord with the number of elements in a row of vector data in one of the four banks of the VR 910. More specifically, as described above, when vector data stored in the VR 910 is an operand of 64 bits and the vector length which is the number of elements of the row of vector data is 128, one bank stores two rows of vector data. On the other hand, the VMR 912 stores two rows of mask data, each row consisting of 128 elements, each element having one bit.

In addition, as described above, when vector data stored in the VR 910 is an operand of 32 bits and the vector length which is the number of elements of the row of vector data is 128, one bank stores four rows of vector data. On the other hand, the VMR 912 stores four rows of mask data, each row consisting of 128 elements, each element having one bit. When one of the operation pipelines 1001 to 1005 executes a vector operation for each vector of data of one of the banks of the VR 910, mask data of the corresponding row of master data is referenced. As with the VR 910, the VMR 912 has two output ports and one input port. These ports can be accessed at the same time.

In FIG. 9, the CPU (command buffer unit) 904 has command buffers (VCB) 923, each of which stores 256 entries of commands, each command having 32 bits. The prefix "V" of the abbreviation VCB represents that this buffer is provided in the vector processor.

In FIG. 9, the CU 902 controls the overall operation of the slave processor 802.

The CU 902 includes a decoder unit 918, a pipeline control unit 919, and a scoreboard 920. The decoder unit 918 decodes commands successively received from the VCB 923 of the CBU 904. The pipeline control unit 919 performs timing management and activates the vector pipelines 909 of the VU 901 according to the decoded result of each command received from the decoder unit 918. In addition, the pipeline control unit 919 causes the AU 905 to access vector data stored in the VR 910 of the VU 901 so as to control a vector operation. At this point, the decoder unit 918 and the pipeline control unit 919 operate the scoreboard 920 which has a variety of flip-flops so as to control the state of the VU 901.

The CU 902 also includes a command length register (VCLEN) 921 which stores the command length of commands (more specifically, the number of command steps) to be loaded from the main memory unit 806 to the VCB 923 of the CBU 904 through the cache memory 805 under the control of the slave processor 802. The VCLEN 921 is assigned an address accessible from the CPU 801. Before the slave processor 802 loads commands, the CPU 801 sets a command length into the VCLEN 921. The prefix "V" of the abbreviation VCLEN represents that this register is provided in the vector processor.

The CU 902 further includes a vector length register (VLEN) 922 which stores the vector length (more specifically, the number of vector elements) for a vector operation executed by the VU 901 according to the decoded result of each command of the decoder unit 918. The VLEN 922 is assigned an address accessible from the CPU 801. Before the slave processor 802 is activated, the CPU 801 sets a vector length to the VLEN 922. Alternatively, when a register move command (VMOV) is executed in the VCB 923 of the CBU 904, vector length data preloaded in the VCB 923 of the CBU 904 is sent to the VLEN 922. In addition, while a vector operation is being executed, when the register move command (VMOV) is executed, vector length data stored in the scalar register 911 of the VU 901 is sent to the VLEN 922. Thus, when the register move command (VMOV) is executed, even while a vector operation is being executed, the vector length stored in the VLEN 922 can be changed without intervention of the CPU 801. This is one of the remarkable features of this preferred embodiment.

The BU (bus control unit) 903 performs a bus control operation when various data are exchanged between the main memory unit 806 or the CPU 801 and the slave processor 802 through the processor data bus 803 shown in FIG. 8.

When the slave processor 802 becomes the bus master and loads or stores an operand of vector data, scalar data, or mask data between the VR 910, the VSR 911, or the VMR 912 and the main memory unit 806 shown in FIG. 8 through the load/store pipeline 1006 shown in FIG. 10, the BU 903 establishes an interfacing between the processor data bus 803 shown in FIG. 8 and the load/store data bus 908, each of which has the same data width of 64 bits.

When the CPU 801 shown in FIG. 8 becomes the bus master and performs a slave access to one of the registers such as the command start register (not shown in the figure), the VCLEN 921, the VLEN 922, a busy register (not shown in the figure), and an abort register (not shown in the figure), each of which is connected to the chip data bus 906 of the slave processor 802, the BU 903 establishes an interfacing between the processor data bus 803 having a width of 64 bits (shown in FIG. 8) and the chip data bus 906 having a data width of 32 bits.

When various data are exchanged between the main memory unit 806 or the CPU 801 and the slave processor 802 through the processor data bus 803 shown in FIG. 8, the AU (address unit) 905 performs an address control operation for the processor address bus 804 shown in FIG. 8.

When the slave processor 802 becomes the bus master and loads or stores an operand of vector data, scalar data, master data, or the like between the VR 910, the VSR 911, or the VMR 912 which is connected through the load/store pipeline 1006 shown in FIG. 10 and the main memory unit 806 shown in FIG. 8, the AU 905 sends to the processor address bus 804 shown in FIG. 8 an address for accessing the main memory unit 806 according to a command received from the pipeline control unit 919 of the CU 902.

When the CPU 801 shown in FIG. 8 becomes the bus master and performs a slave access to each of the above-mentioned registers connected to the chip data bus 906 of the slave processor 802, the AU 905 converts a register access address, which is sent from the CPU 801 shown in FIG. 8 to the processor address bus 804, into an address which directly designates a relevant register of the slave processor 802 and then sends the converted address to the chip address bus 907.

Next, the operation of the first preferred embodiment with the above-mentioned construction will be described.

As a remarkable feature of this preferred embodiment, data can be exchanged between each register of the slave processor 802.

Figure 11:
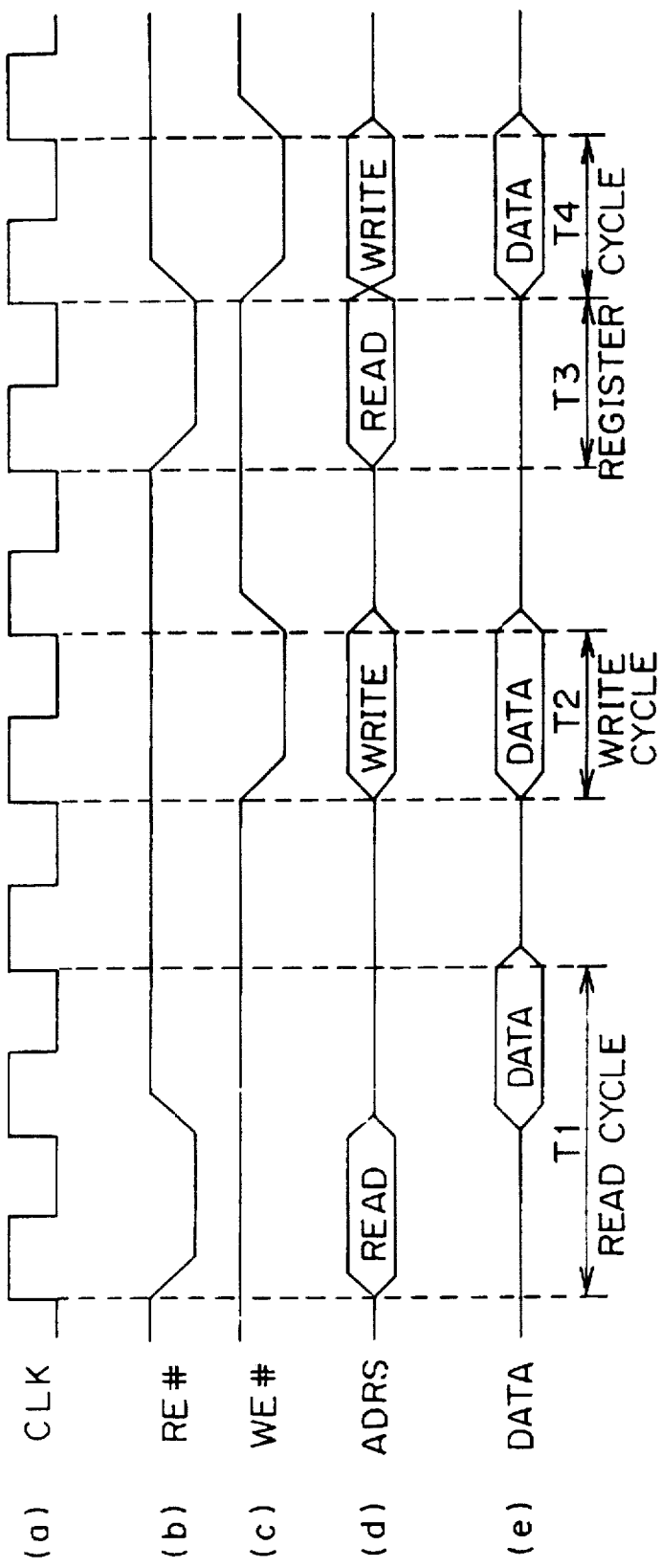
FIG. 11 is a schematic diagram showing an operational timing chart of a slave processor according to the first preferred embodiment.

FIG. 11 shows an operational timing chart for explaining a read/write operation for the registers of the slave processor 802 and a data send operation between each register thereof.

In FIG. 11, T1 is a read cycle. In the first clock period of a read cycle of clock periods produced according to a basic clock CLK shown in (a), the AU 905 shown in FIG. 9 sends, to the chip address bus 907, an address "read" of a register from which data is read, as address data ADRS as shown in (d). At the same time, as shown in (b), on a control data bus (not shown in FIG. 9), the AU 905 causes a read enable signal RE# to become active. Thus, as shown in (e), in the second clock period of the read cycle, data DATA which is "data" is sent from a corresponding register to the chip data bus 906. This data is sent from the BU 903 to the CPU 801 or the main memory unit 806 through the processor data bus 803 shown in FIG. 8.

In FIG. 11, T2 is a write cycle. In a clock period of this cycle, as shown in (d), the AU 905 shown in FIG. 9 sends, to the chip address bus 907, a "write" address of a register to which data is written, as address data ADRS. At the same time, as shown in (c), on the control data bus (not shown), the AU 905 causes a write enable signal WE# to become active. Moreover, as shown in (e), the CPU 801, the main memory unit 806, or the like shown in FIG. 8 sends to the chip data bus 906 through the processor data bus 803 and the BU 903 data DATA, as "data" Thus, in this clock period, the "data" designated for the chip data bus 906 is written to a corresponding register.

In FIG. 11, T3 and T4 are a register move cycle. This cycle mostly relates to the present invention.

Figure 12:
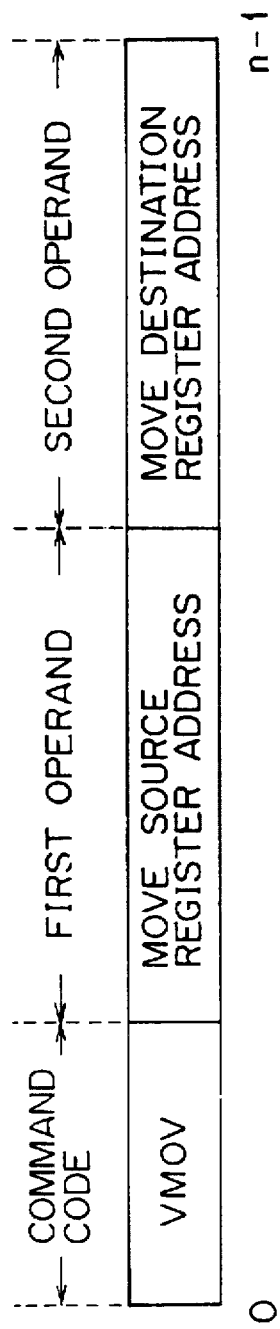
FIG. 12 is a schematic diagram showing the command format of a register move command (VMOV)

FIG. 12 shows the command format of a register move command which accomplishes the register move cycle. In this format, a command code representing a register move VMOV is designated. As a first operand, a source register address ADRD is designated. As a second operand, a destination register address ADRD is designated. As a source register and a destination register, the VCB 923, the VR 910, the VSR 911, the VLEN 922, or the VCLEN 921 can be selected. The prefix "V" of the abbreviation VMOV represents that the register move command is a command which is executed in the vector processor.

When the decoder unit 918 of the CU 902 shown in FIG. 8 decodes the register move command received from the VCB 923 of the CBU 904, the CU 918 (902) shown in FIG. 9 sends to the chip address bus 907 a move source register address "read" as source address data ADRS, in the T3 cycle clock period 9 of the CU 902. In addition, as shown in (d), on the control data bus (not shown), the pipeline control unit 919 of CU 902 causes the read enable signal RE# to become active. Thus, as shown in (e), in the T4 cycle clock period, data DATA which is "data", is sent from the move source register to the chip data bus 906.

In the T4 cycle clock period, as shown in FIG. 11D, the decoder unit 918 of CU 902 shown in FIG. 9 sends to the chip address bus 907 a move destination register address "write" as address data ADRS. At the same time, as shown in (c), on the control data bus (not shown), the decoder unit 918 causes the write enable signal WE# to become active. Thus, in the T4 cycle clock period, the "data" stored in the move source register and sent to the chip data bus 906 is written to the move destination register.

As a first example of the operation of the above register move command, vector length data is preloaded to the VCB 903 under the control of the pipeline control unit 919 of the CU 902. After the slave processor 802 is started and a vector operation is executed, the register move command (VMOV) which is preloaded in the VCB 923 is executed. Thus, the VCB 923 can set vector length data into VLEN 922.

As a second example of the operation of the register move command, a vector length is obtained by executing a scalar operation in the middle of a vector operation. The result of the operation is stored in the VSR 911. Thereafter, by executing the register move command (VMOV) loaded in the VCB 923, the vector length stored in the VLEN 922 can be changed by data stored in the VSR 911 without intervention by the external CPU 801 shown in FIG. 8. For example, after a vector length is shortened by a vector compression/expansion command and then a vector operation is executed, if the vector length is lengthened and the vector operation is executed, the slave processor 802 can continue the execution of the vector operation without a suspension thereof.

An actual operation of the above first and second examples of operation of the register move command will be described.

First, the CPU 801 shown in FIG. 8 writes the command load and start command (VLOADS) to a proper VCB 923 of the CBU 904.

Next, the CPU 801 writes to the VCLEN 921 of the CU 902 the number of command steps loaded from the main memory unit 806 to the VCB 923 by using the VLOADS command. In addition, the CPU 801 writes to the VSR 911 of the VU 901 the start address of the main memory unit 806 from which these commands are stored.

Thereafter, the CPU 801 sets to a command start register (VSTA) (not shown) of the CU 902 the address of the VCB 923 at which the VLOADS command is written and then activates the slave processor 802.

Then, the slave processor 802 executes the VLOADS command stored in the VCB 923, the address thereof being set in the command start register. As a result, a command sequence with which a vector operation is executed is loaded from the main memory unit 806 to the VCB 923. The start address of the VCB 923 is designated by the operand of the VLOADS command.

Alternatively, as opposed to the above-mentioned load operation, the CPU 801 which becomes the bus master can load all vector length data and commands from the main memory unit 806 to the VCB 923 of the slave processor 802.

Figure 13:
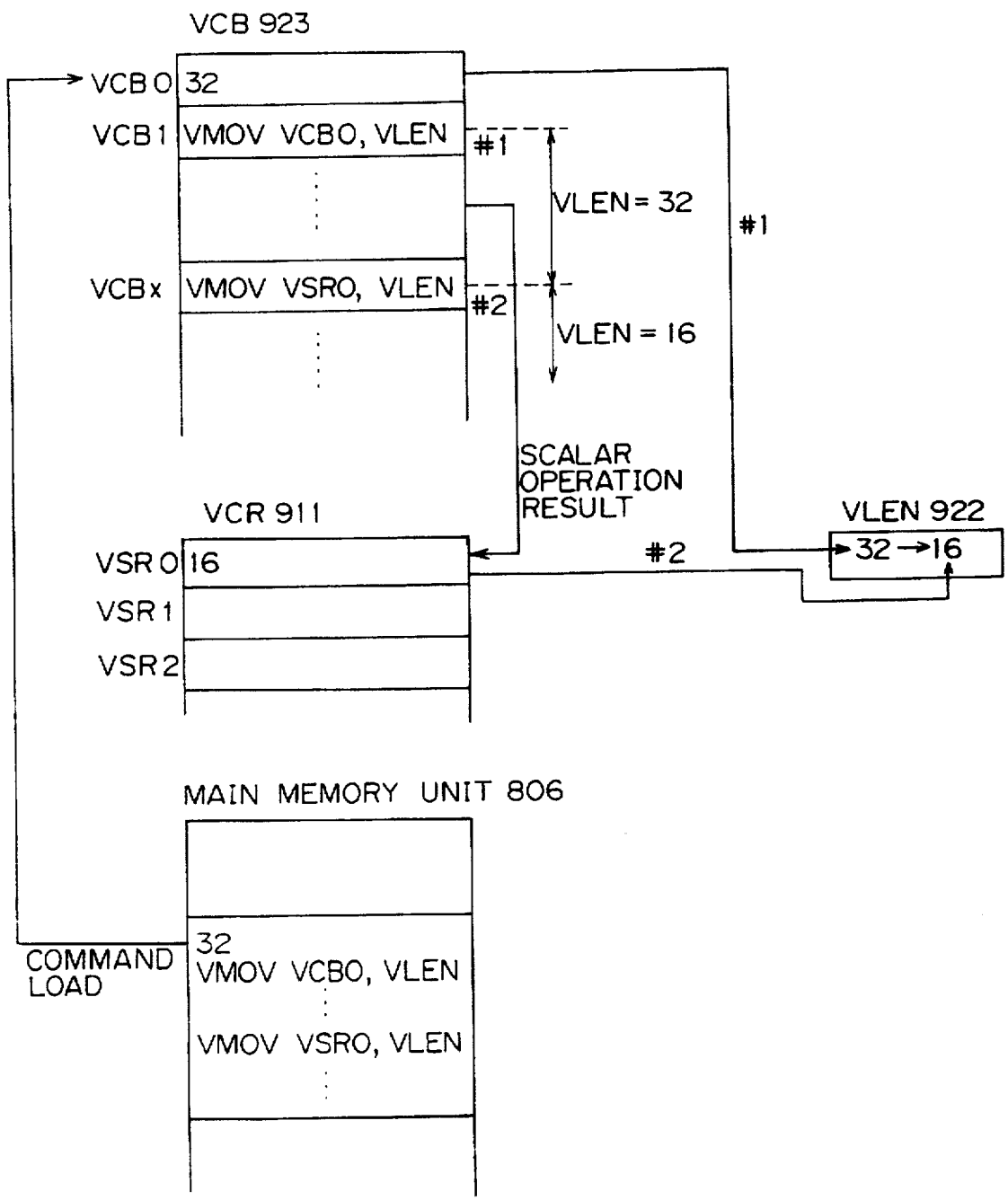
FIG. 13 is a schematic diagram for explaining an operation of the first preferred embodiment.

Thus, for example, as shown in FIG. 13, the vector length of 32 is loaded from the main memory unit 806 to address 0 (VCB 0) of the VCB 923. Thereby, each command is successively loaded to address 1 (VCB1) and succeeding addresses.

Thereafter, the decoder unit 918 of the CU 902 decodes commands at address 1 (VCB1) and succeeding addresses. The processes according to the decoded commands are successively executed. In this example, after the register move command at address 1 (VCB) represented by #1 is executed, the vector length of 32 loaded at address 0 (VCB0) is moved to the VLEN 922. Thus, the vector length of the vector operation just after the execution of the vector operation, is set to 32.

Thereafter, a plurality of commands for the vector operation are successively executed. By a scalar operation (not shown) executed in the middle of the vector operation, the vector length is calculated. The result (vector length=16) is stored at address 0 (VSR0) of the VSR 911. Then, the register move command at address x (VCBx), represented by #2, is executed and the vector length of 16 obtained at the address 0 (VSR0) of the VSR 911 is moved to the VLEN 922. As a result, the vector length for the vector operation executed after the register move command is changed to 16. In this manner, even in the middle of a vector operation, the vector length therefor can be changed.

Next, as a third example of an operation of the register move command, scalar data is preloaded to the VCB 923 of the CBU 904. After the slave processor 802 is started, the register move command (VMOV) loaded in the VCB 923 is executed and thereby the scalar data can be set from the VCB 923 to the VSR 911.

An actual operation of the above third example of the operation of the register move command will be described.

Figure 14:
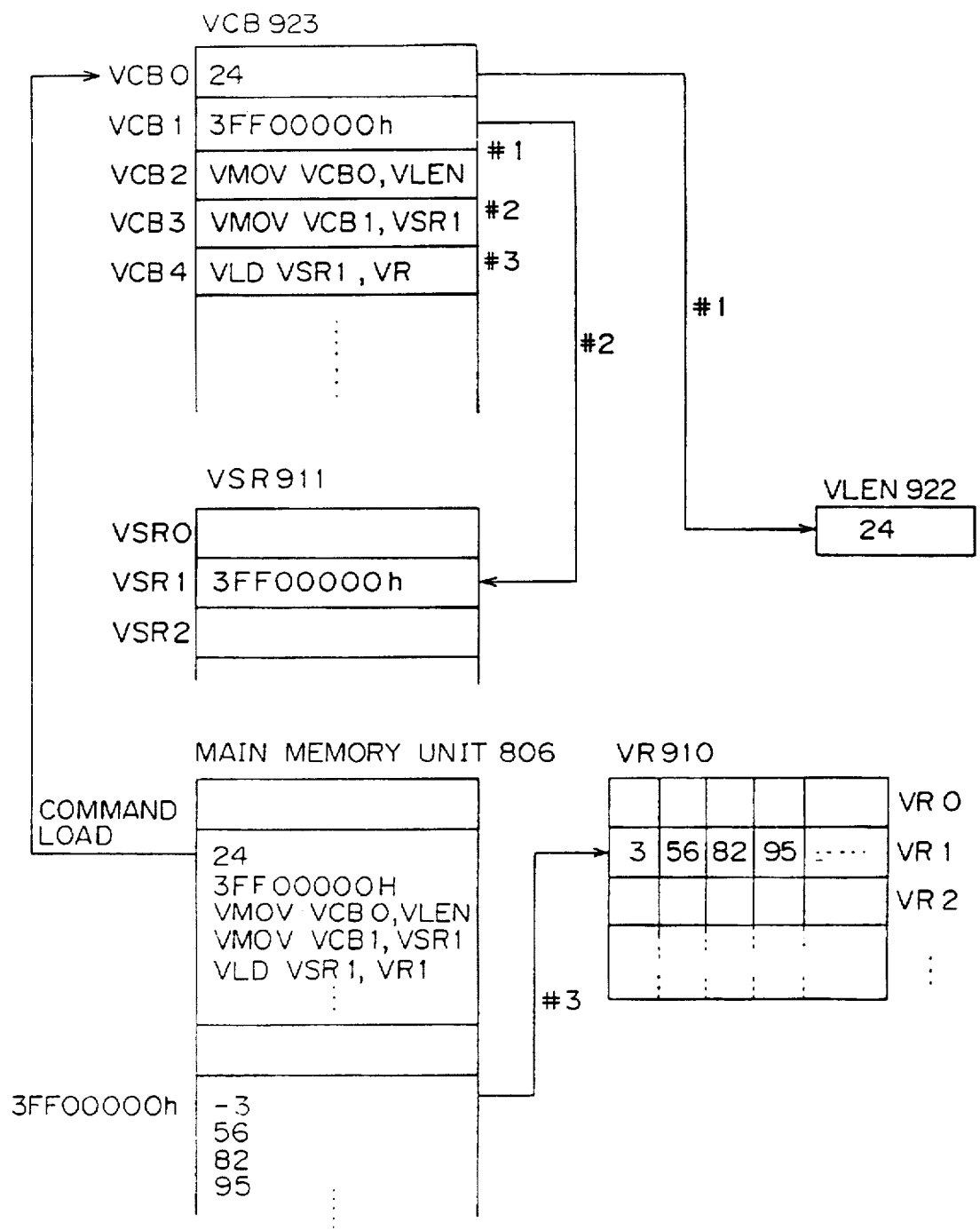
FIG. 14 is another schematic diagram for explaining the operation of the first preferred embodiment.

First, for example, as shown in FIG. 14, the main memory unit 806 loads a vector length to address 0 (VCB0) of the VCB 923. At address 1 (VCB1), scalar data of 3FF00000h is loaded. At address 2 (VCB2) and succeeding addresses, each command is successively loaded.

Thereafter, the decoder unit 918 of the CU 902 successively decodes commands at address 2 (VCB2) and succeeding addresses. Thus, the processes according to the decoded commands are successively executed. In this example, when the register move command at address 2 (VCB2) represented by #1 is executed, a vector length of 24 loaded at address 0 (VCB0) is moved to the VLEN 922. Thus, the vector length for a vector operation just after it is executed is set to 24. Next, the register move command loaded at address 3 (VCB3) represented by #2 is executed. Thus, scalar data of 3FF00000h loaded at address 3 (VCB3) represented by #3 is loaded into address 1 (VSR1) of the VSR 911. In addition, the vector load command (VLD) at address 4 (VCB4) represented by #3 is executed. Thus, as vector data row 1 (VR1), vector data stored at the addresses of the main memory unit 806 represented by the scalar data of 3FF00000h loaded at address 1 (VSR1) of the VSR 911 are loaded to the VR 910 at a time.

Whenever the scalar load command stored in the VCB 923 is executed, one piece of scalar data is loaded from the main memory unit 806 to the VSR 911. However, in this system, the overhead involved in decoding commands and calculating addresses thereof increases proportional to the number of pieces of scalar data. Thus, the entire load time including command load time just after the start of the slave processor 802 becomes long as shown in the lower column of FIG. 15.

On the other hand, the register move command represented by #2 of FIG. 14 can be executed in a very short time in comparison with the scalar load command. Thus, the scalar data is loaded to the VCB 923 by the command load command. Thereafter, the scalar data is moved from the VCB 923 to the VSR 911. As a result, as shown in the upper column of FIG. 15, the entire load time including the command load time just after the start of the slave processor 802 can be shortened.

Figure 15:
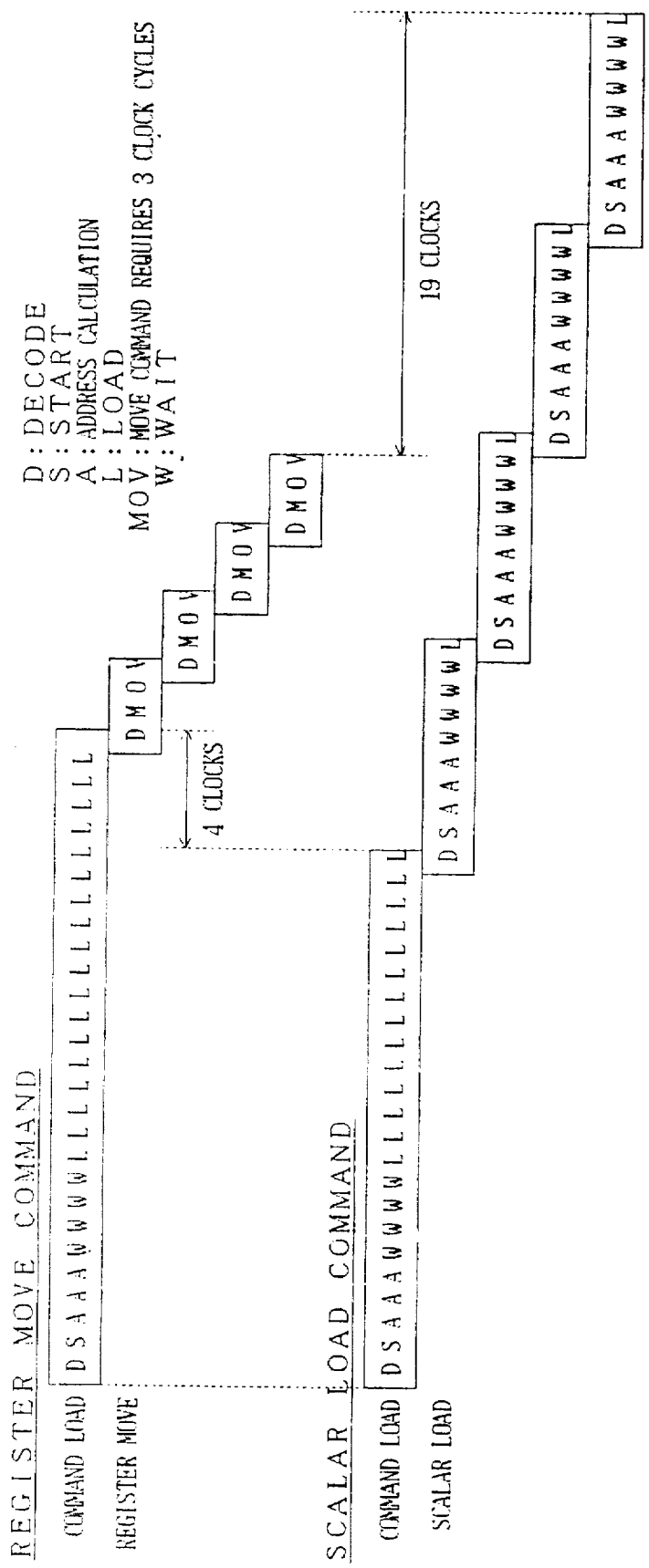
FIG. 15 is a further schematic diagram for explaining the operation of the first preferred embodiment.

In FIG. 15:

D represents decode;

S represents start;

A represents address calculation;

L represents LOAD;

MOV represents a move which requires three clock cycles; and

W represents WAIT.

In addition, in this system, scalar data exceeding the capacity of the VSR 911 can be preloaded to the VCB 923. Thus, in the middle of a vector operation, the data of the VSR 911 can be changed without an execution of the scalar load command.

Second Preferred Embodiment

Next, the second preferred embodiment according to the basic construction shown in FIG. 8 will be described.

In this preferred embodiment, as with the first preferred embodiment, the slave processor 802 shown in FIG. 8 is a data processing apparatus which executes for example a vector operation. In this second preferred embodiment, a construction with which the second problem of the related art reference can be solved is disclosed.

Before the second preferred embodiment is described, the theoretical construction of the second preferred embodiment will be explained with reference to block diagrams shown in FIGS. 16 and 17.

Figure 16:
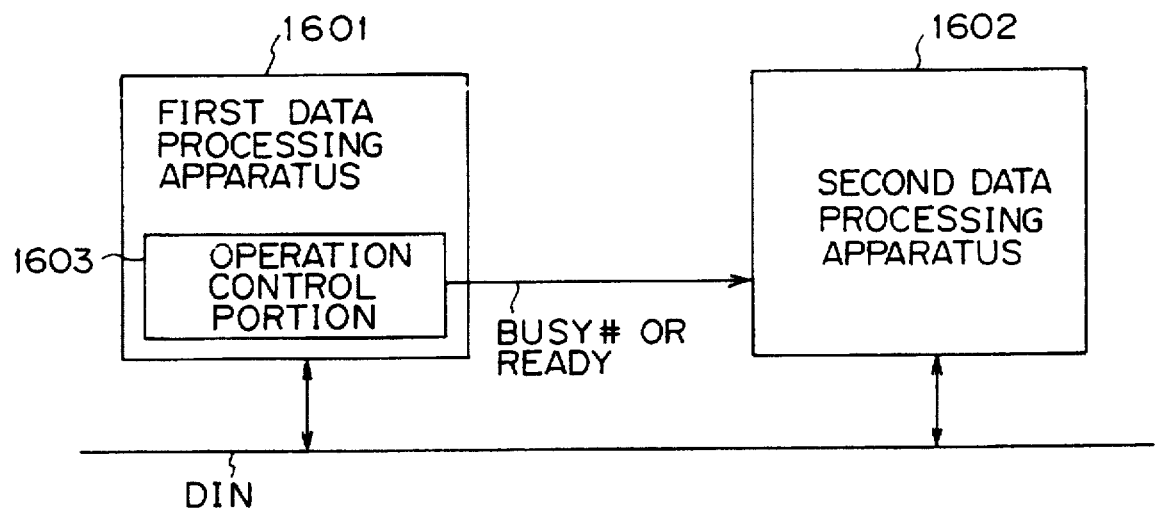
FIG. 16 is a schematic diagram showing the theoretical construction of the second preferred embodiment.

In FIG. 16, a first data processing apparatus 1601 which is for example a slave processor interprets write data DIN received from a second data processing apparatus 1602 which is for example a master processor, extracts command start information, and executes commands for a vector operation and so forth.

The first data processing apparatus 1601 shown in FIG. 16 comprises an operation control portion 1603. When data DIN is written to a particular register of the first data processing unit 1601, the operation control portion 1603 immediately sends an active status indication signal BUSY# to the second data processing apparatus 1602 or the like regardless of whether or not command start information has been set in the write data DIN. This control operation is performed by a signal activation portion 1701 (see FIG. 17) of the operation control portion 1603. In other words, the signal activation portion 1701 determines whether control signals such as an address decoder signal and a write enable signal which represent write data DIN have been written to a particular register and then outputs the active status indication signal BUSY# according to the determined result.

Thus, for example, one cycle later after a basic clock representing a write access of a register in which command start information is set, becomes "high", the active status indication signal BUSY# is sent to the second data processing apparatus 1602 or the like.

As a result, immediately after the write data DIN is written to the first data processing apparatus 1601, even if another data processing apparatus accesses the first data processing apparatus 1601, malfunctions of the first data processing apparatus 1601 can be prevented.

When the second data processing apparatus 1602 writes write data DIN in n clock cycles (where n is 2 or more), the operation control portion 1603 (the signal activation portion 1701) can send the active status indication signal BUSY# to the second data processing apparatus 1602 or the like n cycles later after write data DIN is written to a particular register of the first data processing apparatus 1601.

In addition, after the operation control portion 1603 outputs the active status indication signal BUSY#, it determines whether or not command start information has been set in the write data DIN. Depending on the determined result, the operation control portion 1603 continues the output of the active status indication signal BUSY# or stops the output of the active status indication signal BUSY# and instead outputs an inactive status indication signal READY. This control operation is performed by the signal control portion 1702 of the operation control portion 1603. In other words, the signal control portion 1702 determines whether or not command start information has been set in the write data DIN and then according to the determined result controls the signal activation portion 1701.

Thus, if command start information has not been set in the write data DIN due to a mistake or the like, the situation where the active status indication signal BUSY# is continuously outputted can be prevented. As a result, a busy control operation for the busy signal can be precisely performed.

Next, an actual construction and operation of the second preferred embodiment according to the above theoretical construction will be described.

Figure 18:
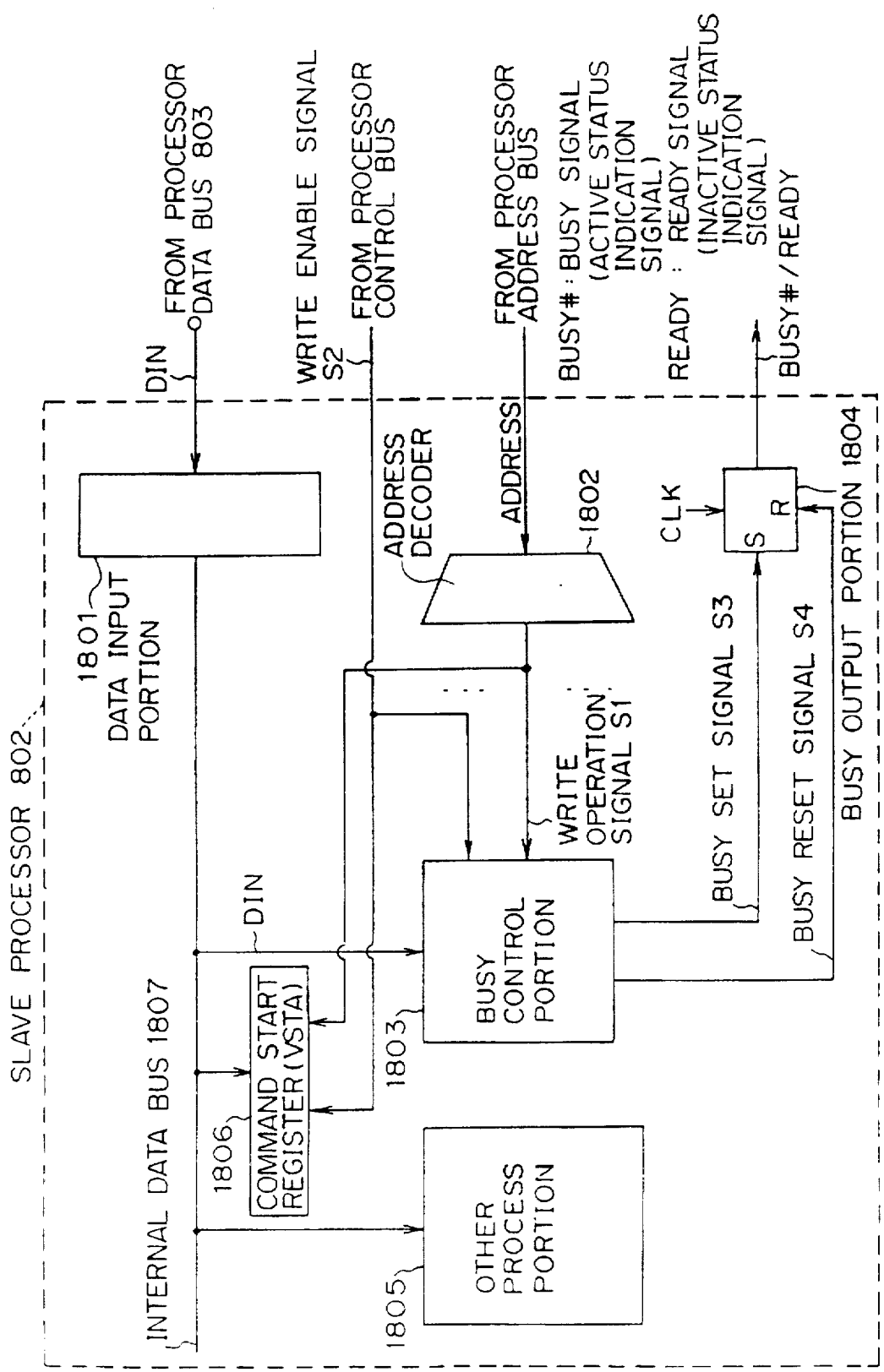
FIG. 18 is a schematic diagram showing the construction of the slave processor of the second preferred embodiment.

FIG. 18 is a block diagram of the slave processor 802 of FIG. 8 according to the second preferred embodiment.

In the figure, the slave processor 802 includes a data input portion 1801, an address decoder 1802, a busy control portion 1803, a busy output portion 1804, an other-process portion 1805, a command start register (VSTA) 1806, and an internal data bus 1807.

The data input portion 1801 receives data such as write data DIN from the processor data bus 803 shown in FIG. 8 and sends it to the internal data bus 1807.

The address decoder 1802 interprets address data received from the processor address bus 804 shown in FIG. 8. When the interpreted data is an address for accessing the VSTA 1806, the address decoder 1802 sends a write signal S1 to the VSTA 1806 and the busy control portion 1803.

In addition, from a control bus (not shown in the figure), a write enable signal S2 is sent to the VSTA 1806, the busy control portion 1803, and so forth.

The internal data bus 1807 is connected to the busy control portion 1803, the other process portion 1805, the VSTA 1806, and so forth.

The busy control portion 1803 and the busy output portion 1804, which will be described later, accord with the operation control portion 1603 shown in FIG. 16. The busy control portion 1803 outputs the write signal S1, the write enable signal S2, a busy set signal S3, and a busy reset signal S4. The busy set signal S3 sets a busy signal BUSY# representing that the slave processor 802 is active (this busy signal BUSY# accords with the active status indication signal BUSY#). Hereinafter, this busy signal BUSY# is referred to as the BUSY# signal. The busy reset signal S4 resets the BUSY# signal and sets an inactive status indication signal READY (hereinafter, referred to as the READY signal). The internal construction of the busy control portion 1804 will be described later with reference to FIG. 19.

The busy output portion 1804 is a set/reset flip-flop. The busy output portion 1804 outputs the BUSY# signal at low level, according to the busy set signal S3 in synchronization with the basic clock CLK. In addition, the busy output portion 1804 cancels the BUSY# signal and outputs the READY signal at high level according to the busy reset signal S4. These BUSY# and READY signals are sent to the CPU 801 shown in FIG. 8 or the like through a dedicated control line or a processor data bus 803.

The other process portion 1805 includes a command processing unit. The other process portion 1805 executes a vector operation and so forth according to an interpreted command.

When the CPU 801 shown in FIG. 8 activates the slave processor 802, the VSTA (command start register) 1806 stores write data DIN with "ON information" in the start bit thereof. When the write data DIN is written to the VSTA 1806, the other process portion 1805, shown in FIG. 18, activates a process such as a vector operation.

When the slave processor 802 shown in FIG. 18 is the vector data processor which is the same as the first preferred embodiment, the basic construction of the slave processor 802 shown in FIG. 18 is the same as the construction of the first embodiment shown in FIG. 9. In this case, the data input portion 1801, the busy control portion 1803, and the busy output portion 1804 shown in FIG. 18 are contained in the BU 903 shown in FIG. 9. The address decoder 1802 shown in FIG. 18 is contained in the AU 905 shown in FIG. 9. The VSTA 1806 shown in FIG. 18 is contained in the CU 902 shown in FIG. 9. The other process portion 1805 is contained in part of the VU 901, the CBU 904, and the CU 902, part of the BU 903, and part of the AU 905, which are shown in FIG. 9. In addition, the internal data bus 1807 shown in FIG. 18 accords with the chip data bus 906 shown in FIG. 9.

Figure 19:
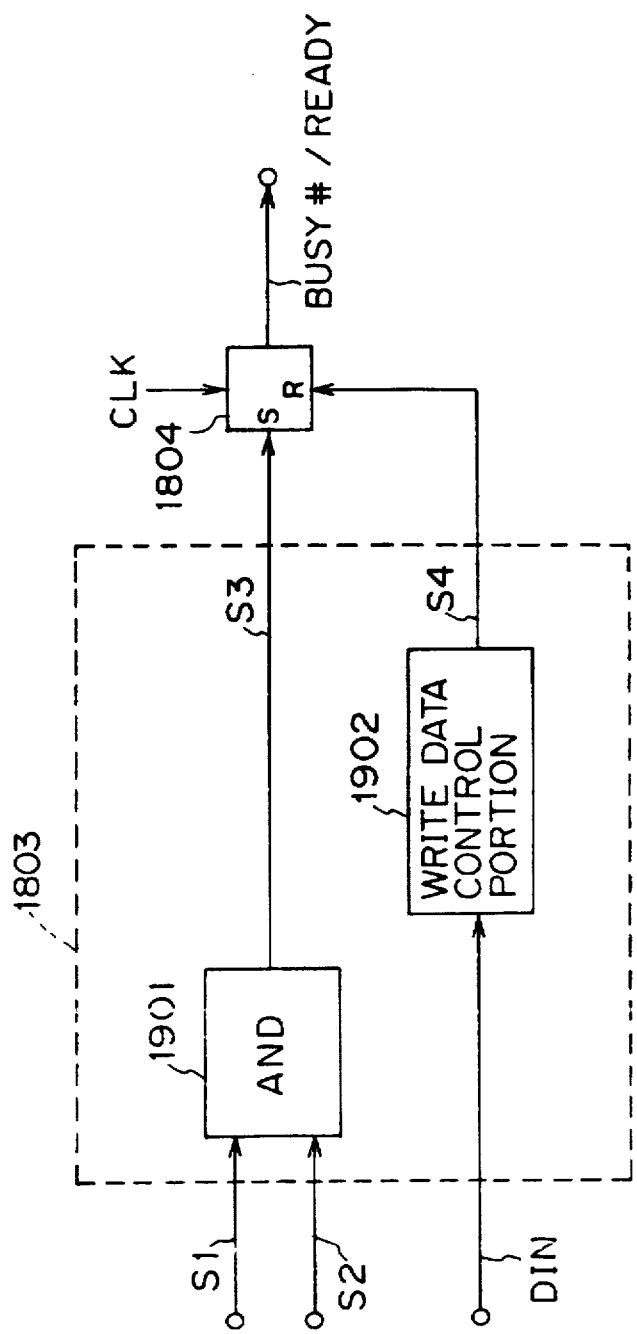
FIG. 19 is a schematic diagram showing a first example of the construction of the busy control portion 1803 of FIG. 18.

FIG. 19 shows a first example of the construction of the busy control portion 1803 of FIG. 18.

In FIG. 19, the busy control portion 1803 includes an AND gate 1901 and a write data control portion 1902.

Figure 17:
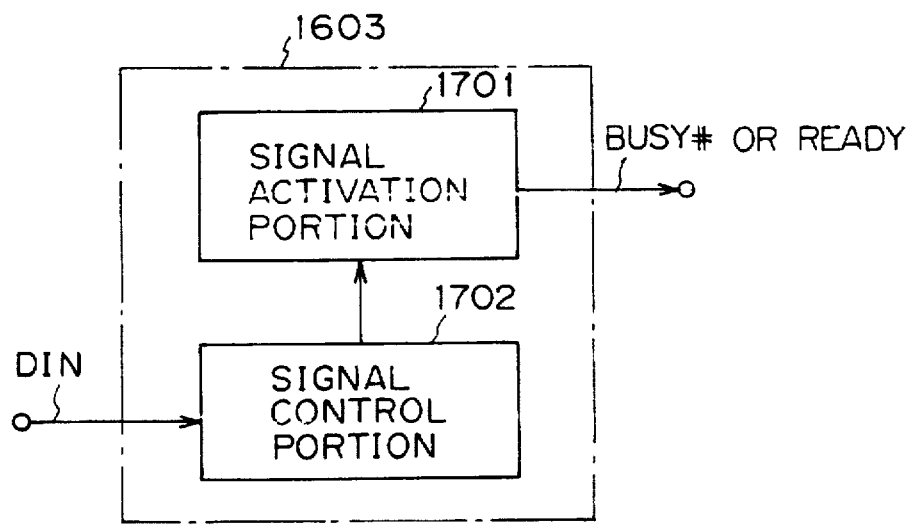
FIG. 17 is a schematic diagram showing the construction of the operation control portion 1603 of FIG. 16.

The AND gate 1901 accords with the signal activation portion 1701 shown in FIG. 17. As shown in FIG. 21(b) to (d), when a write operation signal S1 at low level, representing a write access to the VSTA 1806 of write data DIN, is sent from the address decoder 1802 and a write enable signal S2 at low level is sent from the CPU 801 shown in FIG. 8 to the slave processor 802 through a control bus (not shown in the figure), the AND gate 1901 outputs a busy set signal S3 at low level.

Figure 21:
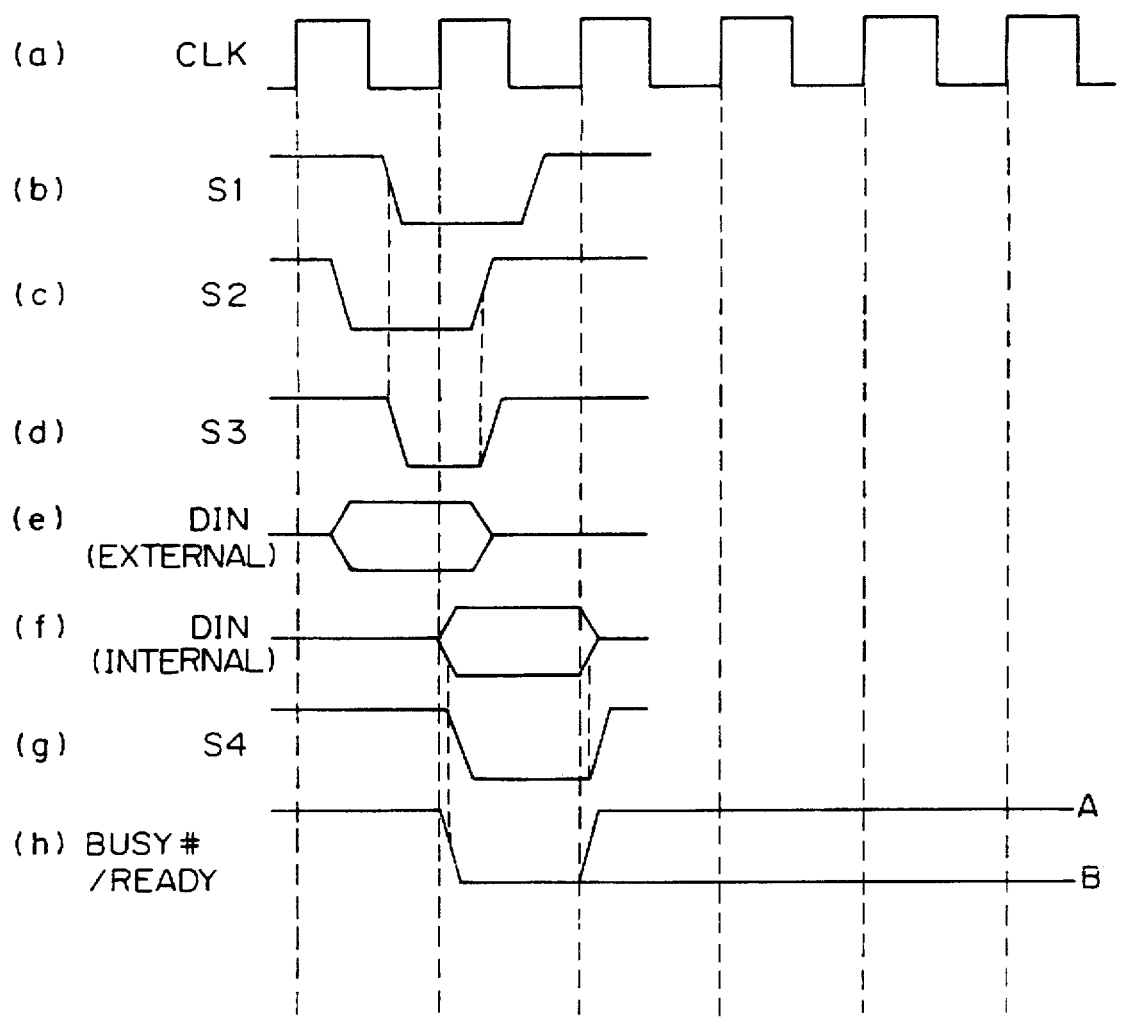
FIG. 21 is an operational timing chart for the first example of the busy control portion 1803.

While the busy set signal S3 at low level is being outputted, the busy output portion 1804 is set in synchronization with a basic clock CLK shown in (a). In addition, as shown in FIG. 21 at (h), a BUSY# signal at low level representing that the slave processor 802 is active is outputted.

In the next clock cycle, the busy control portion 1803 shown in FIG. 18 sends the BUSY# signal to the external CPU 801 (shown in FIG. 8) through the busy output portion 1804 regardless of whether or not "ON information" has been set to the start bit of the write data DIN.

Figure 20:
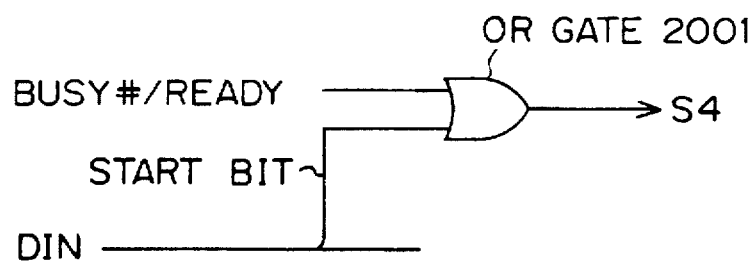
FIG. 20 is a schematic diagram showing the construction of the write data control portion 1904 of FIG. 19.

In FIG. 19, a write data control portion 1904 accords with the signal control portion 1702 shown in FIG. 17. An example of the construction of the write data control portion 1904 is shown in FIG. 20. As shown in FIG. 20, the write data control portion 1904 is constructed of an OR gate 2001. The write data control portion has two inputs and one output. The first input receives a BUSY#/READY signal through a control line (not shown in the figure) and the second input receives a start bit which is part of write data DIN from the internal data bus 1807 shown in FIG. 18. The output sends a busy reset signal S.

After the BUSY# signal at low level shown in (h) is outputted, when the start bit of the write data DIN is "0" (low level), the write data control portion 1904 outputs the busy reset signal S4 at low level. Otherwise, the output of the write data control portion 1904 is at high level.

After the busy output portion 1804 outputs the BUSY# signal at low level, if "ON information" has not been set in the start bit of the write data DIN for the timing shown in (e) (processor data bus 803) or for the timing shown in (f) (internal data bus 1807) due to a programming error or the like in the CPU 801 (namely, the value of the start bit is "0"), as shown in (g), the busy reset signal S4 at low level is outputted. While the busy reset signal S4 at low level is being outputted, the busy output portion 1804 is reset in synchronization with the basic clock CLK. Thus, as shown by A of (h), the READY signal at high level representing that the slave processor 802 is active is outputted. Thus, while such an error is taking place, the situation where the active status indication signal BUSY# is continuously outputted can be prevented. As a result, the control of the busy signal can be precisely performed. When "ON information" has been correctly written in the start bit of the write data DIN, namely the value of the start bit is "1", the busy output portion 1804 keeps the output state of the BUSY# signal at low level as shown by B of (h).

For example, assume that the slave processor 802 shown in FIG. 8 comprises a vector length register which stores a vector length for a vector operation and that the other process portion 1805 executes a vector operation for vector data each having a vector length of 8 according to a command based on the "ON information" stored in the VSTA 1806 as described in the first preferred embodiment. In addition, assume that after the CPU 801 shown in FIG. 8 writes to the slave processor 802 write data DIN with the "ON information" in the start bit thereof so as to activate the slave processor 802, the content of the vector length register of the slave processor 802 is changed when the slave processor 802 enters the ready status (inactive status).

In this case, after the slave processor 802 receives the write data DIN from the CPU 801, it immediately outputs the BUSY# signal. Thus, when the slave processor 802 interprets a command according to the "ON information" and executes a vector operation, even if it takes several cycles, in this period, the CPU 801 cannot access the slave processor 802. Thus, before the slave processor 802 references the content of the vector length register in executing a vector operation, the content of the register is not rewritten by the CPU 801 or the like. Thus, the slave processor 802 can start executing a vector operation in accordance with a correct vector length value stored in the vector length register.

Figure 22:
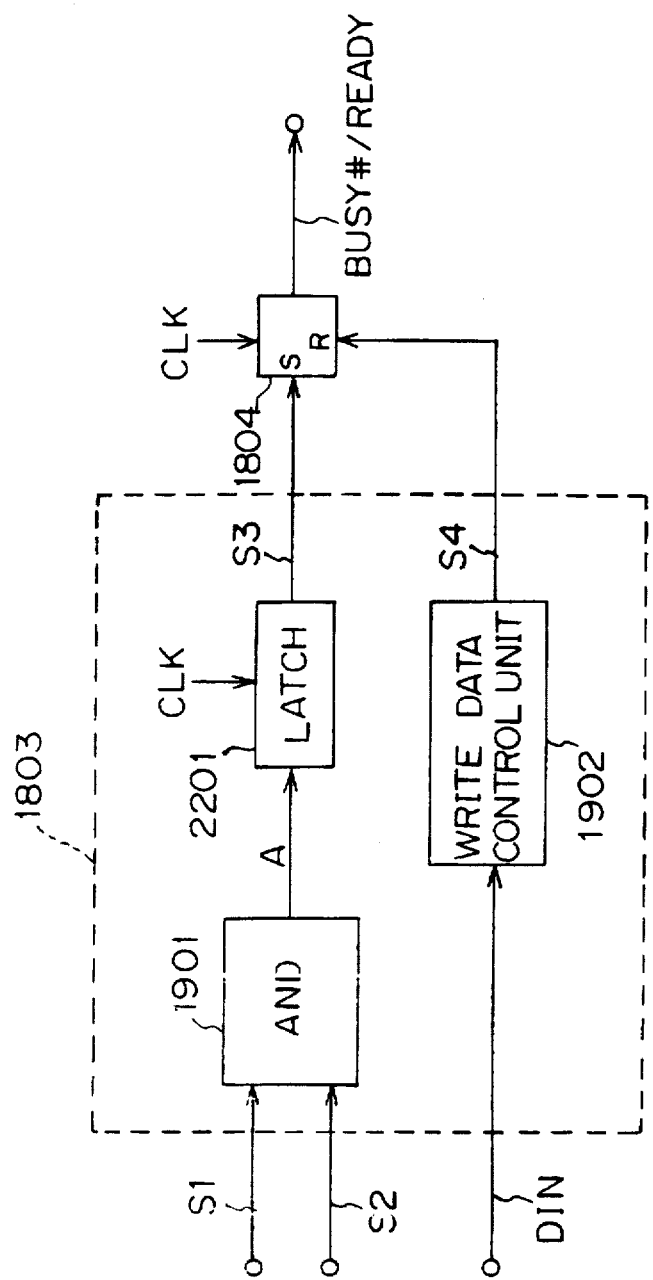
FIG. 22 is a schematic diagram showing a second example of the construction of the busy control portion 1803 of FIG. 18.

FIG. 22 shows a second example of the construction of the busy control portion 1803 shown in FIG. 18.

The second example of the construction shown in FIG. 22 differs from the first example of the construction shown in FIG. 19 in the following point. Between the AND gate 1901 and the busy output portion 1804, a latch 2201 which delays the output of the busy set signal S3 by one clock cycle is disposed.

Figure 23:
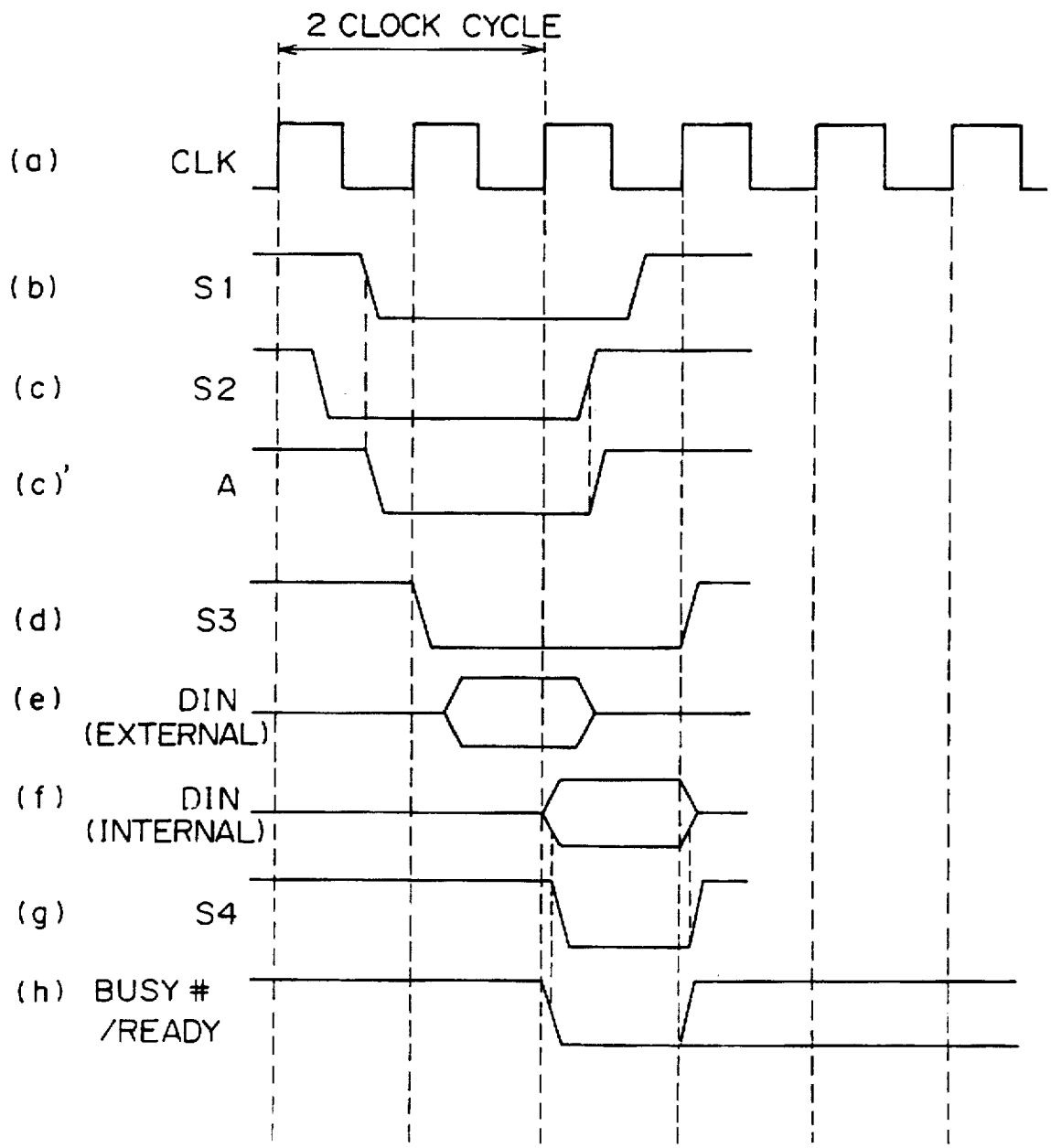
FIG. 23 is an operational timing chart for the second example of the busy control portion 1803.

In the second construction, as shown in FIG. 23, in (a) to (c) and (d), the CPU 801 shown in FIG. 8 writes write data DIN to the slave processor 802 in two clock cycles.

In this case, two cycles later after the CPU 801 accesses the slave processor 802, the slave processor 802 should output the BUSY# signal.

Thus, as shown in (c)' and (d), the latch 2201 delays the output A of the AND gate 1901 by one clock cycle. As a result, as shown in (h), two clock cycles after the CPU 801 accesses the slave processor 802, the busy output portion 1804 outputs the BUSY# signal at low level.

In this case, as shown in (e) and (f), the write data DIN is delayed by one clock cycle. Thus, as shown in (g), the busy reset signal S4 at low level which is outputted from the write data control portion 1904 shown in FIG. 22 is also delayed by one clock cycle.

As described above, FIG. 22 shows the construction where the CPU 801 of FIG. 8 writes write data DIN to the slave processor 802 in two clock cycles. When the CPU 801 writes write data DIN to the slave processor 802 in longer clock cycles, the number of latches disposed between the AND gate 1901 and the busy output portion 1804 can be correspondingly increased.

Figure 24:
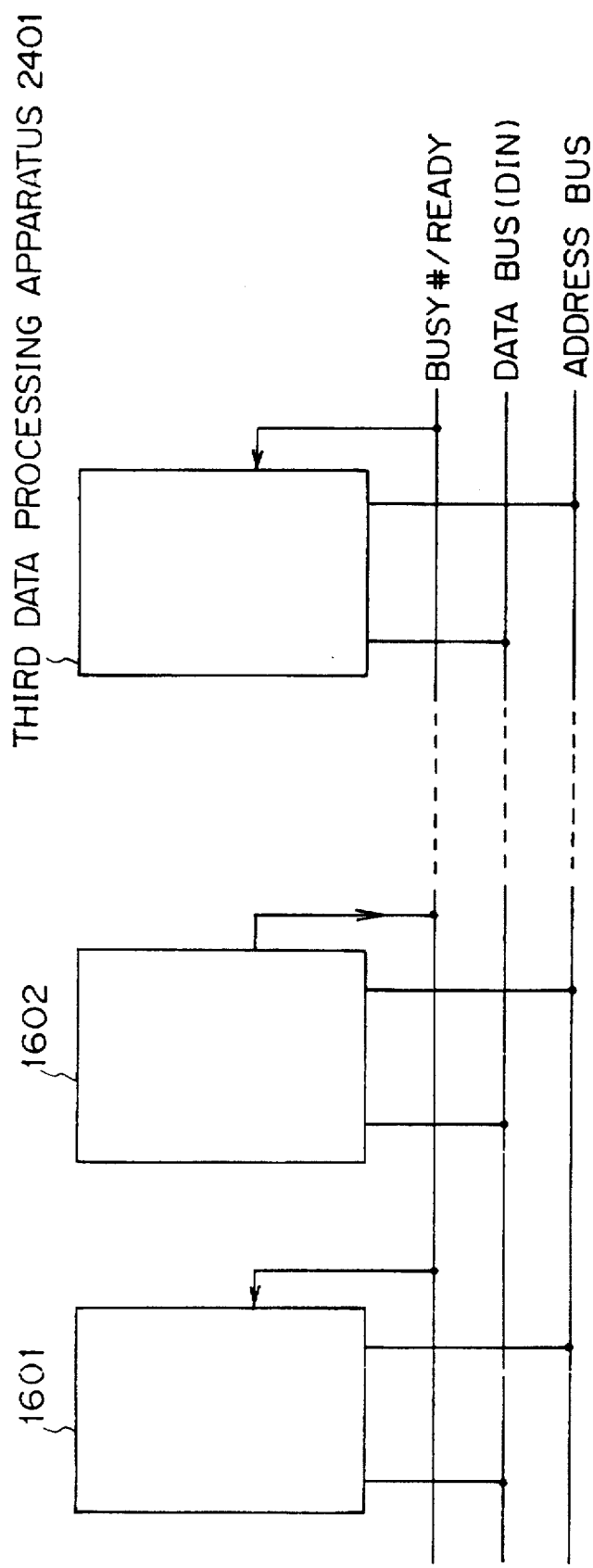
FIG. 24 is a schematic diagram showing an example of the system of the second preferred embodiment.

In the above-described second preferred embodiment, as shown in FIG. 16, the first data processing apparatus 1601 operates under the control of the second data processing apparatus 1602. When the second data processing apparatus 1602 writes write data DIN to the first data processing apparatus 1601, the first data processing apparatus 1601 sends the BUSY# signal or the READY signal to the second data processing apparatus 1602. On the other hand, as shown in FIG. 24, a third data processing apparatus 2401 which accesses the first data processing apparatus 1601 can be connected.

Third Preferred Embodiment

Next, the third preferred embodiment according to the basic construction shown in FIG. 8 will be described.

In this preferred embodiment, as with the first preferred embodiment, the slave processor 802 shown in FIG. 8 is a data processing apparatus which executes a vector operation or the like. In the third preferred embodiment, a construction with which the third problem of the related art reference can be solved is disclosed.

Figure 25:
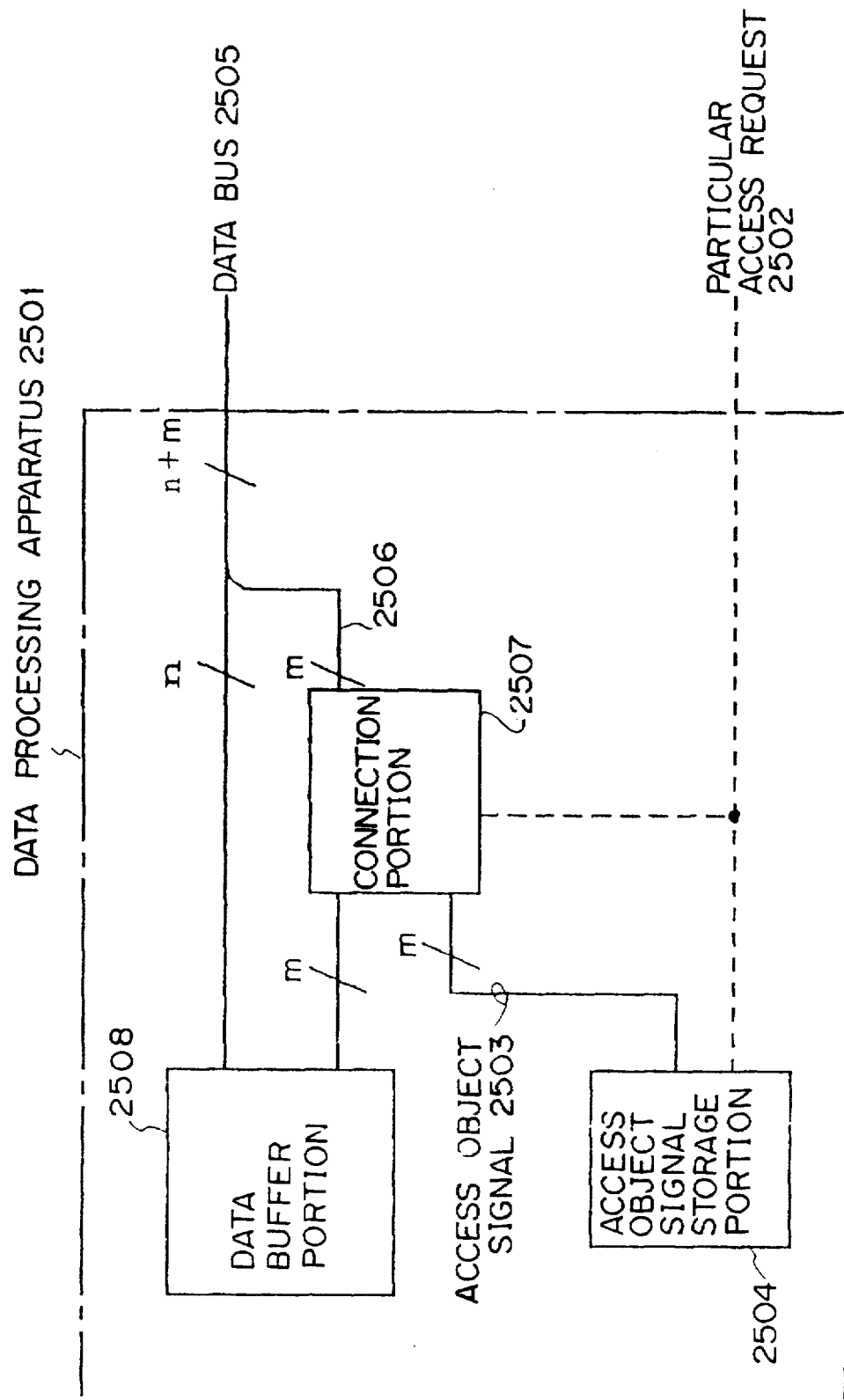
FIG. 25 is a schematic diagram showing the theoretical construction of the third preferred embodiment.

Before the third preferred embodiment is described, a theoretical construction thereof will be explained with reference to the theoretical block diagram of FIG. 25.

In the figure, reference numeral 2501 is a data processing apparatus which exchanges data with an external unit such as a CPU and performs data processing such as a vector operation.

The data processing apparatus 2501 includes an access object signal storage portion 2504 and a connection portion 2507.

The access object signal storage portion 2504 stores an access object signal 2503 in accordance with a particular access request 2502 received from the external unit.

The access object signal 2503 is, for example, a busy status indication signal (BSY bit) of one bit representing whether or not the apparatus is active. The particular access request is a read request which is used to read the busy status indication signal. In this case, the busy status indication signal, which is the access object signal 2503, is, for example, the active status indication signal BUSY#or the inactive status indication signal READY which are outputted from the operation control portion 1603 shown in FIG. 16 and from the signal activation portion 1701 shown in FIG. 17 according to the second preferred embodiment.

When the access request 2502 is inputted, the connection portion 2507 connects the access object signal storage portion 2504 to a particular bit line group 2506 with the same bits m (for example, m=1) as the access object signal 2503 of bit lines connected to a data bus 2505 connected to the external unit.

In this construction, a data buffer portion 2508 used for exchanging data with the external unit can be provided. In this case, when the connection portion 2507 has not received the particular access request 2502, the bit lines of n+m bits connected to the data bus 2505 connected to the external unit, are connected to the data buffer portion 2508. When the access request 2502 has been received, the access object signal storage portion 2504 is connected to the bit line group 2506 with the same bits as the bits m of the access object signal 2503 of the bit lines connected to the data bus 2505.

After the access request 2502 is received and an access operation for the access object signal 2503 is executed, when a retry request for a read operation is received, data stored in the data buffer portion 2508 can be sent directly to the data bus 2505.

In this theoretical construction, the access object signal storage portion 2504 has a data capacity for the number of bits necessary for the access object signal 2503. The connection portion 2507 connects the access object signal storage portion 2504 to the bit line group 2506 with the same bits as the bits m of the access object signal 2503 from the bit lines connected to the data bus 2505. Thus, all the bits of the data bus 2505, for example 64 bits, are not reconnected for the access object signal 2503. Consequently, the number of driven bits for control signals for the access object signal storage portion 2504 and the connection portion 2507 according to the access request signal 2502 becomes small and the wiring length thereof becomes short. As a result, the signal propagation delay for the control signals becomes small.

Thus, the timings for the entire system including the data processing apparatus can be easily designed. Since expensive parts are not necessary, the cost of the entire system can be reduced.

Figure 5:
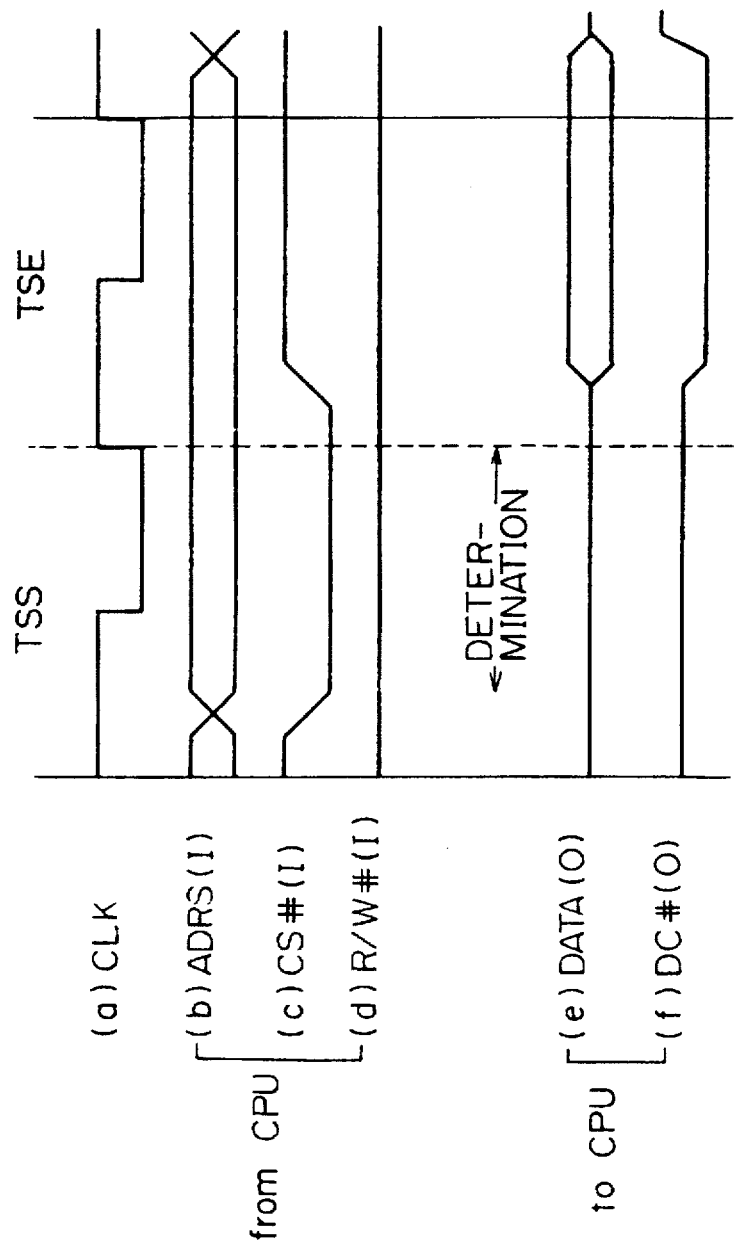
FIG. 5 is an operational timing chart for a basic slave read cycle.
Figure 6:
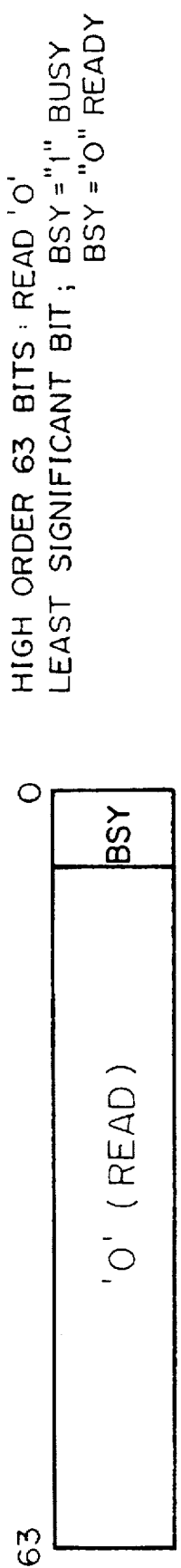
FIG. 6 is a schematic diagram showing the data format for a busy register with respect to a third problem of a related art reference.

Particularly, in a slave read access for the busy register of the slave processor, the highest speed slave read cycle can be assured (refer to the description for FIG. 5).

In addition, in the construction including the data buffer portion 2508, when a retry request for a read operation is received after the access request 2502 is received and an access operation therefor is executed, since data stored in the data buffer portion 2508 can be immediately sent to the data bus 2505, a buffer which stores data to be retried can be omitted.

An actual construction and an operation of the third preferred embodiment according to the above-mentioned theoretical construction will be described.

Figure 26:
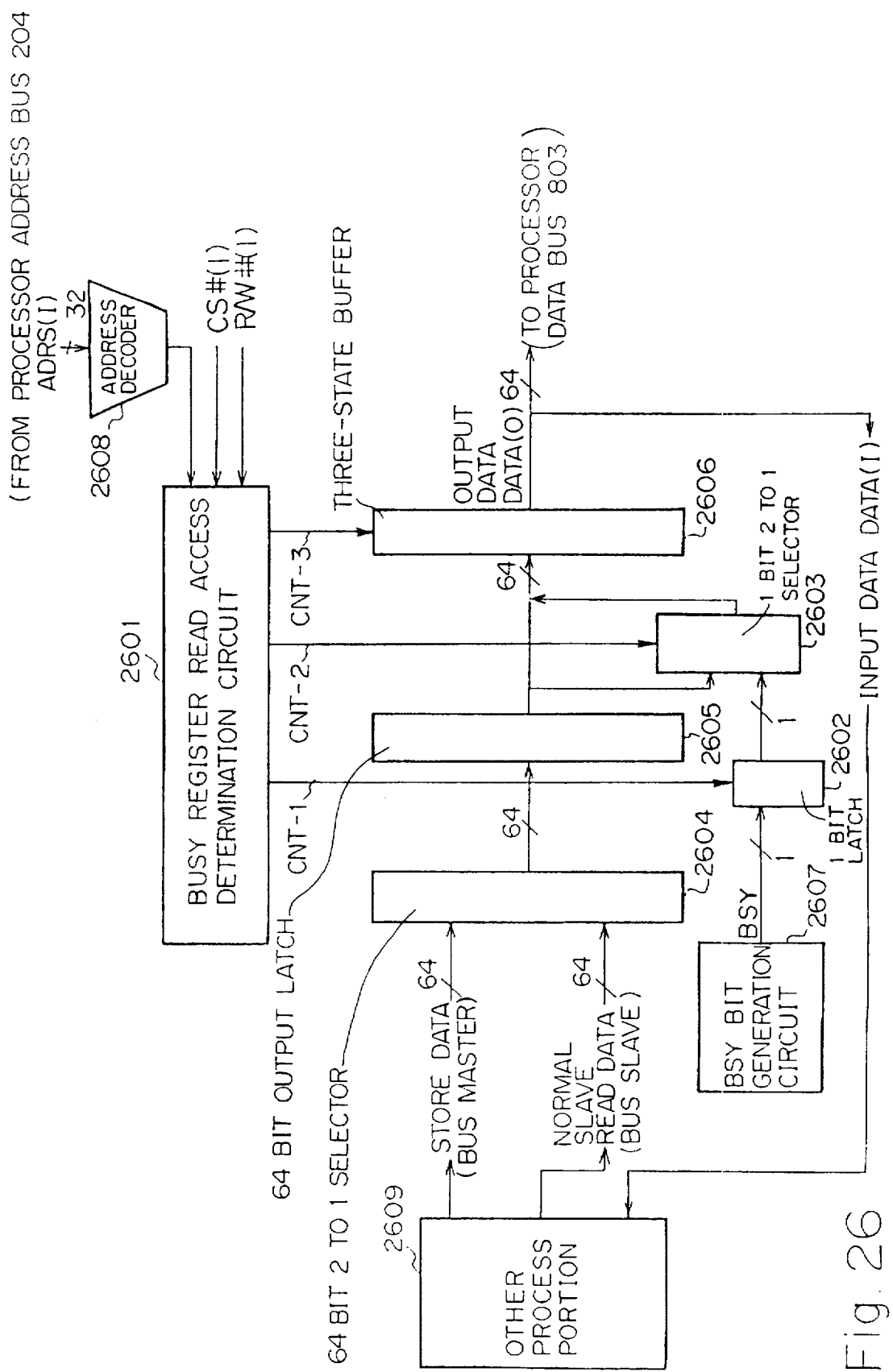
FIG. 26 is a schematic diagram showing the construction of the slave processor of the third preferred embodiment.

FIG. 26 is a block diagram of the slave processor 802 of FIG. 8 according to the third preferred embodiment.

Figure 4:
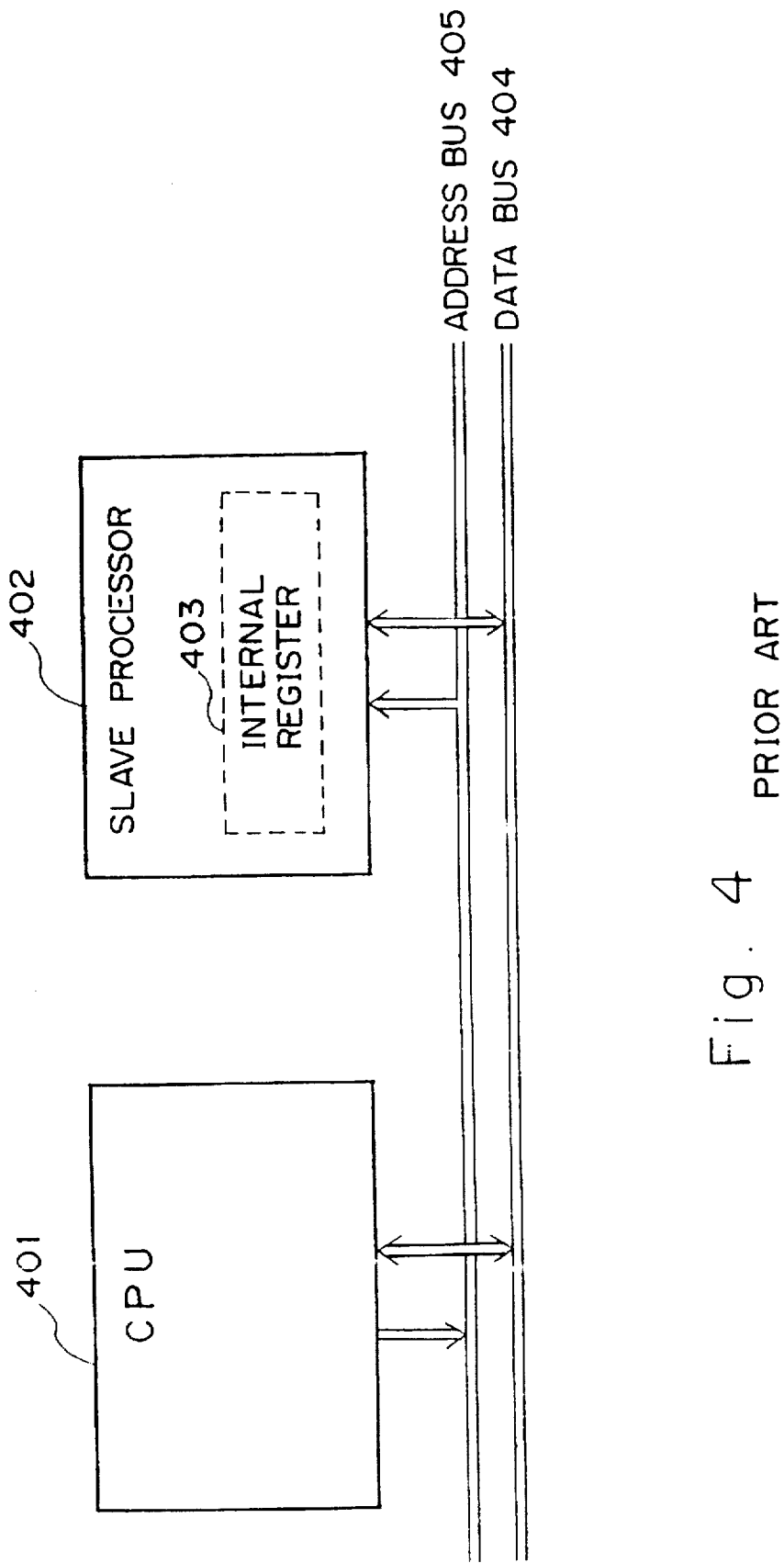
FIG. 4 is a schematic diagram showing standard connections between a CPU and a slave processor.

The operation sequence where the CPU 801 writes required information to an internal register (not shown in the figure) of the slave processor 802, activates the slave processor 802, reads required information from the internal register after the completion of the operation of the slave processor 802, and determines the completion thereof is the same as that of the related art reference shown in FIG. 4. The operation timings of the basic slave access cycles are also the same as those of the related art reference shown in FIG. 5.

In FIG. 26, the slave processor 802 includes an other-process portion 2609, an address decoder 2608, a busy register read access determination circuit 2601, a 64-bit 2-to-1 selector 2604, a 64-bit output latch 2605, a one-bit latch 2602, a BSY bit generation circuit 2607, a one-bit 2-to-1 selector 2603, and a three-state buffer 2606.

The other process portion 2609 executes, for example, a vector operation.

The address decoder 2608 decodes address data ADRS(I) received from the CPU 801 in a TSS cycle (see FIG. 5).

The busy register read access determination circuit 2601 determines whether or not a read access has occurred in a busy register by using the decoded result of the address decoder 2608 and the signal states of a CS#(I) signal and a R/W #(I) signal that the CPU 801 has outputted to a control bus (not shown).

Figure 27:
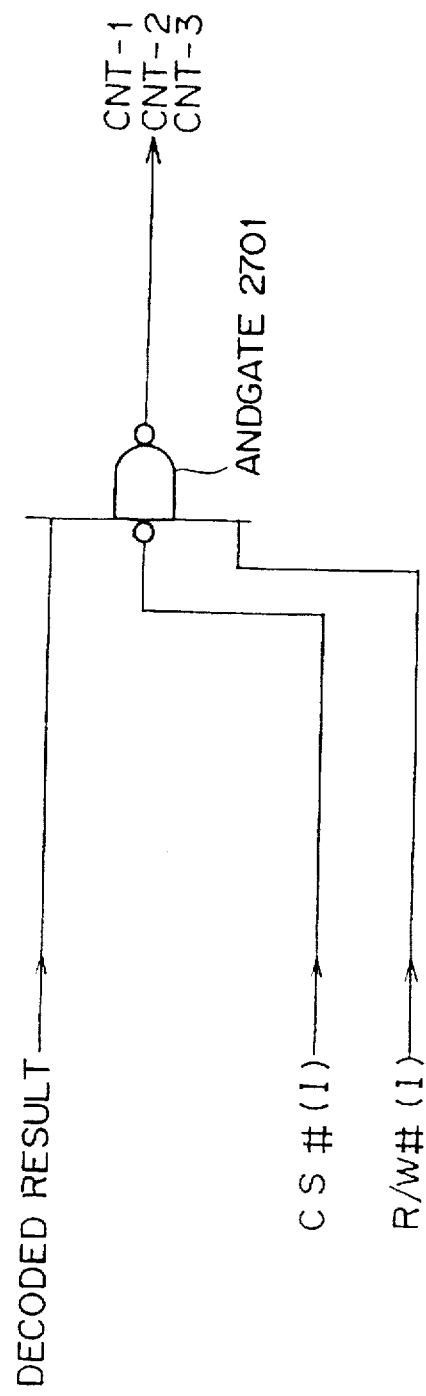
Fig. 27 is a schematic diagram showing the construction of the busy register read access determination circuit 2601 of FIG. 26.

FIG. 27 is a schematic diagram showing the construction of the busy register read access determination circuit 2601. The busy register read access determination circuit 2601 is constructed of an AND gate 2701. The AND gate 2701 ANDs the positive logic of the decoded result of the address decoder 2608 for the busy register read access determination circuit 2601, the negative logic of the CS#(I) signal, and the positive logic of the R/W#(I) signal. Thus, the AND gate 2701 outputs a control signal CNT-1, a control signal CNT-2, and a control signal CNT-3. Therefore, in the third preferred embodiment, the circuit which generates these control signals can be simply composed and the requirements for signal propagation delay and load of these signals are not severe.

The 64-bit 2-to-1 selector 2604 selects either store data or normal slave read data received from the other process portion 2609 according to a control signal received from a data output control circuit (not shown).

Figure 28:
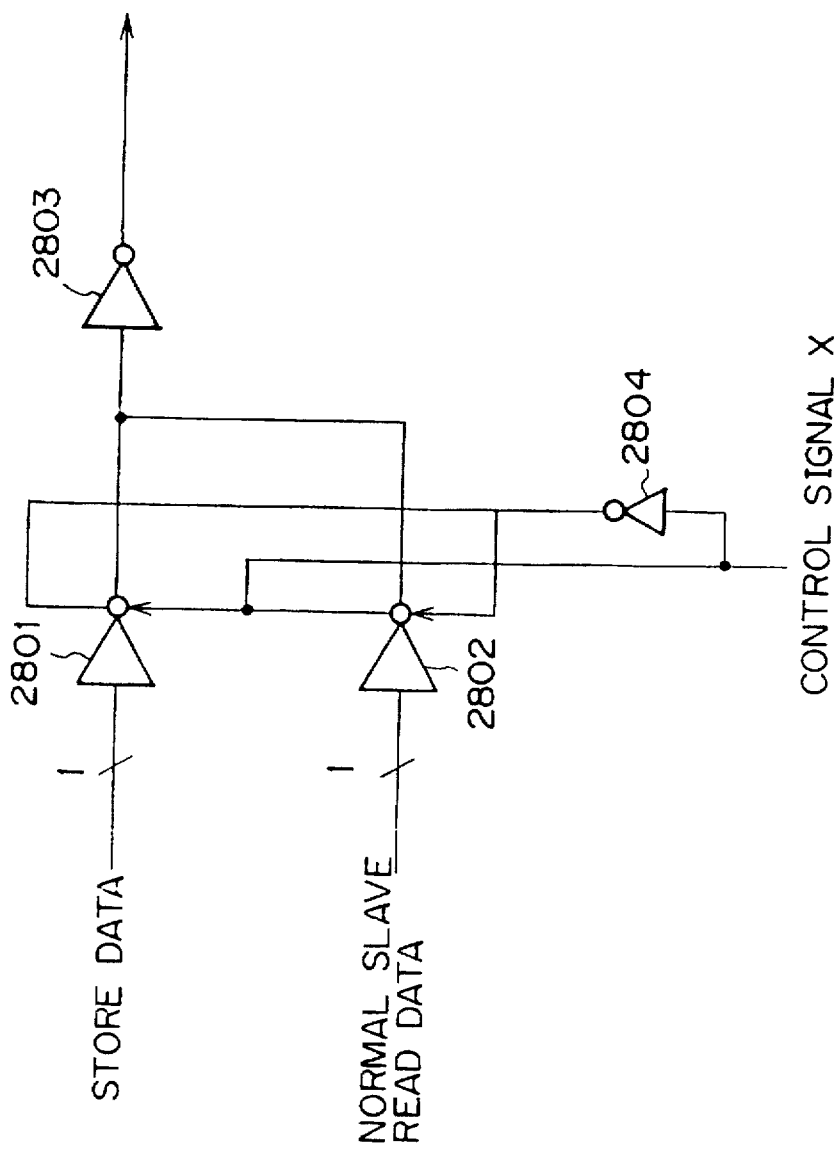
FIG. 28 is a schematic diagram showing the construction of one bit of the 64-bit 2-to-1 selector 2604 of FIG. 26.
Figure 30:
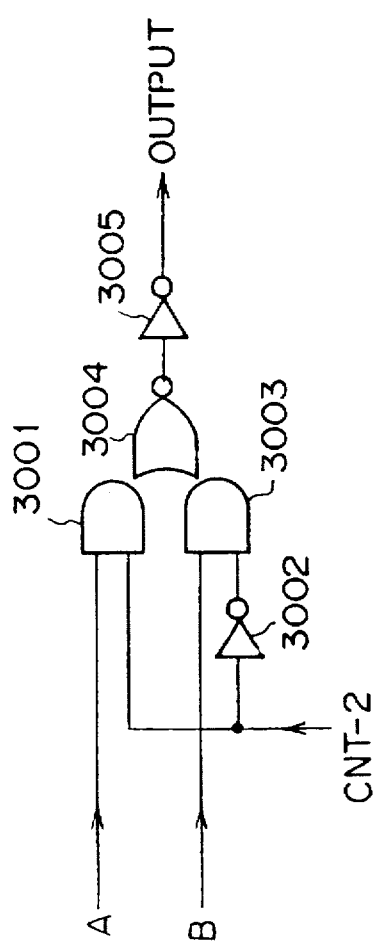
FIG. 30 is a schematic diagram showing the construction of the one-bit 2-to-1 selector 2603 of FIG. 26.

FIG. 28 is a schematic diagram showing the construction of one bit of the 64-bit 2-to-1 selector 2604. When the value of a control signal received from the data output control circuit (not shown) is "1", an invert buffer 2801 is turned on. Thus, the store data is outputted through the invert buffers 2801 and 2803. In contrast, when the value of the control signal X is "0", the output value of an inverter 2804 becomes "1" and thereby an invert buffer 2802 is turned on. Thus, the normal slave read data is outputted through the invert buffers 2802 and 2803. The 64-bit 2-to-1 selector 2604 can be constructed of another circuit as shown in FIG. 30 which will be described later.

Figure 29:
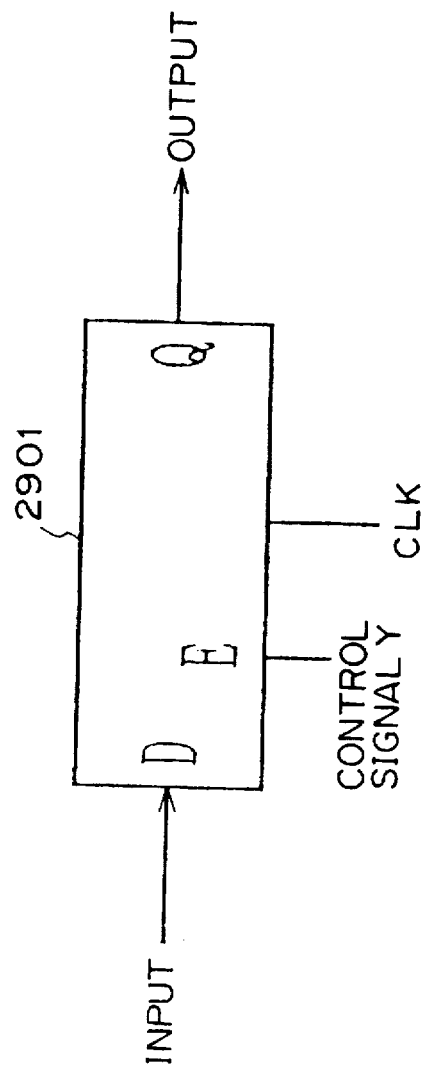
FIG. 29 is a schematic diagram showing the construction of one bit of the 64-bit output latch 2605 of FIG. 26 and the construction of one-bit latch thereof.

The 64-bit output latch 2605 latches the output of the 64-bit 2-to-1 selector 2604 according to a control signal (not shown) received from the data output control circuit (not shown). FIG. 29 is a schematic diagram showing the construction of one bit of the 64-bit output latch 2605. When a control signal Y sent to an enable terminal E from the data output control circuit (not shown) becomes active, the output of the 64-bit 2-to-1 selector 2604 received at an input terminal D is latched in synchronization with a basic clock CLK (see FIG. 5) and thereby the output of an output terminal Q is settled.

On the other hand, the one-bit latch 2602 latches a BSY bit received from the BSY bit generation circuit 2607 according to the control signal CNT-1 received from the busy register read access determination circuit 2601. The construction of the one-bit latch 2602 is the same as that of the one-bit latch 2901 shown in FIG. 29.

When the CPU 801 designates start information for the slave processor 802 and the slave processor 802 becomes active, the BSY bit generation circuit 2607 generates the BSY bit with a value of "1". When the slave processor 802 is inactive, the BSY bit generation circuit 2607 generates the BSY bit with a value of "0". When the CPU 801 designates the start information for the slave processor 802, the BSY bit generation circuit 2607 immediately generates the BSY bit before the slave processor 802 interprets a start command according to the start information. In this construction, a malfunction where the slave processor 802 is accessed before it generates the BSY bit can be prevented. This construction has been disclosed in the second preferred embodiment shown in FIG. 18 and so forth. The BSY bit generation circuit 2607 accords with the busy control portion 1803 and the busy output portion 1804 shown in FIG. 18. The BSY bit with a value of "1" accords with the BUSY# signal shown in FIG. 18. The BSY signal with a value of "0" accords with the READY signal shown in FIG. 18. The start information accords with the "ON information" set to the start bit of the write data DIN of the second preferred embodiment.

The one-bit 2-to-1 selector 2603 selects either the least significant bit of the output of the 64-bit output latch or the BSY bit latched by the one-bit latch 2602 according to the control signal CNT-2 received from the busy register read access determination circuit 2601. FIG. 30 is a schematic diagram showing the construction of the one-bit 2-to-1 selector 2603. When the value of the control signal CNT-2 is "1", the logic of the signal inputted to the input terminal A from the 64-bit output latch 2605 (see FIG. 26) is sent to the output of the one-bit 2-to-1 selector 2603 through an AND gate 3001, a NOR gate, and an inverter 3005. When the value of the control signal CNT-2 is "0", the logic of the signal which is inputted from the one-bit latch 2602 (FIG. 26) to the input terminal B is sent to the output of the one-bit 2-to-1 selector 2603 through the AND gate 3003, the NOR gate 3004, and the inverter 3005. The one-bit 2-to-1 selector 2603 can be constructed using the circuit shown in FIG. 28.

The three-state buffer 2606 stores the output of the 64-bit output latch 2605 as the high order 63 bits and the output of the one-bit 2-to-1 selector 2603 as the least significant bit according to the control signal CNT-3 received from the busy register read access determination circuit 2601 or a control signal received from the data output control circuit (not shown).

Figure 31:
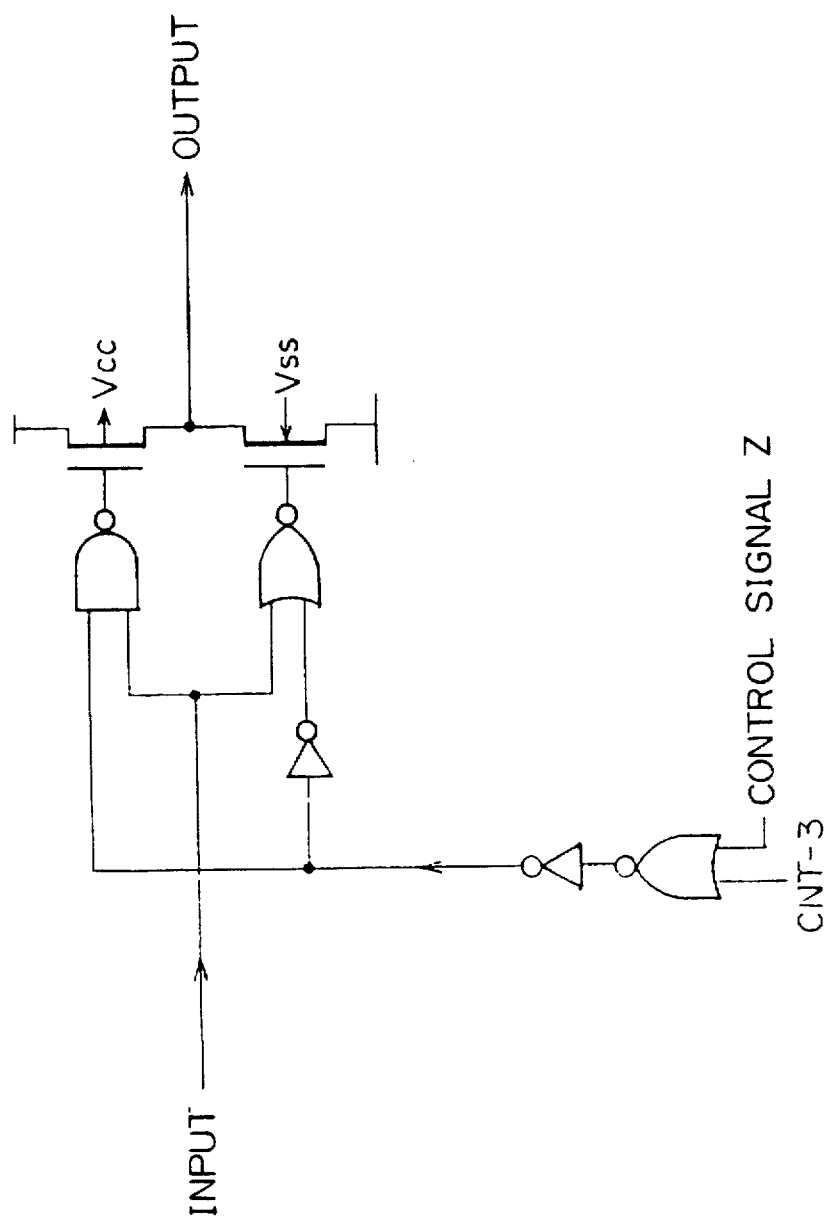
FIG. 31 is a schematic diagram showing the construction of one bit of the three-state buffer 2606 of FIG. 26.

FIG. 31 is a schematic diagram showing the construction of one bit of the three-state buffer 2606. When the value of the control signal CNT-3 or a control signal Z received from the data output control circuit (not shown) is "0", the output enters the high impedance state. In contrast, when the value of the control signal CNT-3 or the control signal Z is "1", the logic of the input composed of the high order 63 bits of the output of the 64-bit output latch 2605 and the least significant bit of the output of the one-bit 2-to-1 selector 2603 is outputted.

Input data DATA(I) received from the CPU 801 or from the main storage unit 806 or the like via the cache memory 805 through the processor data bus 803 is sent to the other process portion 2609 through an input buffer (not shown).

When the slave processor 802 shown in FIGS. 26 to 31 is the same vector data processing apparatus as the first preferred embodiment, the basic construction of the slave processor 802 shown in FIG. 26 is the same as the construction of the first preferred embodiment shown in FIG. 9. In this case, the busy register read access determination circuit 2601, the one-bit latch 2602, the one-bit 2-to-1 selector 2603, the 64-bit 2-to-1 selector 2604, the 64-bit output latch 2605, the three-state buffer 2606, and the BSY bit generation circuit 2607 which are shown in FIG. 26 are contained in the BU 903 shown in FIG. 9. The address decoder 2608 shown in FIG. 26 is contained in the AU 905 shown in FIG. 9. In addition, the other process portion 2609 is contained in part of the VU 901, the CBU 904, the CU 902, and the BU 903 and part of the AU 905 shown in FIG. 9.

Figure 32:
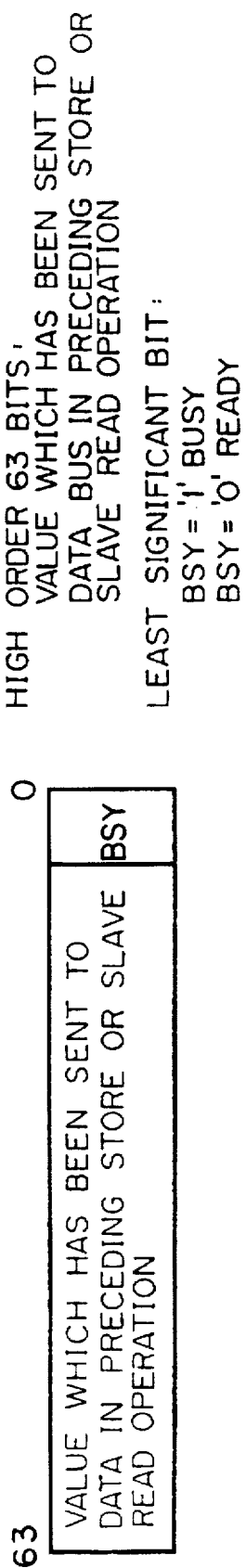
FIG. 32 is a schematic diagram showing the data format of the busy register-of the third preferred embodiment.

FIG. 32 is a schematic diagram showing the data format of a busy register value of the third preferred embodiment. The high order 63 bits of the register value is the same as the value which was sent to the processor data bus 803 in the preceding slave store or slave read operation. The least significant bit is a busy bit BSY. When the value of the busy bit BSY is "1", it represents a busy status. When the value of the busy bit BSY is "0", it represents a ready status. Thus, in the third preferred embodiment, only the least significant bit of the busy register value is meaningful. In contrast, the high order 63 bits are meaningless. As a result, when the output of the busy register value is controlled, it is necessary to drive only the least significant bit.

Next, the operation of the third preferred embodiment with the above construction will be described.

The busy register read access determination circuit 2601 (see FIG. 26) determines whether or not a read access to a busy register has occurred. When the determination circuit 2601 has not determined the read access, it performs the following control sequence. First, the determination circuit 2601 sets each value of the control signals CNT-1, CNT-2, and CNT-3 to "0". As a result, the 64-bit 2-to-1 selector 2604 selects either store data or normal slave read data received from the other process portion 2609 according to a control signal (control signal X of FIG. 28) received from a data output control circuit (not shown). The 64-bit output latch 2605 latches the store data or the normal slave read data received from the 64-bit 2-to-1 selector 2604 according to a control signal (control signal Y of FIG. 29) received from the data output control circuit (not shown). Since the value of the control signal CNT-2 is "0", the one-bit 2-to-1 selector 2603 selects the least significant bit of the output of the 64-bit output latch 2605. The three-state buffer 2606 receives the store data or the normal slave read data received from the 64-bit output latch 2605 according to a control signal (control signal Z of FIG. 31) received from the data output control circuit (not shown in the figure). As a result, the store data or the normal slave read data as output data DATA(O) is sent to the processor data bus 803.

The store data is 64-bit data stored in the main storage unit 806 (see FIG. 8) received from the other process portion 2609 through the cache memory 805 when the slave processor 802 is the bus master. On the other hand, the normal slave read data is data which is read from the other process portion 2609 to the CPU 801 or the main memory unit 806 (see FIG. 8) when the CPU is the bus master and the slave processor 80 is the bus slave.

In contrast, when the busy register read access determination circuit 2601 has determined the read access, it performs the following operation sequence in a TSE cycle following a TSS cycle (see FIG. 5). First, the determination circuit 2601 controls the one-bit latch 2602 by using the control signal CNT-1 so that it latches the BSY bit value received from the BSY bit generation circuit 2607. In addition, the determination circuit 2601 controls the one-bit 2-to-1 selector 2603 by using the control signal CNT-2 so that it latches the BSY bit value received from the one-bit latch 2602. The determination circuit 2601 controls the three-state buffer 2606 by using the control signal CNT-3 so that it receives a busy register value composed of the high order 63 bits of the output of the 64-bit output latch 2605 and the least significant bit of the output of the one-bit 2-to-1 selector 2603. As a result, the busy register value as output data DATA(O) is sent to the processor data bus 803. Thus, in the third preferred embodiment, the busy register is not actually present. When the BSY bit is received from the BSY bit generation circuit 2607 in the three-state buffer 2606 through the one-bit latch 2602 and the one-bit 2-to-1 selector 2603, the busy register value is generated.

Figure 33:
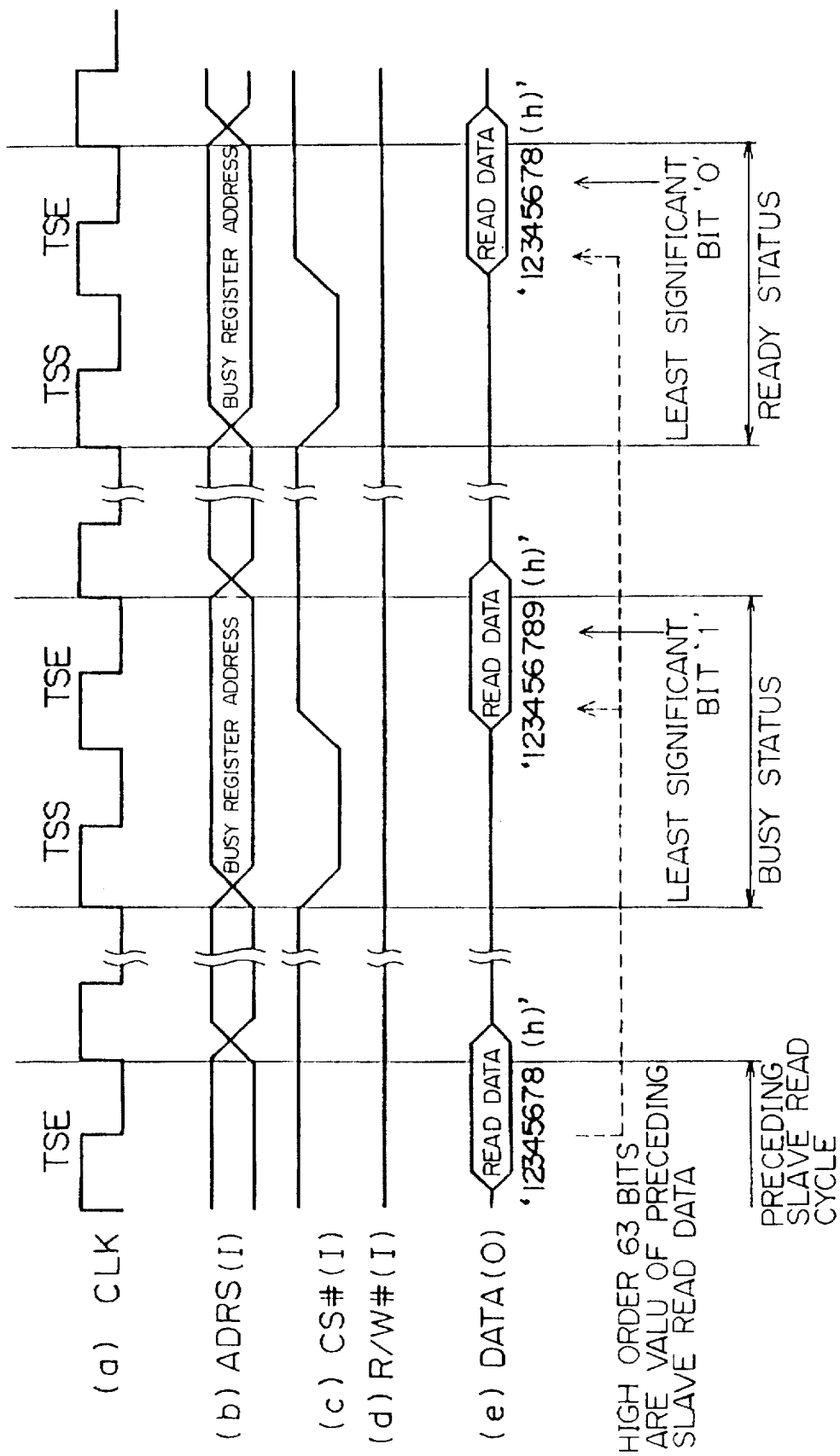
FIG. 33 is a timing chart showing a busy register read operation in a busy/ready state after a normal slave read cycle according to the third preferred embodiment.

FIG. 33 shows the operation where a slave read cycle is executed for a busy register representing a busy status or a ready status after a normal slave read cycle is executed.

In the normal slave read cycle, normal slave read data which is for example "12345678(h)" as the output data DATA(O) is latched in the 64-bit output latch 2605. In this operation, the CPU 801 becomes the bus master and the slave processor 802 becomes the bus slave. The other process portion 2609 (see FIG. 26) sends the data to the CPU 801 or the main memory unit 806 (see FIG. 8).

Next, when a slave read cycle is executed for the busy register representing the busy status, in a TSS cycle in synchronization with a basic clock CLK shown in (a), the CPU 801 sends to the processor address bus 804 (see FIG. 8) the address of the busy register shown in (b) and outputs to a control bus (not shown in the figure) a CS#(I) signal at low level shown in (c) and a R/W#(I) signal representing a read operation shown in (d). Thus, the busy register read access determination circuit 2601 determines whether or not a read access to the busy register has occurred. When the determination circuit 2601 has determined the read access, in a TSE cycle following the TSS cycle, the busy register value "12345678(h)" of 64 bits whose least significant bit is set to "1" representing a busy status is sent from the three-state buffer 2606 (see FIG. 26) to the processor data bus 803 (see FIG. 8). The CPU 801 (see FIG. 8) ignores the high order 63 bits of the busy register value sent to the processor data bus 803 and determines only the least significant bit. Thus, the CPU 801 knows that the slave processor 802 is busy.

In addition, a slave read cycle for the busy register representing a ready status is executed in the same manner. In other words, when the CPU 801 accesses the busy register in the TSS cycle, the busy register value "2345678(h)" of 64 bits whose least significant bit is set to "0" representing a ready status is sent from the three-state buffer 2606 (see FIG. 26) to the processor data bus 803 /see FIG. 8). The CPU 801 (see FIG. 8) ignores the high order 63 bits of the busy register value sent to the processor data bus and determines only the least significant bit. Thus, the CPU 801 knows that the slave processor 802 is in a ready status.

Figure 34:
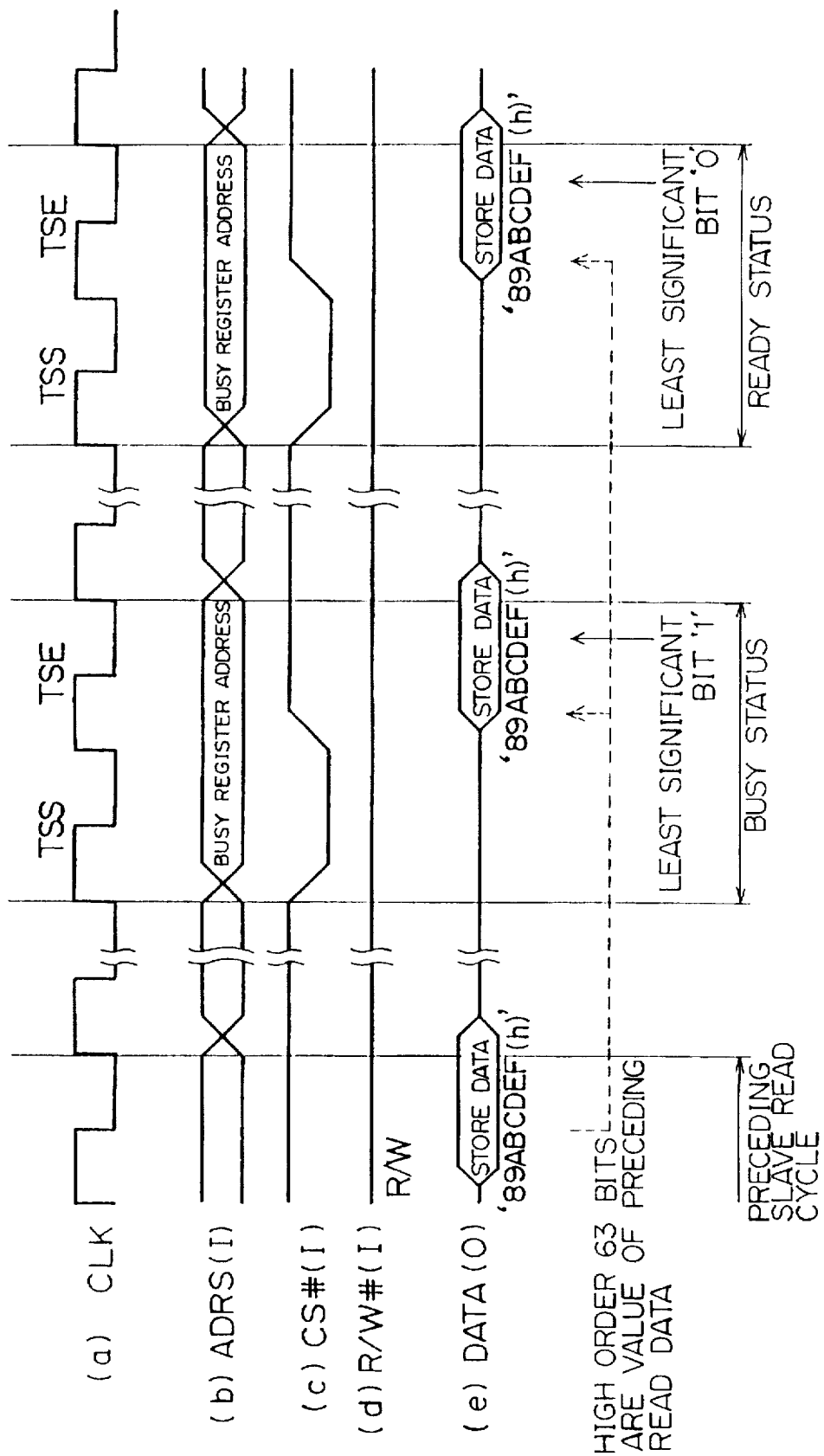
FIG. 34 is a timing chart showing a busy register read operation in a busy/ready state after a store cycle according to the third preferred embodiment.

FIG. 34 shows signal transitions of the operation where a slave read cycle is executed for the busy register representing a busy status or a ready status after a store cycle is executed.

In the store cycle, data such as "89ABCDEF(h)" as output data DATA(O) is latched in the 64-bit output latch 2605 (see FIG. 26). In this operation, the slave processor 802 becomes the bus master and data is sent from the other process portion 2609 (see FIG. 26) to the main memory unit 806 (see FIG. 8) through the cache memory 805.

As with the construction shown in FIG. 33, when a slave read cycle is executed for the busy register representing a busy status, in the TSS cycle in synchronization with the basic clock CLK shown in (a), the CPU 801 performs accesses shown in (b) to (d). Thus, in the TSE cycle, the busy register value "89ABCDEF(h)" of 64 bits whose least significant bit is set to "1" representing a busy status is sent from the three-state buffer 2606 (see FIG. 26) to the processor data bus 803 (see FIG. 8). The CPU 801 (see FIG. 8) ignores the high order 63 bits of the busy register value sent to the processor data bus 803 and determines only the least significant bit. Thus, the CPU 801 knows that the slave processor 802 is busy.

Thereafter, a slave read cycle for the busy register representing a ready status is executed in the same manner. In other words, when the CPU 801 accesses the busy register in the TSS cycle, the busy register value "89ABCDEF(h)" of 64 bits whose least significant value is set to "0" representing a ready status is sent from the three-state buffer 2606 (see FIG. 26) to the processor bus 803 (see FIG. 8). The CPU 801 (see FIG. 8) ignores the high order 63 bits of the busy register value sent to the processor data bus 803 and determines only the least significant bit. Thus, the CPU 801 knows that the slave processor 802 is ready.

As described in the example of the operation shown in FIGS. 33 and 34, in the third preferred embodiment, when the CPU 801 performs a read access to the busy register of the slave processor 802, this read access is detected by the busy register start read access determination circuit 2601 in the TSS cycle. In the next TSE cycle, the busy register value is sent to the processor data bus 803 through the one-bit latch 2602, the one-bit 2-to-1 selector 2603, and the three-state buffer 2606.

Figure 7:
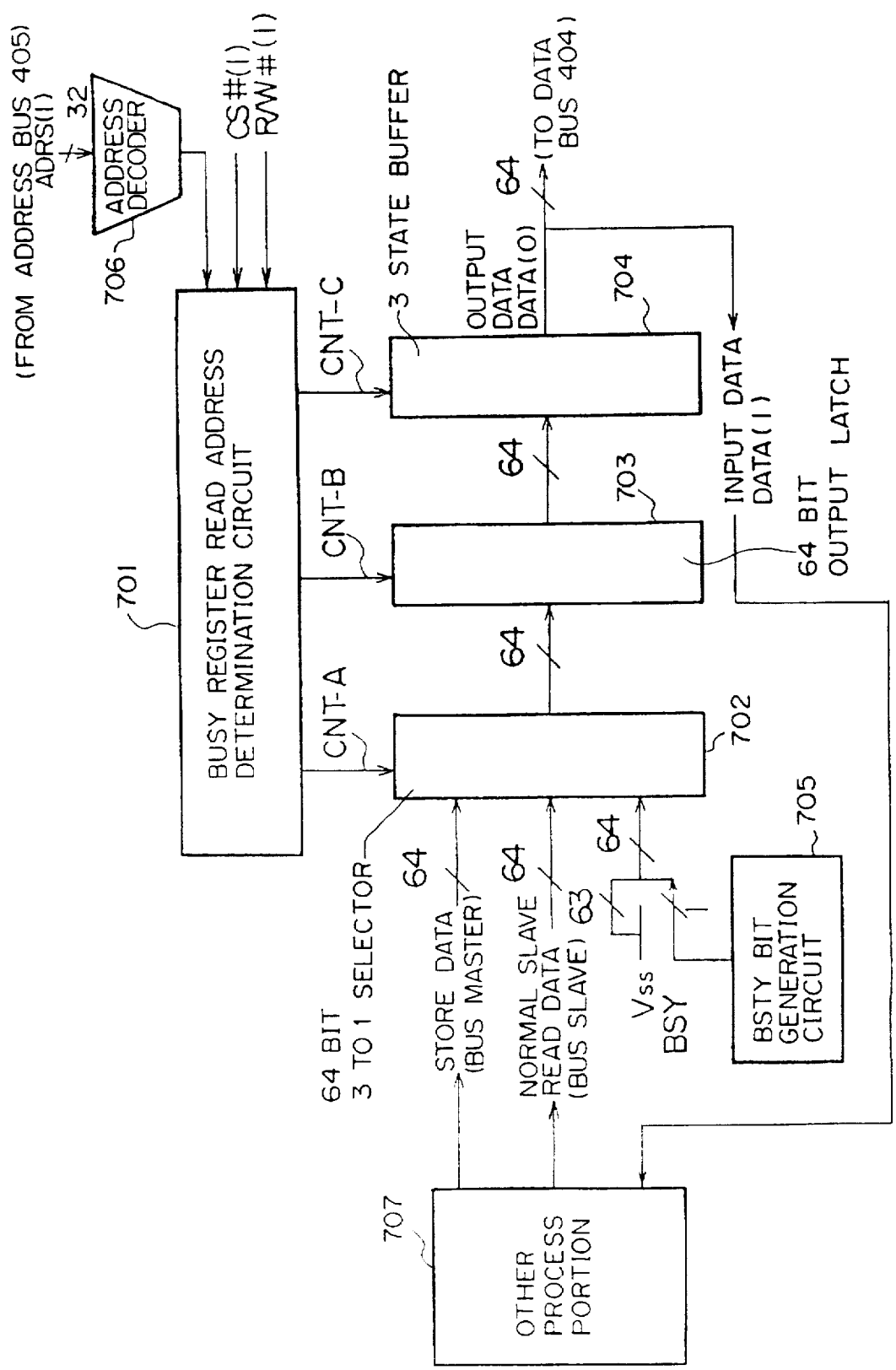
FIG. 7 is a schematic diagram showing the construction of a slave processor with respect to the third problem of the related art reference.
Figure 35:
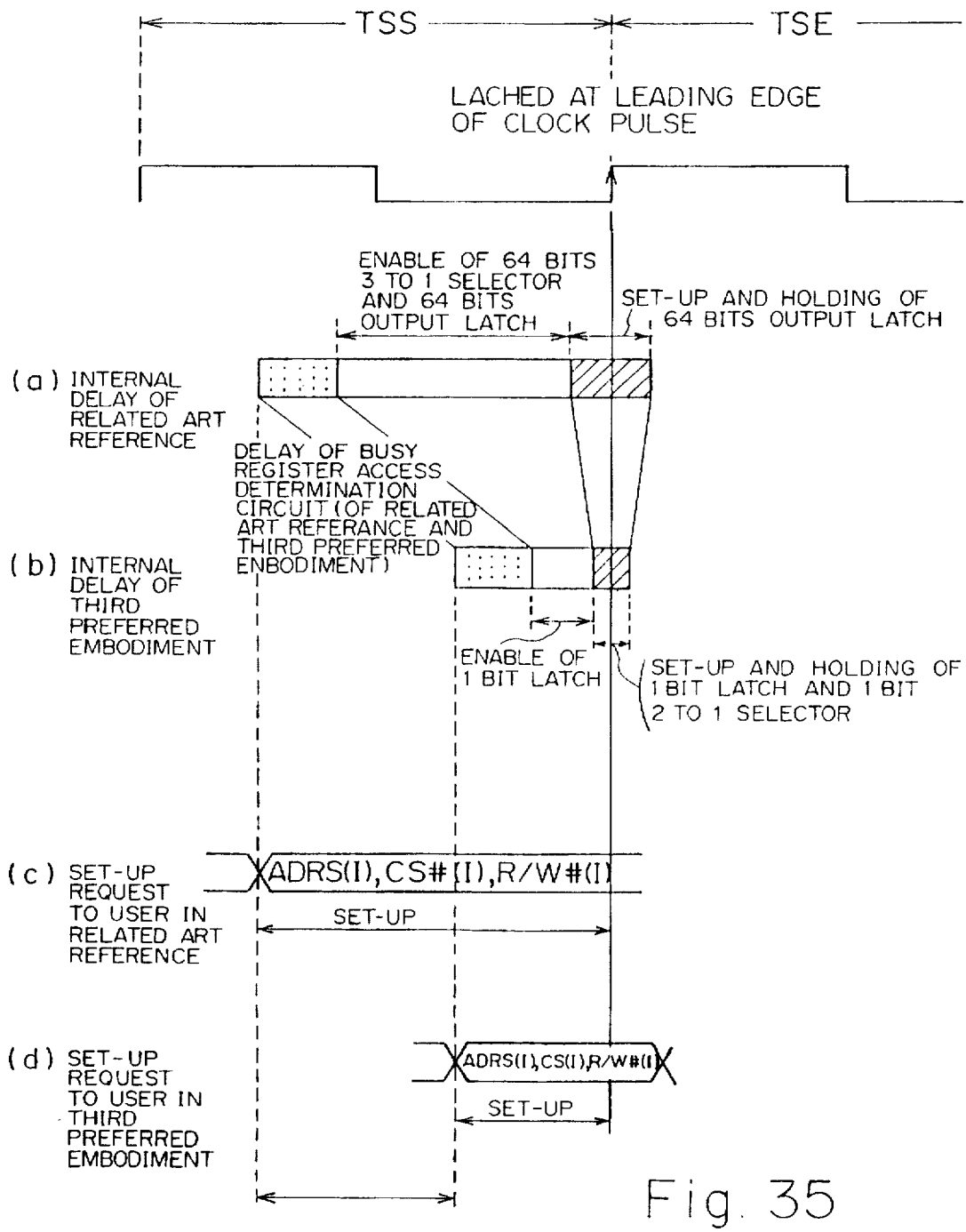
FIG. 35 is a schematic diagram for comparing the operation of the third preferred embodiment with the operation of the related art reference.

FIG. 35 is a schematic diagram for comparing the third preferred embodiment with the related art reference shown in FIG. 7.

As shown in (a) and (b) in FIG. 35, the signal propagation delay of the busy register start access determination circuit is the same as that of the circuit 2601 according to the third preferred embodiment shown in FIG. 26 and the circuit 701 of the related art reference shown in FIG. 7.

In the related art reference, since the number of bits driven in the control signals CNT-A and CNT-B shown in FIG. 7 is as large as 64 bits and thereby the signal propagation delay is large, the period for which the 64-bit 3-to-1 selector 1702 shown in FIG. 7 is operated and the input of the 64-bit output latch 2605 is enabled and the period for which the 64-bit output latch 2605 is set up and held are long as shown in (a) in FIG. 35. On the other hand, in the third preferred embodiment, the number of bits each driven in the control signals CNT-1 and CNT-2 shown in FIG. 26 is as small as one bit and the signal propagation delay thereof is small. Thus, the period for the input of the one-bit latch 2602, shown in FIG. 26, is enabled and the one-bit 2-to-1 selector 2603 is set up and held within a short period as shown in (b) in FIG. 35.

Thus, as shown in (c) and (d), in the TSS cycle, the timing for which the CPU 401 designates the address data ADRS(I), the CS#(I) signal, and the R/W#(I) signal for the slave processor 402 according to the third preferred embodiment is shorter than that according to the related art reference. As a result, the timing for which the CPU 401 designates address data ADRS(I) and so forth for the slave processor 402, according to the third preferred embodiment, can be more easily designed than that according to the related art reference.

In the system shown in FIG. 8, when the CPU 801 or the slave processor 802 becomes the bus master and it exchanges data with the main memory unit 806 through the cache memory 805, the cache memory 805 may require the same data so as to obtain uniformity of cache data. This request is termed a retry request (hereinafter referred to as the RETRY#(I) request). A cycle in which the same command is executed according to the RETRY#(I) request, is referred to as a retry cycle.

Figure 36:
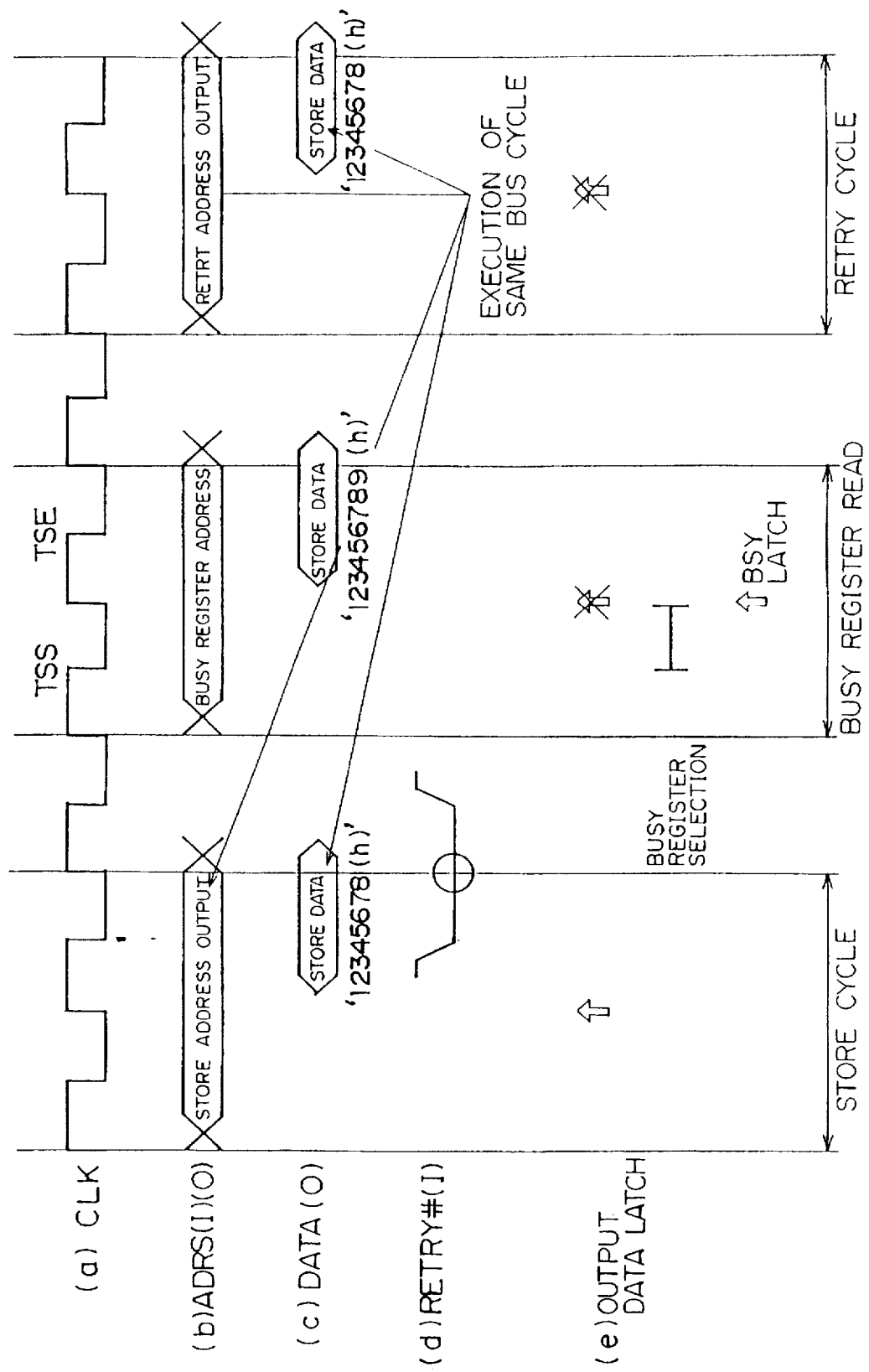
FIG. 36 is a timing chart showing a busy register read operation in a retry cycle according to the third preferred embodiment.

FIG. 36 is a schematic diagram showing the operation where a slave read cycle for the busy register is executed between a store cycle and a retry cycle.

In the store cycle, store data for example "12345678(h)" as output data DATA(O) is latched in the 64-bit output latch (see FIG. 26).

Next, when a slave read cycle for the busy register is executed as with the operation shown in FIG. 33, in a TSS cycle in synchronization with a basic clock CLK, shown in (a) of FIG. 36, the CPU 801 performs accesses shown in (b) to (d). In a TSE cycle, the busy register value "12345678(h)" of 64 bits whose least significant bit is set to "1" representing a busy status is sent from the three-state buffer 2606 (see FIG. 26) to the processor data bus 803 (see FIG. 8). The CPU 801 (see FIG. 8) ignores the high order 63 bits of the busy register value sent to the processor data bus 803 and determines only the least significant bit. Thus, the CPU 801 knows that the slave processor 802 is busy.

When a retry cycle for the store cycle is executed, the store data "12345678(h)" is still stored in the 64-bit output latch 2605 (see FIG. 26). Thus, as shown in (e), it is not necessary to relatch the store data in the 64-bit output latch 2605. As a result, the content of the 64-bit output latch 2605 can be immediately sent to the processor data bus 803. Consequently, in the third preferred embodiment, a buffer which stores data to be retried can be omitted.

Fourth Preferred Embodiment

Next, the fourth preferred embodiment according to the basic construction shown in FIG. 8 will be described.

In this preferred embodiment, as with the first preferred embodiment, the slave processor 802 shown in FIG. 8 is a data processing apparatus which executes for example a vector operation. In the fourth preferred embodiment, as with the third preferred embodiment, a construction with which the third problem of the related art reference can be solved is disclosed.

Before the fourth preferred embodiment is described, the theoretical construction of the fourth preferred embodiment will be explained.

In the fourth preferred embodiment, the slave processor 802 has a data buffer portion which exchanges data with an external unit connected to a data bus.

The slave processor 802 further includes a buffer control portion. When the external unit sends a particular access request to the data buffer portion, the buffer control portion causes a particular bit group of the data buffer portion to store an access object signal. The particular bit group has the same number of bits as the access object signal. The access request and the access object signal of the fourth preferred embodiment are the same as those of the third preferred embodiment.

In the above-mentioned theoretical construction, when an access is performed by using the access object signal, the buffer which stores the access object signal can be substituted with part of a bit group constructing the data buffer portion. Thus, the number of bits for the control signals which drive the part of the bit group can be reduced. In addition, the buffer which stores the access object signal can be omitted.

Next, a real construction and an operation of the fourth preferred embodiment according to the fourth preferred embodiment will be described.

Figure 37:
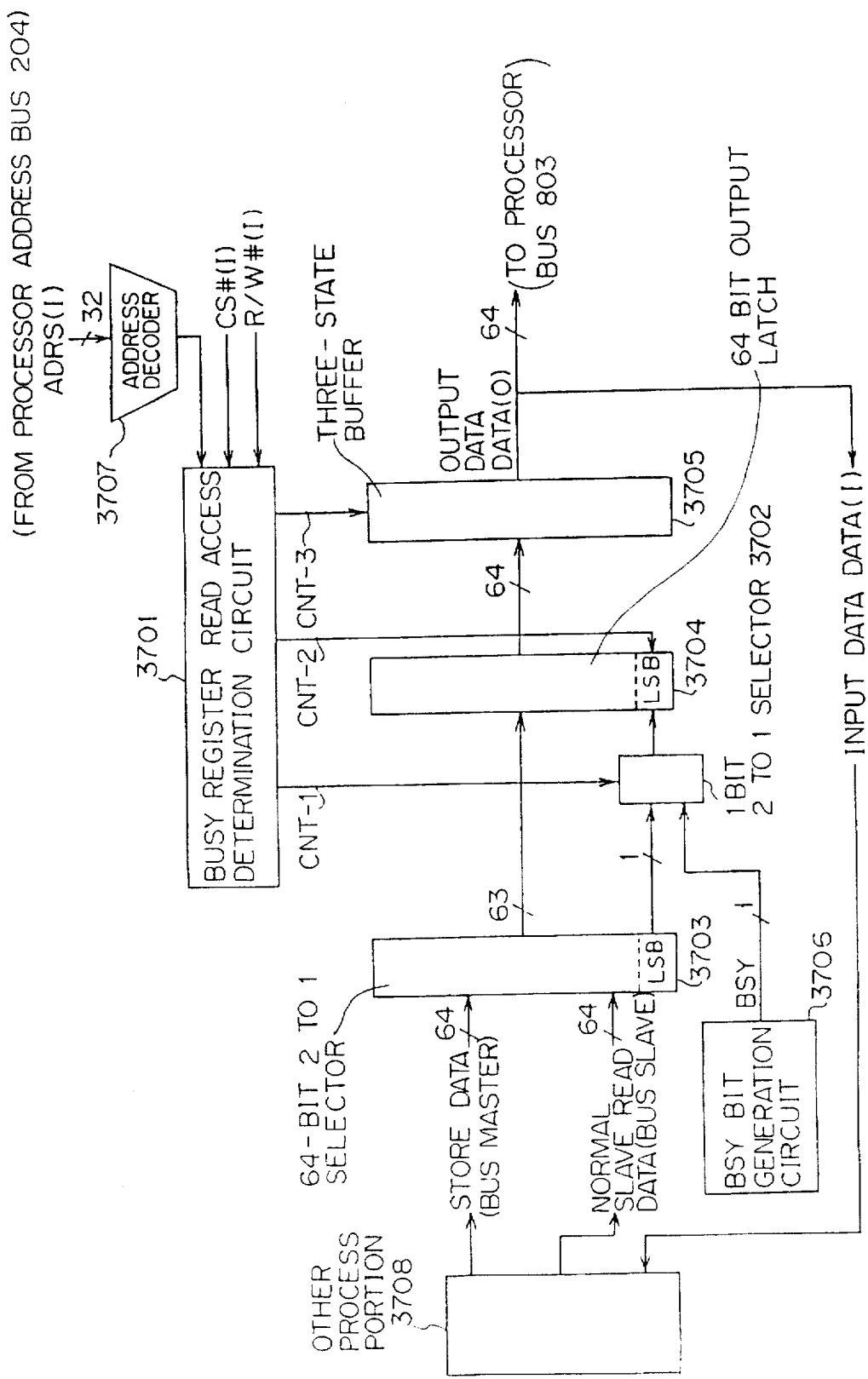
FIG. 37 is a schematic diagram showing the construction of the slave processor according to the fourth preferred embodiment.

FIG. 37 is a block diagram of the slave processor 802 shown in FIG. 8 according to the fourth preferred embodiment.

The difference between the fourth preferred embodiment shown in FIG. 37 and the third preferred embodiment shown in FIG. 26 is that a 64-bit output latch 3704 has both functions of the one-bit latch 2602 and the 64-bit output latch 2605 shown in FIG. 26.

The portions denoted by reference numerals 3701, 3703, and 3705 to 3708 shown in FIG. 37 have the same functions as the portions denoted by reference numerals 2601, 2604, and 2606 to 2609, respectively.

A one-bit 2-to-1 selector 3702 selects either the least significant bit (LSB) of the output of the 64-bit 2-to-1 selector 3703 or the BSY bit received from the BSY bit generation circuit 3706 according to a control signal CNT-1 received from the busy register read access determination circuit 3701. The construction of the selector 3702 is the same as those shown in FIGS. 28 and 30.

The 64-bit output latch 3704 receives the high order 63 bits of the 64-bit 2-to-1 selector 3703 at the high order 63 bits thereof and the output of the one-bit 2-to-1 selector 3702 at the least significant bit (LSB) thereof. An enable control terminal of the high order 63 bits of the 64-bit output latch 3704 receives a control signal from a data output control circuit (not shown). In addition, a least significant bit enable control terminal of the least significant bit of the latch receives a control signal where a control signal CNT-2 received from the busy register read access determination circuit 3701 and a control signal received from the data output control circuit (not shown) are ORed. The construction of each bit of the latch is the same as that shown in FIG. 29.

When the slave processor 802 shown in FIG. 27 is a vector data processing apparatus the same as the first preferred embodiment, the basic construction of the slave processor 802 shown in FIG. 37 is the same as that shown in FIG. 9 according to the first preferred embodiment. In this case, the busy register read access determination circuit 3701, the one-bit 2-to-1 selector 3702, the 64-bit 2-to-1 selector 3703, the 64-bit output latch 3704, the three-state buffer 3705, and the BSY bit generation circuit 3706 which are shown in FIG. 37 are contained in the BU 903 shown in FIG. 9. The address decoder 3707 shown in FIG. 37 is contained in the AU 905 shown in FIG. 9. The other process portion 3708 shown in FIG. 37 is contained in part of the VU 901, the CBU 904, the CU 902, and the BU 903 and part of the AU 905 shown in FIG. 9.

In the fourth preferred embodiment, when the busy register read access determination circuit 3701 (see FIG. 37) has determined an occurrence of a read access to the busy register, it performs the following control sequence. First, the determination circuit 3701 sets each value of the control signals CNT-1, CNT-2, and CNT-3 to "0". Thus, the 64-bit 2-to-1 selector 3703 selects either store data or normal slave read data received from the other process portion 3708 according to a control signal received from the data output control circuit (not shown). In addition, since the value of the control signal CNT-1 is "0", the one-bit 2-to-1 selector 3702 selects the least significant bit of the output of the 64-bit 2-to-1 selector 3703. Moreover, the 64-bit output latch 3704 latches the store data or the normal slave read data received from the 64-bit 2-to-1 selector 3703 according to a control signal received from the data output control circuit (not shown). The three-state buffer 3705 receives the store data or the normal slave read data received from the 64-bit output latch 3704 according to a control signal received from the data output control circuit (not shown). Thus, the store data or the normal slave read data as output data DATA(O) is sent to the processor data bus 803.

On the other hand, when the busy register read access determination circuit 3701 has determined an occurrence of a read access of the busy register, it performs the following control sequence in a TSE cycle following a TSS cycle (see FIG. 5). First, the determination circuit 3701 controls the one-bit 2-to-1 selector 3702 by using the control signal CNT-1 so that the selector 3702 selects a BSY bit value received from the BSY bit generation circuit 3706. The determination circuit 3701 controls the least significant bit of the 64-bit output latch 3704 by using the control signal CNT-2 so that only the least significant bit of the latch 3704 latches the BSY bit value received from the one-bit 2-to-1 selector 3702. Thus, the high order 63 bits of the 64-bit output latch 3704 do not latch the BSY bit value. The determination circuit 2601 controls the three-state buffer 2606 by using the control signal CNT-3 so that the buffer 3602 stores the output of the 64-bit output latch 3704. Thus, the value of the busy register as output data DATA(O) is sent to the processor data bus 803.

According to the fourth preferred embodiment, a function similar to the third preferred embodiment can be accomplished.

Fifth Preferred Embodiment

Next, the fifth preferred embodiment according to the basic construction shown in FIG. 8 will be described.

As with the first preferred embodiment, in the fifth preferred embodiment, a microprocessor according to the slave processor 802 shown in FIG. 8 is a data processing apparatus which executes for example a vector operation. In this preferred embodiment, a construction with which the fourth problem of the related art reference can be solved is disclosed.

The microprocessor according to the slave processor 802 in the fifth preferred embodiment (this microprocessor is referred to as the MPU) can be connected to a microprocessor according to the external CPU 801 (hereinafter, this microprocessor is referred to as the CPU) in so-called "co-processor mode" or "slave mode".

The "co-processor mode" is an operation mode of the MPU which is connected to the following terminals or has the following function.

1. Bus start terminal BS# for which a bus access start request is sent to the MPU.
2. Bus access type signal terminal BAT for which a bus access type is sent to the MPU.
3. The function for which the ID (CPID) of the MPU is outputted as an output address, and
4. Co-processor status signal terminal CPST for which a status signal is received from the MPU.

On the other hand, the "slave mode" is an operation mode of the MPU.

A prefix "#" added to a signal name or a terminal name represents that the relevant signal is a negative logic signal.

Figure 38:
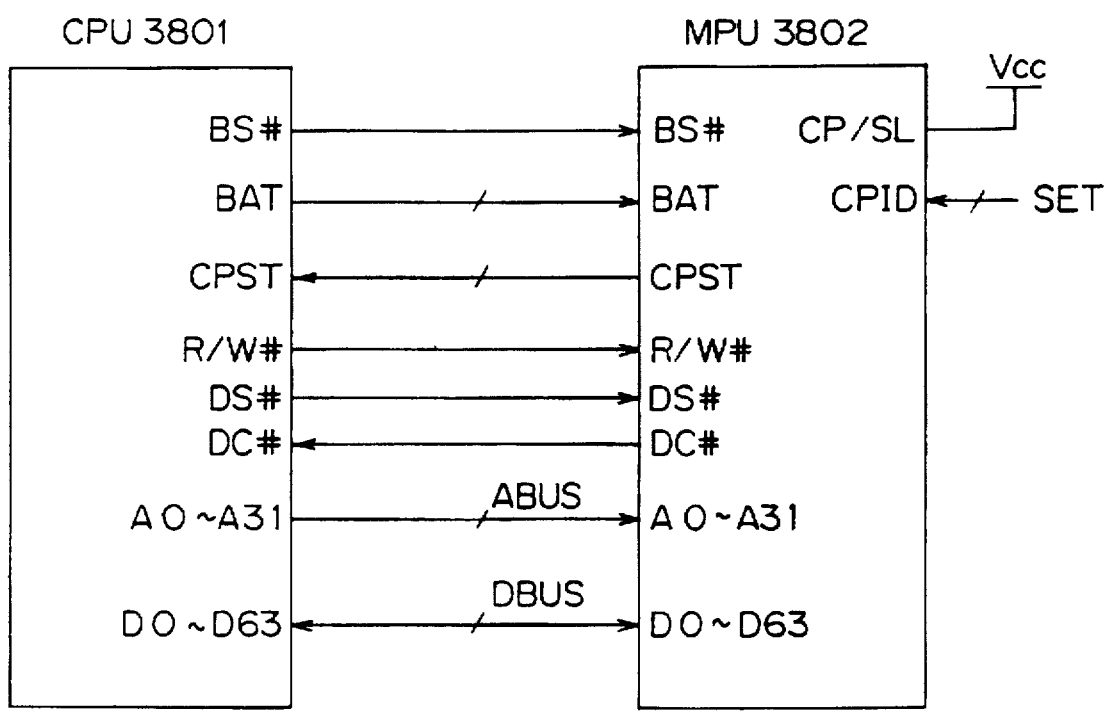
FIG. 38 is a schematic diagram showing connections between a CPU and an MPU in a co-processor mode according to the fifth preferred embodiment.

FIG. 38 is a schematic diagram showing connections between the MPU and the CPU where the MPU operates in the co-processor mode.

The CPU 3801 accords with the CPU 801 shown in FIG. 8. The MPU 3802 accords with the slave processor 802 shown in FIG. 8. In the fifth preferred embodiment, since there are two terms "co-processor mode" and "slave mode", to prevent confusion, the term "slave processor" denoted by reference numeral 802 of FIG. 8 is not used in this description.

When the MPU 3802 operates in the co-processor mode, a high level voltage Vcc is applied to a mode set terminal CP/SL.

In the co-processor mode, the CPU 3801 and the MPU 3802 can directly connect corresponding signal terminals with each other.

As signal terminals, as well as the bus start signal terminal BS# (hereinafter referred to as the BS# terminal), the bus access type signal terminal BAT (hereinafter referred to as the BAT terminal), the ID address terminal CPID (hereinafter referred to as the CPID terminal), the co-processor status signal terminal CPST (hereinafter referred to as the CPST terminal), and the mode set terminal CP/SL as described above, there are also provided a read/write signal terminal R/W# (hereinafter referred to as the R/W# terminal) which distinguishes a read cycle or a write cycle, a data strobe signal terminal DS# (hereinafter referred to as the DS# terminal) which represents that data on the data bus DBUS has a valid value, a data complete signal terminal DC# (hereinafter referred to as the DC# terminal) which represents that the MPU 3802 has completely received data, address terminals A0 to A32 of a 32-bit address bus ABUS, and data terminals D0 to D63 of a 64-bit data bus DBUS. Each terminal inputs or outputs a signal with the same name as the terminal name.

The data bus DBUS accords with the processor bus 803 shown in FIG. 8. The address bus ABUS accords with the processor address bus ABUS shown in FIG. 8.

Figure 39:
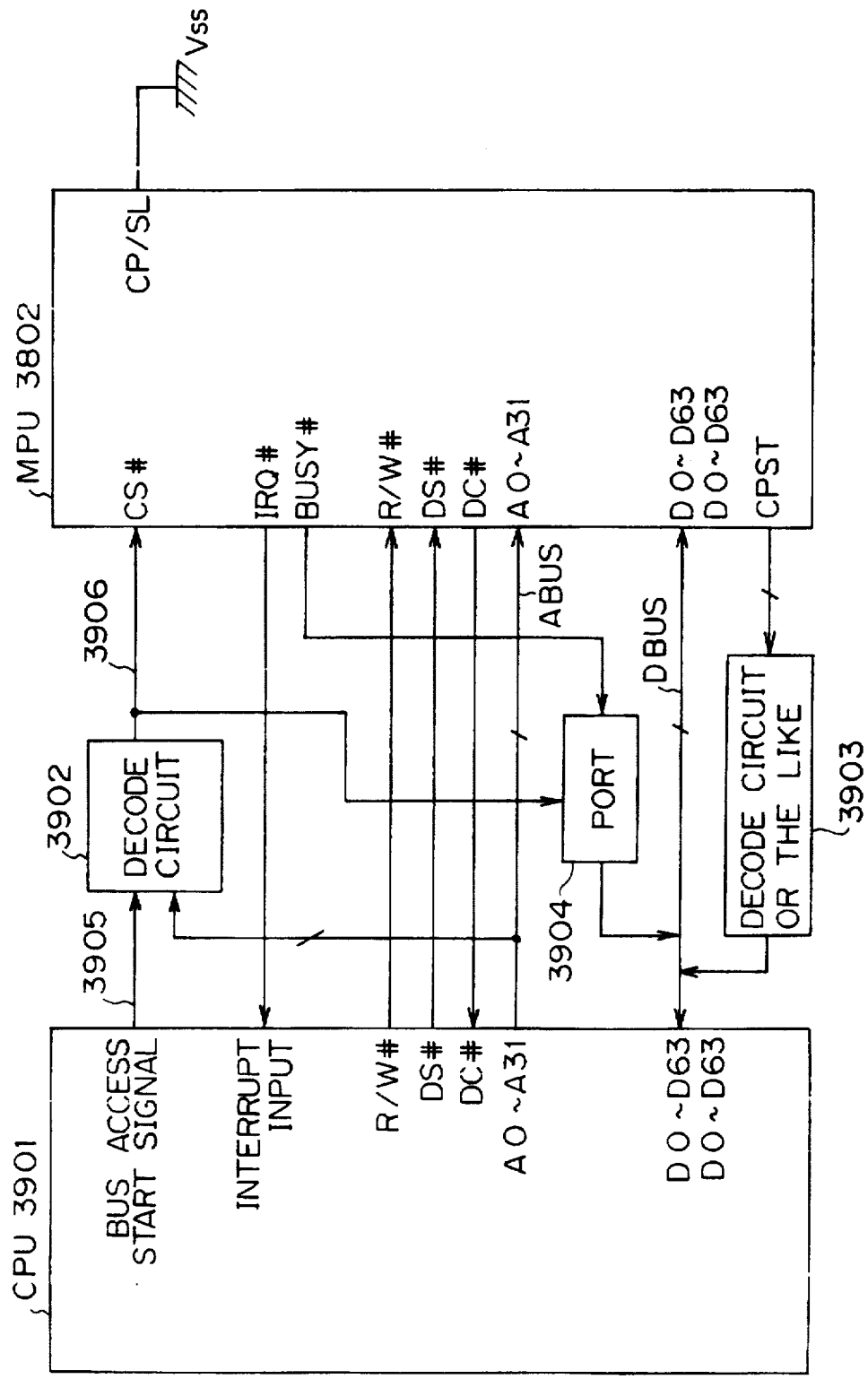
FIG. 39 is a schematic diagram showing connections between a CPU and an MPU in the slave mode according to the fifth preferred embodiment.

FIG. 39 is a schematic diagram showing connections between the MPU and the CPU where the MPU operates in the slave mode.

The CPU 3901 accords with the CPU 801 shown in FIG. 8.

In the slave mode, a small number of adapter circuits such as decode circuits 3902 and 3903 and an external port 3904 are used so as to connect the CPU 3901 and the MPU 3802.

When the MPU 3802 operates in the slave mode, a ground level voltage is applied to the mode set terminal CP/SL.

A signal 3906 where address signals of the address terminals A0 to A31 of the CPU 3901 and a bus access start signal 3905 of the CPU 3901 are decoded by a decode circuit 3902, is sent to a chip select terminal CS# (hereinafter referred to as the CS# terminal) disposed in the MPU 3802.

When the MPU 3802 starts executing, for example, a vector operation, it causes a busy signal BUSY# (hereinafter referred to as the BUSY# signal) which is sent to a busy signal terminal BUSY# (hereinafter referred to as the BUSY# terminal) to become active and informs the CPU 3901 that the MPU 3802 is in the busy status.

Since the CPU 3901 can poll the BUSY# signal from the external port 3904 through the data bus DBUS at any time, it can determine whether the MPU 3802 is in the busy status. However, since the busy status can be determined by accessing a busy register 4006 which will be described later, the construction where the BUSY# signal is polled by the external port 3905 is not always required. In this case, the number of adapter circuits which connect the CPU 3901 and the MPU 3802 in the slave mode can be reduced.

The CPU 3901 reads the CPST signal from an external circuit such as the decode circuit 3903 through the data bus DBUS, and it can determine other status of the MPU 3802 as well as the busy status thereof.

An interrupt terminal IRQ# (hereinafter referred to as the IRQ# terminal) of the MPU 3802 is connected to an interrupt input terminal of the CPU 3901.

Figure 40:
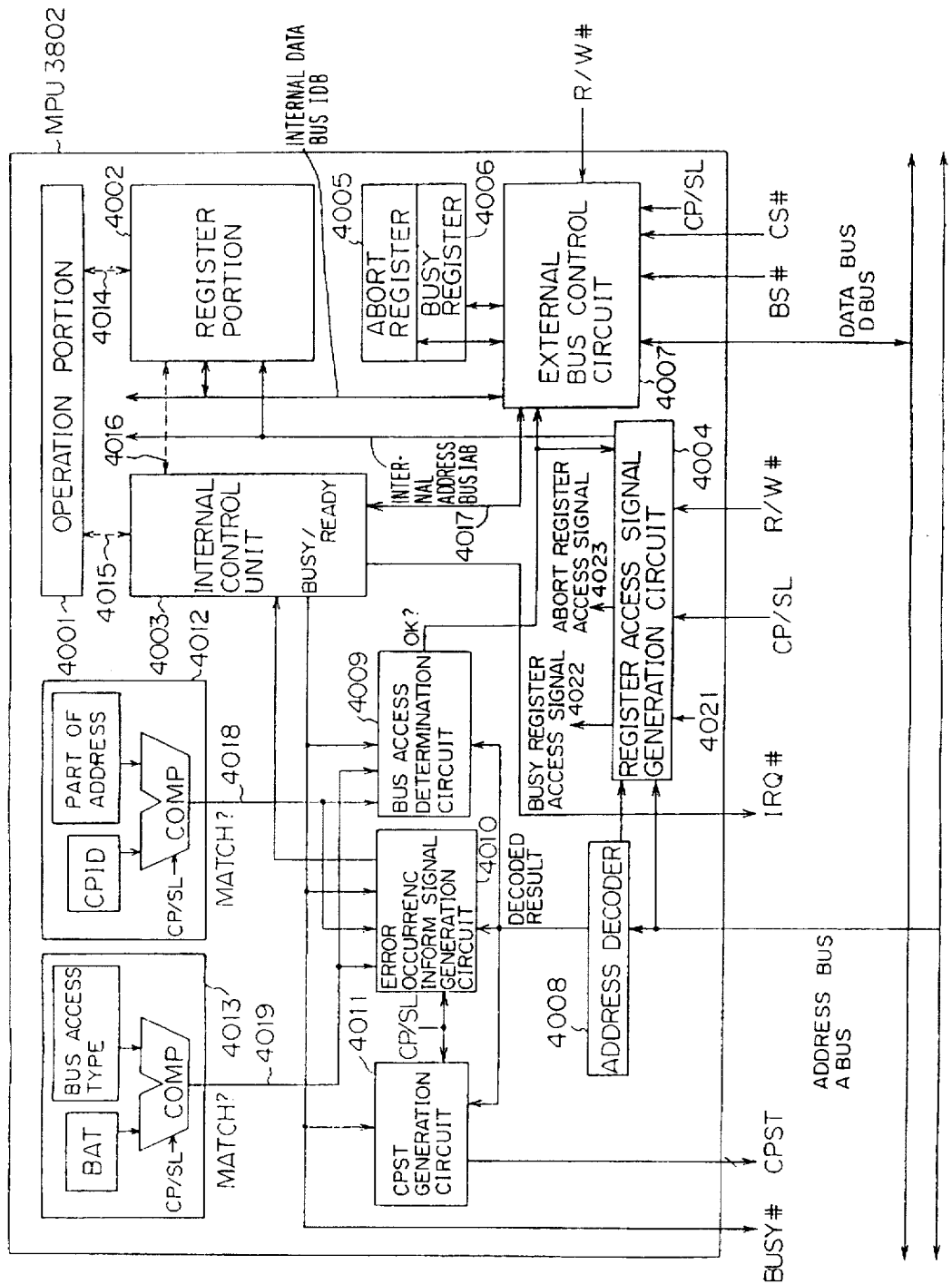
FIG. 40 is a schematic diagram showing the construction of the MPU of the fifth preferred embodiment.

FIG. 40 is a block diagram showing the construction of the MPU 3802 used in the fifth preferred embodiment.

In the figure, the MPU 3802 includes an operation portion 4001 which executes, for example, a vector operation, a register portion 4002, an internal control circuit 4003, a register access signal generation circuit 4004, an abort register 4005, a busy register 4006, an external bus control circuit 4007, an address decoder 4008, a bus access determination circuit 4009, an error occurrence inform signal generation circuit 4010, a co-processor status generation circuit 4011, and comparison circuits 4012 and 4013.

When the MPU 3802 shown in FIG. 40 according to the slave processor 802 shown in FIG. 8 is a vector data processor which is the same as that of the first preferred embodiment, the basic construction of the MPU 3802 shown in FIG. 40 is the same as that of the first preferred embodiment shown in FIG. 9. In this case, the operation portion 4001 shown in FIG. 40 accords with the VU 901 shown in FIG. 9. The register portion 4002 shown in FIG. 40 is contained in the CU 902 and so forth shown in FIG. 9. The internal control circuit 4003 shown in FIG. 40 accords with the CU 902 and the CBU 904 shown in FIG. 9. The abort register 4005, the busy register 4006, and the external bus control circuit 4007 shown in FIG. 40 are contained in the BU 903 shown in FIG. 9. The circuits 4004, and 4008 to 4013 shown in FIG. 40 are contained in the AU 905 shown in FIG. 9. The internal data bus IDB shown in FIG. 40 accords with the chip data bus 906 and the load/store data bus 908 shown in FIG. 9. The internal address bus IAB shown in FIG. 40 accords with the chip address bus 907 shown in FIG. 9.

Figure 41:
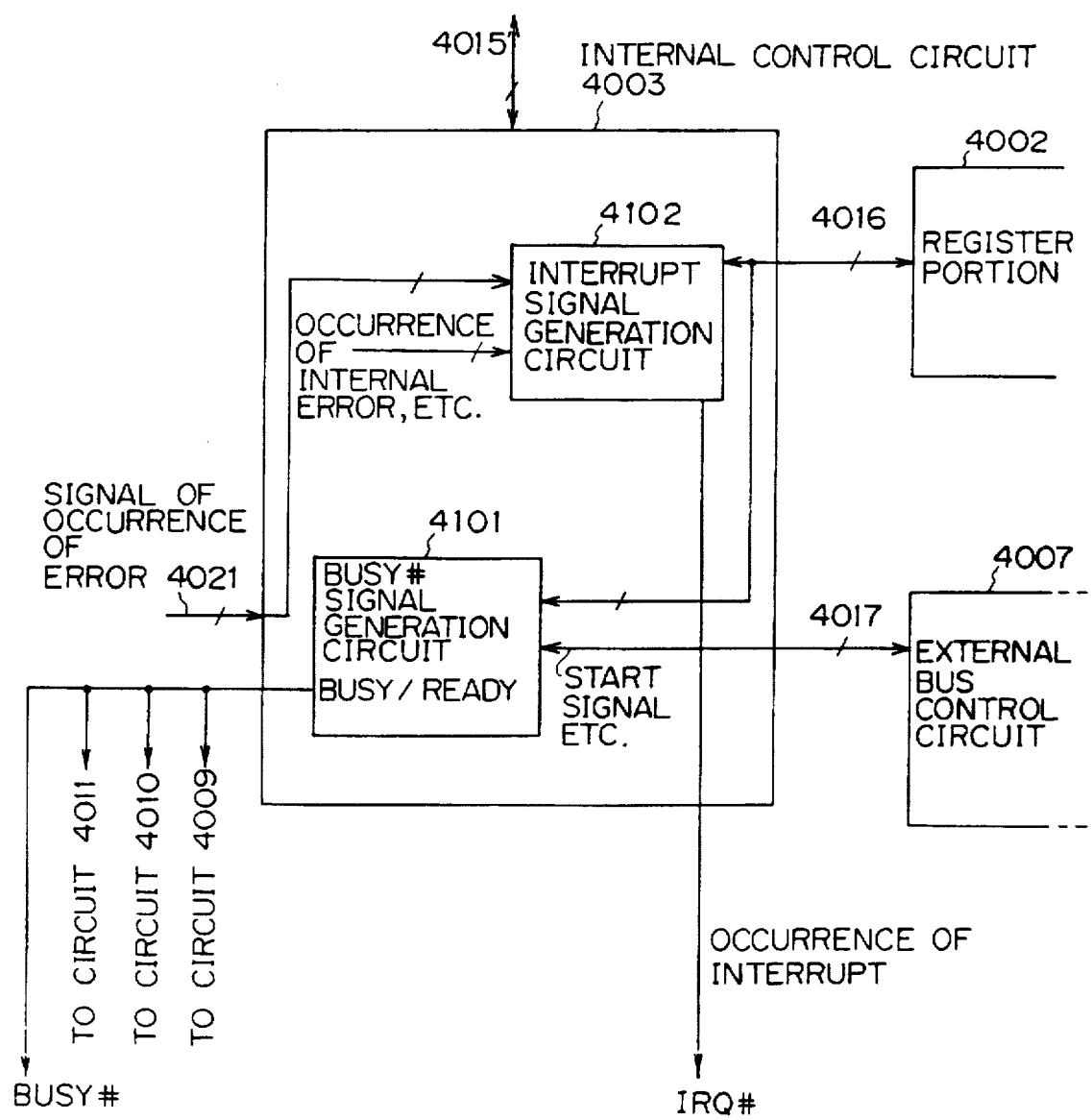
FIG. 41 is a schematic diagram showing the construction of the internal control circuit 4003 of FIG. 40.
Figure 43A:
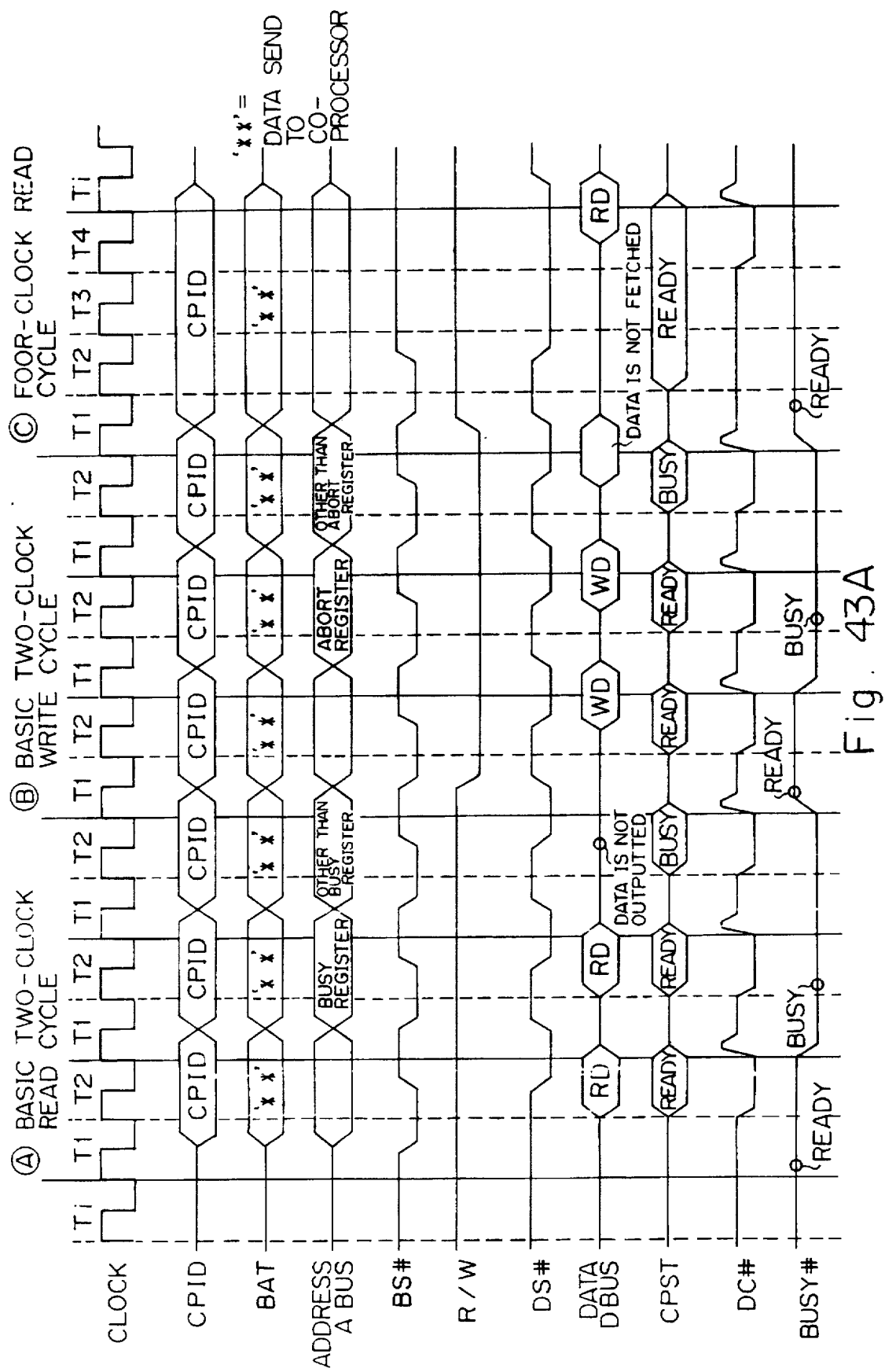
FIGS. 43A to 43D are an operational timing chart in the co-processor mode according to the fifth preferred embodiment.
Figure 43B:
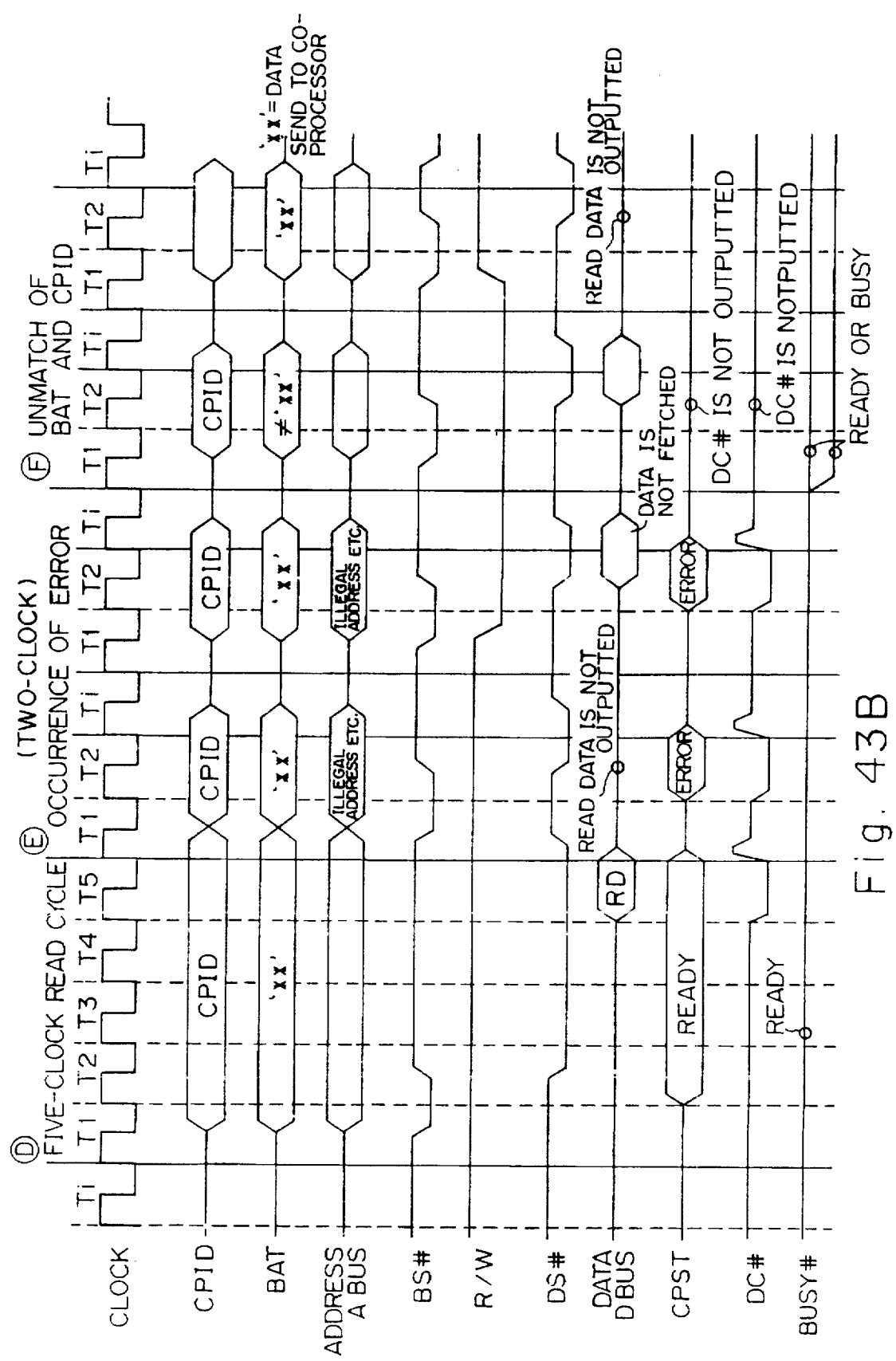
Figure 43C:
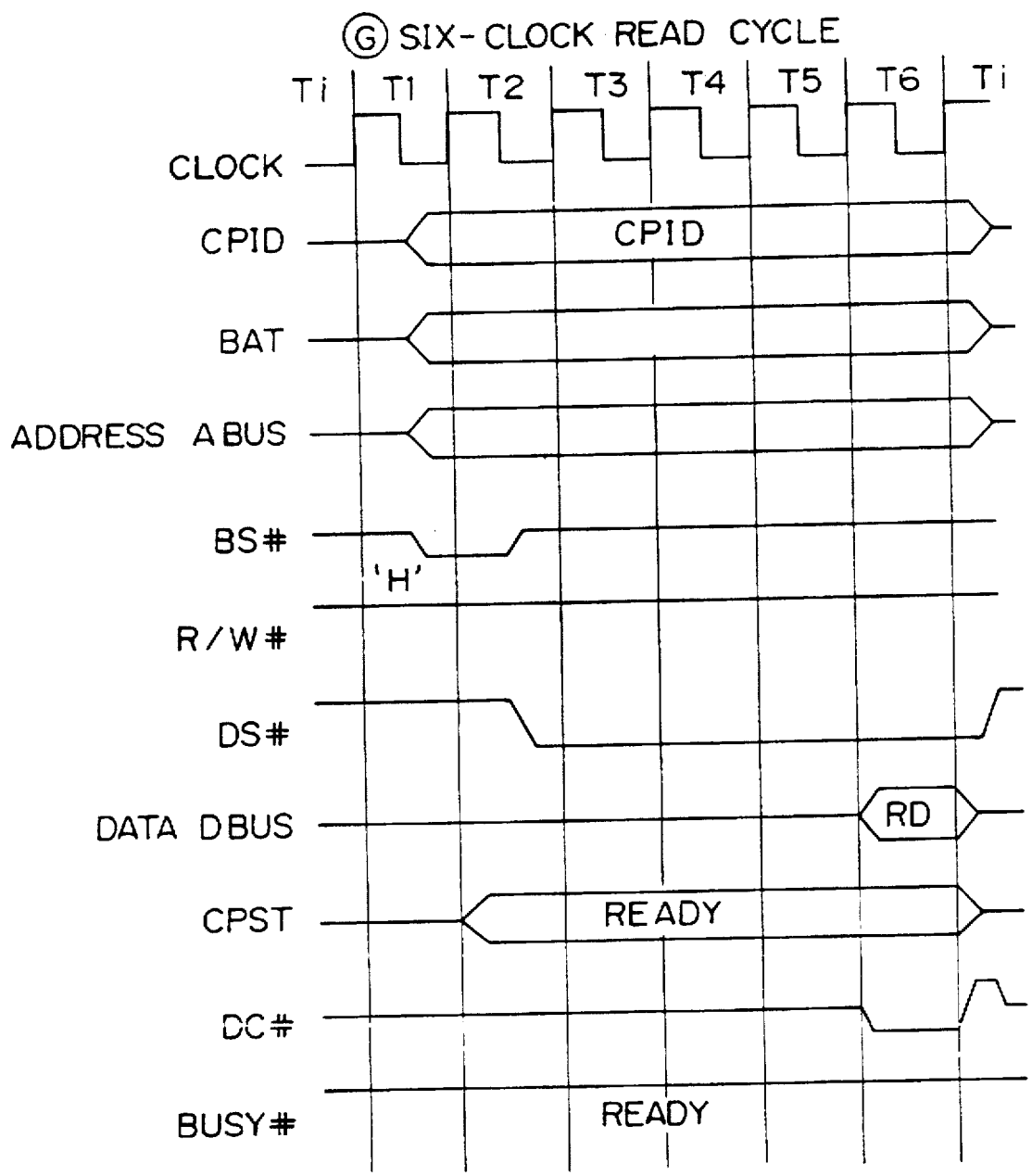
Figure 43D:
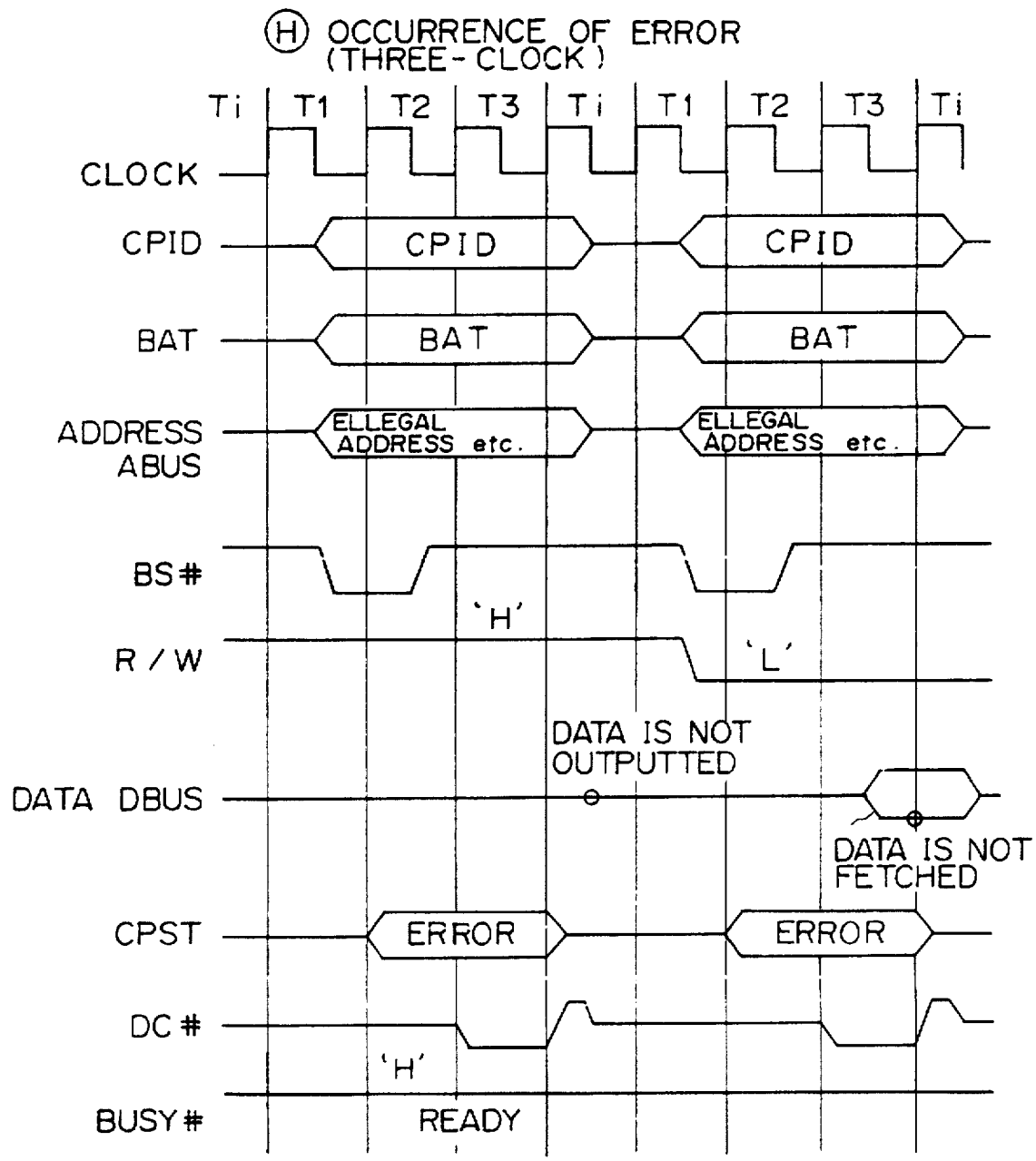
Figure 44A:
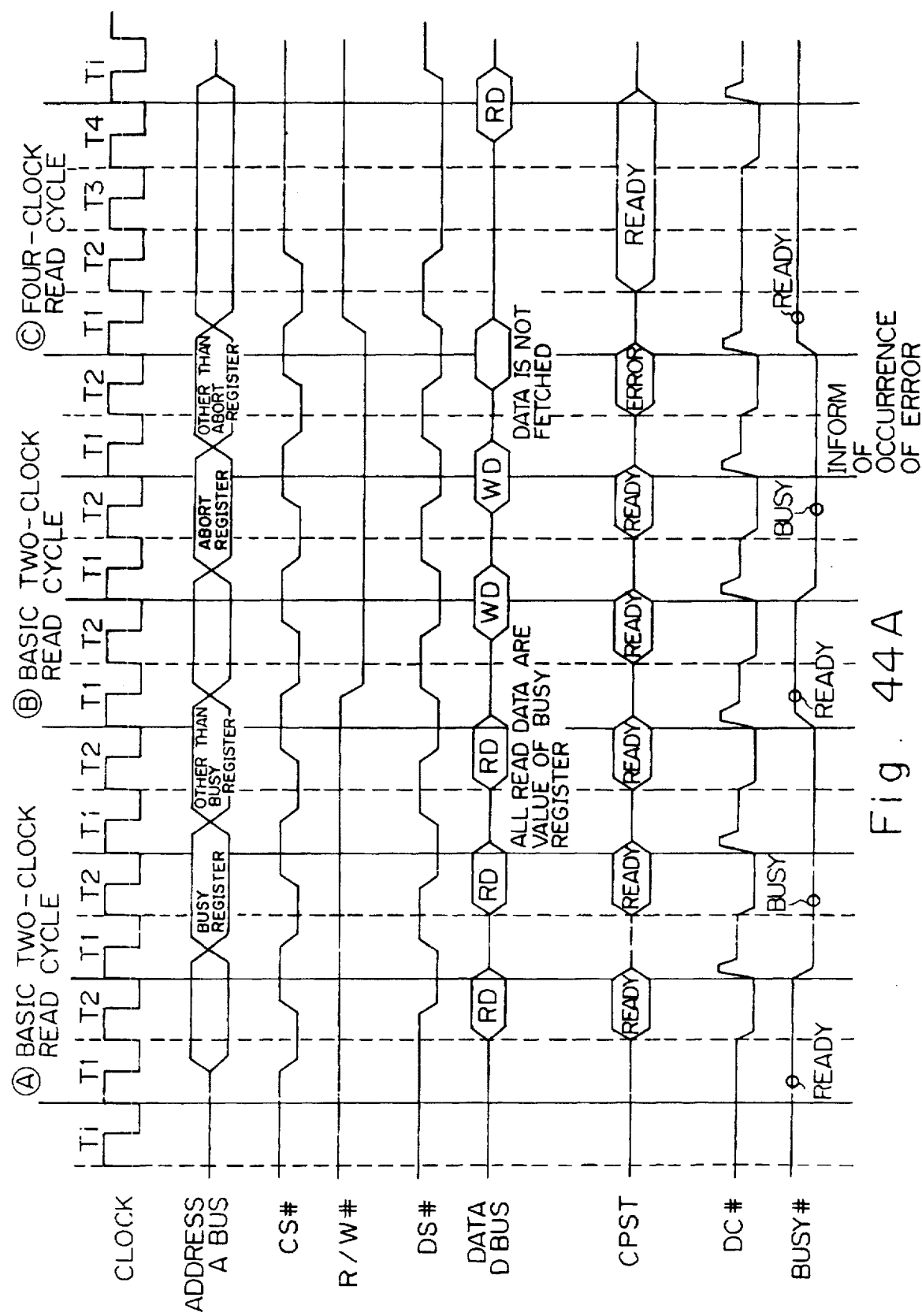
FIGS. 44A to 44D to are another operational timing chart in the co-processor mode according to the fifth preferred embodiment.
Figure 44B:
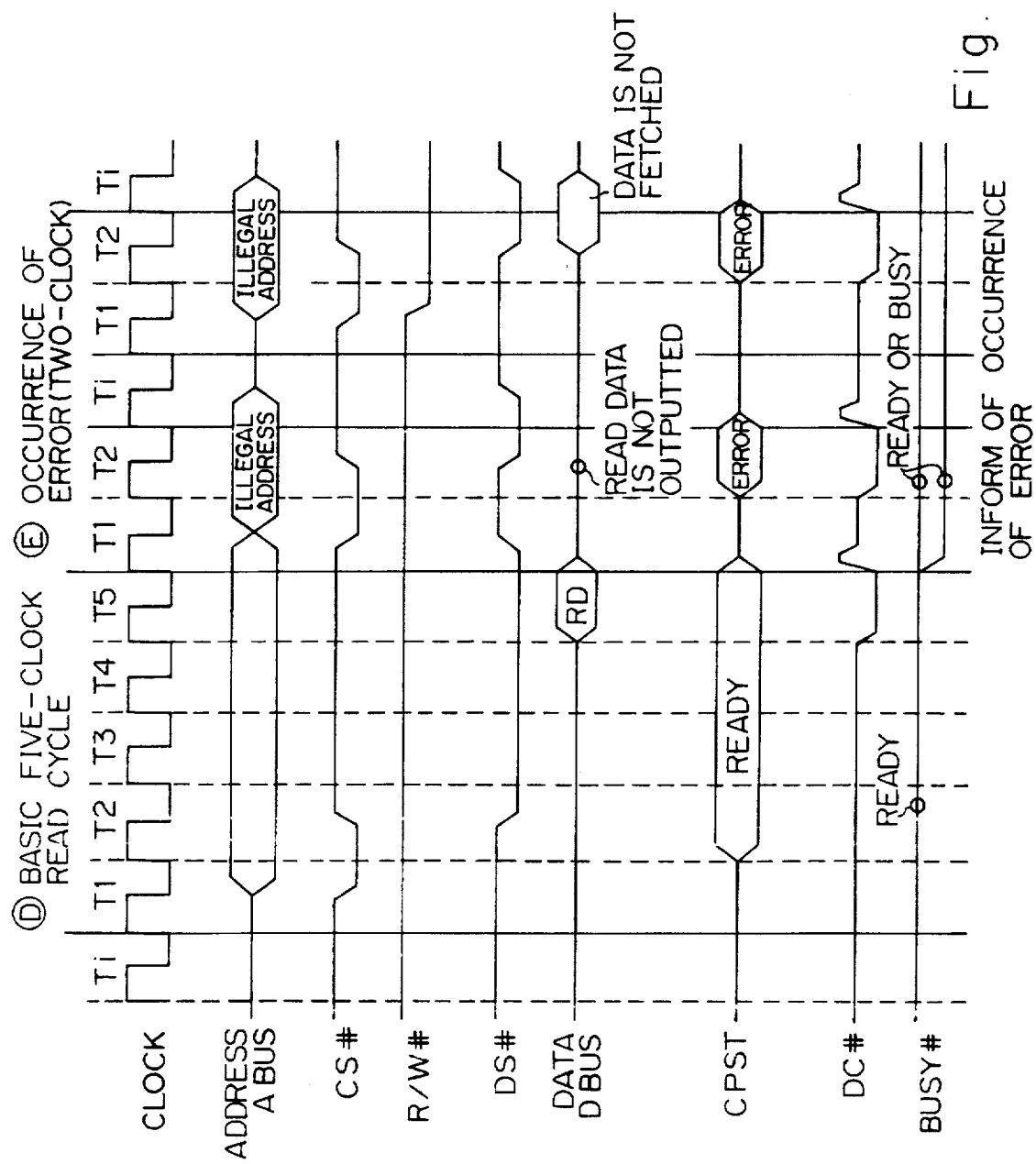
Figure 44C:
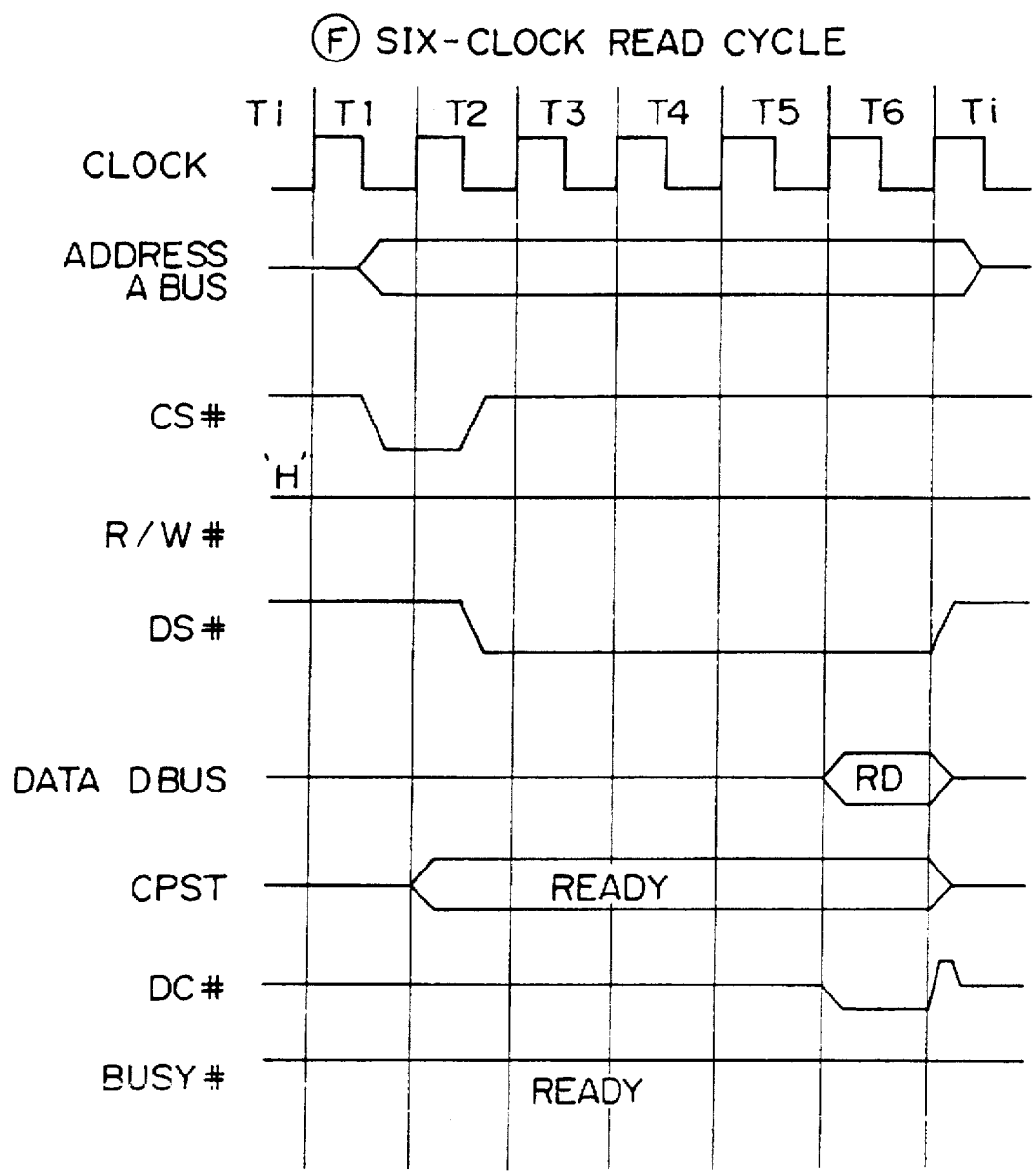
Figure 44D:
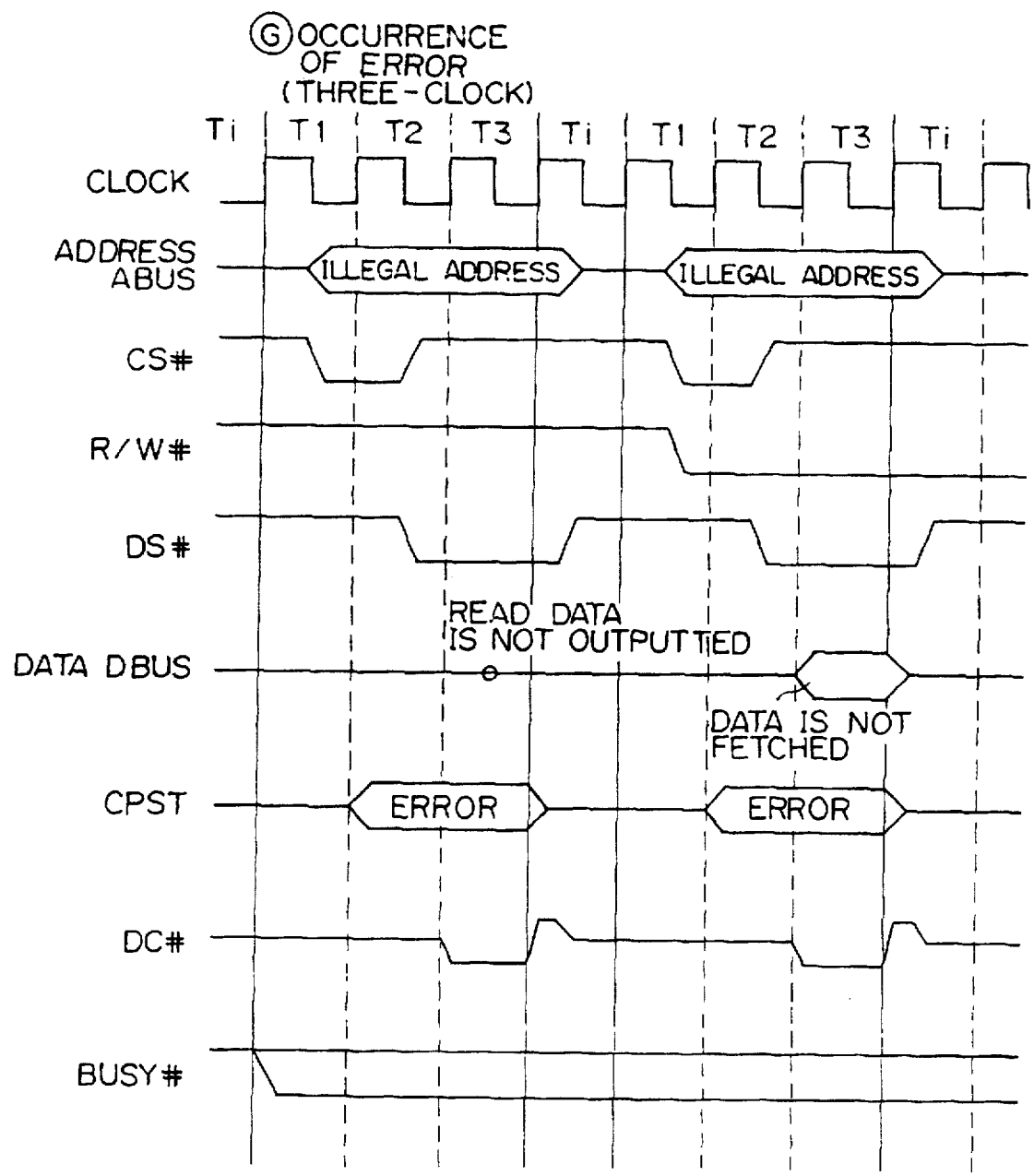

FIG. 41 is a circuit diagram showing the construction of the internal control circuit 4003 of FIG. 40. The internal control circuit 4003 comprises an interrupt signal generation circuit 4102 and a BUSY# signal generation circuit 4101. The interrupt signal generation circuit 4102 causes the MPU 3802 to send the IRQ# signal to the CPU 3901 (see FIG. 39) in the slave mode. The BUSY# signal generation circuit 4101 generates the BUSY# signal.

Next, the operation of the fifth preferred embodiment with the above-mentioned construction will be described.

The MPU 3802 causes the address decoder 4008 to decode the address signals A0 to A31 received from the CPU 3801 (in the co-processor mode shown in FIG. 38) or the CPU 3901 (in the slave mode shown in FIG. 39). When the MPU 3802 has determined that the bus start signal BS# (see FIG. 38) or the chip select signal CS# (see FIG. 39) received from the CPU 3801 or the CPU 3901 is active, it immediately starts a bus cycle. Thus, the co-processor operation and the slave mode operation can be performed at high speed.

In the co-process mode, the comparison circuit 4012 compares the ID signal CPID received as part of the address signals A0 to A31 from the CPU 3801 with the ID CPID of the MPU 3802. When they do not match, the comparison circuit 4012 informs the bus access determination circuit 4009 of the mismatch by using a signal 4018. Thus, the bus access determination circuit 4009 knows that the MPU 3802 has not been selected.

In the co-processor mode, the comparison circuit 4013 compares the bus access type signal BAT received from the CPU 3801 with the bus access type BAT which has been set in the MPU 3802. When they do not match, the comparison circuit 4013 informs the bus access determination circuit 4009 of the mismatch by using a signal 4019. Thus, the bus access determination circuit 4009 knows that the bus access type which has been set in the MPU 3802 does not match the bus access type designated by the CPU 3801.

When any of the above-mentioned information is sent to the bus access determination circuit 4009, a signal 4020 is sent to the external bus control circuit 4007. Thus, even if the external bus control circuit 4007 has determined that the bus start signal BS# received from the CPU 3801 is active, it does not execute the bus cycle.

When the CPU 3801 (see FIG. 38) or the CPU 3901 (see FIG. 39) commands the MPU 3802 to start, the external bus control circuit 4007 sends the signal 4017 to the BUSY# signal generation circuit 4101 (see FIG. 41) of the internal control circuit 4003. Thus, the BUSY#signal generation circuit 4101 so as to cause the BUSY# signal to become active, sets the busy register 4006 connected to the external bus control circuit 4007 by using the signal 4017. As a result, the status of the MPU 3802 is changed from the ready status to the busy status.

In the above basic operation, when the CPU 3801 or the CPU 3901 accesses the MPU 3802, the MPU 3802 sends to the CPU 3801 or the CPU 3901, the response as one of cases 1 to 8 shown in FIG. 42. These cases 1 to 8 will be described in the following.

(Case 1)

First, when the internal control circuit 4003 causes the busy signal BUSY#to become active in the co-processor mode and the CPU 3801 performs a read access to the MPU 3802 other than a read access to the busy register 4006, the MPU 3802 executes the following response operation.

When the decoded result of the address decoder 4008 is sent to the bus access determination circuit 4009, the bus access determination circuit 4009 informs the register access signal generation circuit 4004 and the external bus control circuit 4007 that the bus access is invalid by using the signal 4020. Thus, the register access signal generation circuit 4004 does not access the register and the external bus control circuit 4007 does not output to the data bus DBUS data accessed.

The co-processor status generation circuit 4011 generates the CPST signal representing the busy status according to the BUSY# signal and outputs the CPST signal to the CPST terminal.

The CPU 3801 can know that the MPU 3802 is in the busy status by means of the CPST signal.

The busy register 4006 is a register which stores the BUSY# signal representing whether or not the MPU 3802 is busy. Thus, the CPU 3801 can determine whether or not the MPU 3802 is busy. Even if the MPU 3802 is active, the CPU 3801 can access the busy register 4006 at any time.

(Case 2)

When the internal control circuit 4003 causes the busy signal BUSY# to become active in the co-processor mode and the CPU 3801 performs a write access to the MPU 3802 other than a write access to the abort register 4005, the MPU 3802 executes the following response operation.

As in case 1, the bus access determination circuit 4009 informs the register access signal generation circuit 4004 and the external bus control circuit 4007 that the bus access is invalid by using the signal 4020. Thus, the external bus control circuit 4007 does not read data accessed from the data bus DBUS. The register access signal generation circuit 4004 does not access the register. As a result, while the MPU 3802 is active, the content of the register and so forth, of the register portion 4002 is not changed.

In addition, as in case 1, the co-processor status generation circuit 4011 generates the CPST signal representing the busy status according to the BUSY# signal and sends the CPST signal to the CPST terminal.

The CPU 3801 can know that the MPU 3802 is in the busy status by means of the CPST signal.

The abort register 4005 is a register which sets information for which an operation of the MPU 3802 is forced to terminate. Even while the MPU 3802 is active, the CPU 3801 can access the abort register 4005 at any time.

(Case 3)

When the internal control circuit 4003 causes the busy signal BUSY# to become active in the slave mode and the CPU 3901 performs a read access to the MPU 3802, the MPU 3802 executes the following response operation.

The decoded result of the address decoder 4008 is sent to the bus access determination circuit 4009 and the register access signal generation circuit 4004.

Thus, the bus access determination circuit 4009 informs the register access signal generation circuit 4004 and the external bus control circuit 4007 that the bus access is valid by using the signal 4020.

Even if the CPU 3901 accesses any register, the register access signal generation circuit 4004 generates a busy register access signal 4022 for which the busy register 4006 is accessed.

Thus, the external bus control circuit 4007 sends, to the data bus DBUS, the busy signal stored in the busy register 4006.

Since the CPU 3901 can determine the content of the data bus DBUS when it performs such an access operation, it can know that the MPU 3802 is in the busy status.

The co-processor status generation circuit 4011 generates the CPST signal representing that the busy register 4006 has been accessed and sends the signal to the CPST terminal.

After the CPU 3901 has determined that the busy signal has been sent to the data bus DBUS, it receives the CPST signal representing the ready status from the decode circuit 3903 through the data bus DBUS. Thus, the CPU 3901 knows that the busy register 4006 has been accessed.

(Case 4)

When the internal control circuit 4003 causes the busy signal BUSY# to become active in the slave mode and the CPU 3901 performs a write access to the MPU 3802 other than a write access to the abort register 4005, the MPU 3802 executes the following response operation.

In this case, like in the case 2 of the co-processor mode, the bus access determination circuit 4009 informs the register access signal generation circuit 4004 and the external bus control circuit 4007 that the bus access is invalid by using the signal 4020. Thus, the external bus control circuit 4007 does not receive data being accessed from the data bus DBUS and the register access signal generation circuit 4004 does not access the register. As a result, while the MPU 3802 is active, the contents of the registers of the register portion 4002 are not changed.

The difference between the operation in the slave mode and that in the co-processor mode is in that a write access to a register other than the abort register 4005 in the busy status causes the MPU 3802 to be in an error condition.

In other words, the error occurrence inform signal generation circuit 4010 sends an error occurrence signal 4021 to the internal control circuit 4003 according to the decoded result of the address decoder 4008.

Thus, the interrupt signal generation circuit 4102 of the internal control circuit 4003 (see FIG. 41) sends the interrupt signal IRQ# to the IRQ# terminal. When the IRQ# signal takes place, the MPU 3802 stops its operation. However, only the co-processor status generation circuit 4011 generates the CPST signal representing an occurrence of an error and sends it to the CPST terminal.

When the CPU 3901 detects an interrupt by the IRQ# and the CPST signal received from the decode circuit 3903 through the data bus DBUS, it can know that an access error takes place.

(Case 5)

When an invalid address not designated for the MPU 3802 is received or a privilege violation such as an access to a privileged register at an inaccessible level (user level) takes place, the decoded result of the address decoder 4008 is sent to the bus access determination circuit 4009.

Thus, the bus access determination circuit 4009 informs the register access signal generation circuit 4004 and the external bus control circuit 4007 that the bus access is invalid by using the signal 4020. As a result, the register access signal generation circuit 4004 does not access the register and the external bus control circuit 4007 does not access the data bus DBUS.

When the MPU 3802 operates in the co-processor mode and the MPU 3802 is busy, if an access with respect to an invalid address or a privilege violation takes place, a busy response rather than an error response takes place. In other words, the co-processor status generation circuit 4011 generates the CPST signal representing the busy status according to the BUSY# signal and sends the CPST signal to the CPST terminal.

(Case 6)

As in case 4, when the MPU 3802 operates in the co-processor mode and the MPU 3802 is in the ready status, if an access with respect to an invalid address or a privilege violation takes place, the coprocessor status generation circuit 4011 generates the CPST signal representing that an error is taking place and sends the CPST signal to the CPST terminal.

The CPU 3801 detects the CPST signal received from the decode circuit 3903 through the data bus DBUS and knows whether or not an access error has occurred.

However, in this case, the error occurrence inform signal generation circuit 4010 does not output an error occurrence signal 4021 and thereby the interrupt signal generation circuit 4102 of the internal control circuit 4003 (see FIG. 41) does not generate the IRQ# signal. Thus, the operation of the MPU 3802 does not stop.

(Cases 7 and 8)

As in case 4, when the MPU 3802 operates in the slave mode, even if an access with respect to an invalid address or a privilege violation takes place, the access causes the MPU 3802 to be in an error condition regardless of the status of the MPU 3802.

In other words, the error occurrence inform signal generation circuit 4010 sends the error occurrence signal 4021 to the internal control circuit 4003 according to the decoded result of the address decoder 4008.

As a result, the interrupt signal generation circuit 4102 of the internal control circuit 4003 (see FIG. 41) sends the interrupt signal IRQ# to the IRQ# terminal. When the IRQ# signal takes place, the MPU 3802 stops its operation. However, only the co-processor status generation circuit 4011 operates. This circuit generates the CPST signal representing that an error is taking place and sends this signal to the CPST terminal.

The CPU 3901 determines an occurrence of an interrupt by the IRQ# signal and the CPST signal received from the decode circuit 3903 through the data bus DBUS and knows whether or not an access error has occurred.

The bus access operation in the co-processor mode and the slave mode according to the above cases 1 to 8 will be described with reference to operational timing charts of FIGS. 43A to 43D and 44A to 44D.

FIGS. 43A to 43D are timing charts of a bus access operation in the co-processor mode. These figures show operations of A: basic two-clock read cycle, B: basic two-clock write cycle, C: four-clock read cycle, D: five-clock read cycle, six-clock read cycle E: operation upon occurrence of error (two-clock), F: operation upon mismatch of bus access type BAT and ID address CPID of MPU 3802, G: six-clock read cycle, and H: operation upon occurrence of error (three-clock)

In the co-processor mode, the MPU 3802 determines that the CPU 3801 has caused the bus cycle start signal BS# to become active. When the MPU 3802 has determined that the bus start signal BS# is active, it starts a data send bus cycle.

At this point, the comparison circuit 4012 compares the ID signal CPID received as part of address signals A0 to A31 from the CPU 3801 with the ID CPID of the MPU 3802. When they do not match, the MPU 3802 knows that it has not been selected and does not execute the bus cycle. When they match, the MPU 3802 knows that it has been selected and executes the bus cycle. In addition, the comparison circuit 4013 compares the bus access type signal BAT received from the CPU 3801 with the bus access type BAT being set in the MPU 3802. When they do not match, the MPU 3802 does not execute the bus cycle. When they match, the MPU 3802 executes the bus cycle.

With reference to the timing charts of FIGS. 43A to 43D, it can be easily understood that the operations according to the cases 1, 2 (A and B of FIG. 43A, etc.) and the case 6 (E of FIG. 43B, etc.) are accomplished.

FIGS. 44A to 44D are timing charts of bus access operations in the slave mode. These figures show operations of A: basic two-clock read cycle, B: basic two-clock write cycle; C: four-clock read cycle, D: five-clock read cycle and E: operation of occurrence of error (two-clock), F: six-clock read cycle, and G: operation upon occurrence of error (three-clock).

In the slave mode, when the chip select CS# is active, the MPU 3802 knows that it has been selected and executes the bus cycle.

With reference to the timing charts of FIGS. 44A to 44D, it can be easily understood that the operations according to the cases 3 and 4 (A and B of FIG. 44A, etc.) and cases 7 and 8 (E of FIG. 44D etc.) are accomplished.

Although the present invention has been shown and described with respect to a best mode embodiment thereof, it should be understood by those skilled in the art that the foregoing and various other changes, omissions, and additions in the form and details thereof may be made therein without departing from the spirit and scope of the present invention.

What is claimed is:

1. A data processing apparatus for executing a selected operation, said selected operation being one of a vector operation and a scalar operation, said data processing apparatus comprising:

scalar data storage means for storing scalar data used for said scalar operation;

vector length storage means for storing vector length data, said vector length data representing a number of vector data elements used for said vector operation;

command storage means for storing at least one command and, if determined to be necessary, operand data used for said command, said command including a command for causing said selected operation to be executed; and process execution means for executing said vector and scalar operations in parallel and for successively executing said command stored in said command storage means in a pipeline process, said process execution means being adapted to execute a data move command during the execution of commands used for said vector operation and said scalar operation to move data between any two of said command storage means, said vector length storage means, and said scalar storage means.

2. The data processing means as set forth in claim 1, wherein said process execution means executes said data move command so as to move said vector length data as the result of said scalar operation stored in said scalar data storage means to said vector length storage means.

3. The data processing means as set forth in claim 1, wherein said process execution means executes said data move command so as to move said operand data stored in said command storage means to said vector length storage means.

4. The data processing means as set forth in claim 1, wherein said process execution means executes said data move command so as to move said operand data stored in said command storage means to said scalar data storage means.

5. A data processing apparatus connected to a central processing unit for executing a selected operation, said selected operation being one of a vector and a scalar operation, said data processing apparatus being controlled by said central processing unit, said data processing apparatus comprising:

scalar data storage means for storing scalar data used for said scalar operation;

vector length storage means for storing vector length data, said vector length data representing a number of vector data elements used for said vector operation;

command storage means for storing at least one command and, if determined to be necessary, operand data used for said command, said command including a command for causing said selected operation to be executed, said command and said operand being preloaded from a central processing storage unit; and process execution means for executing said vector and scalar operations in parallel and for successively executing said command stored in said command storage means in a pipeline process, said process execution means executing a data move command during the execution of commands used for said vector operation and said scalar operation to move data between any two of said command storage means, said vector length storage means, and said scalar storage means, without intervention of said central processing unit.

6. The data processing means as set forth in claim 5, wherein said process execution means executes said data move command so as to move said vector length data as the result of said scalar operation stored in said scalar data storage means to said vector length storage means.

7. The data processing means as set forth in claim 5, wherein said process execution means executes said data move command so as to move said operand data stored in said command storage means to said vector length storage means.

8. The data processing means as set forth in claim 5, wherein said process execution means executes said data move command so as to move said operand data stored in said command storage means to said scalar data storage means.

9. A data processing apparatus, connected to a central processing unit via an internal bus, for executing a selected operation, said selected operation being one of a vector operation and a scalar operation, said data processing apparatus being controlled by said central processing unit, said data processing apparatus comprising:

scalar data storage means for storing scalar data used for said scalar operation;

vector length storage means for storing vector length data, said vector length data representing a number of vector data elements used for said vector operation;

interface means for directly transmitting said scalar data between said scalar data storage means and the internal bus; and process execution means for performing scalar operations and vector operations in parallel, including moving vector length data, obtained in said scalar data storage means by said scalar operation, from said scalar data storage means to said vector length storage means via the internal bus using said interface means, said data being moved during said vector operation and without returning control to said central processing unit.

10. The data processing apparatus as set forth in claim 9, wherein said process execution means is adapted to execute a data move command without intervention of said central processing unit, while a plurality of commands, used for said selected operation, are being executed so as to move vector length data, obtained by said scalar data storage means as an operation result of said scalar operation, to said vector length storage means.

11. A data processing apparatus, connected to a central processing unit via an internal bus, for executing vector operations and scalar operations under control of the central processing unit, said data processing apparatus comprising:

a vector unit to perform scalar operations and vector operations in parallel, including vector registers to store vector data, vector pipelines to execute instructions controlling the vector operations, and a scalar register to store operands and addresses for the scalar operations performed on the vector data in said vector registers, including vector length data generated by one of the scalar operations;

an interface, coupled to said vector registers, said vector pipelines, said scalar register, and the internal bus, to transfer data therebetween, including directly transmitting the vector data and contents of said scalar register to and from the internal bus; and a control unit to control operation of said data processing apparatus, including a vector length register, coupled to said interface, to store the vector length data representing a number of vector data elements used in at least one of the vector operations, a scoreboard defining states of the control unit, and a pipeline control unit to set the states of the control unit in said scoreboard and to control timing of said vector pipelines and access of the vector data in said vector registers based on the states of the control unit, said control unit controlling movement of the vector length data from said scalar register to said vector length register via said interface, the data being moved during at least one vector operation and without returning control to the central processing unit.

* * * * *

UNITED STATES PATENT AND TRADEMARK OFFICE
CERTIFICATE OF CORRECTION

PATENT NO. : 5,742,842
DATED : April 21, 1998
INVENTOR(S) : Suetake et al.

It is certified that error appears in the above-identified patent and that said Letters Patent is hereby corrected as shown below:

Cover Page, [30], Foreign Application Priority Data,
line 2, "Jan. 28," should be --Jan. 31,--.

[57], ABSTRACT,
line 1, "for executing" should be --executes,--;
"example" should be --example,--;

line 2, "tion" should be --tion. The slave processor--;

line 3, "set" should be --sent--;

line 11, "was" should be --were--.

Col. 13, line 7, "16rows" should be --16 rows--.

Col. 17, line 29, "(VCB) should be --(VCB1)--

Col. 27, line 46, "2345678(h)" should be --12345678(h)--.

Signed and Sealed this

Eleventh Day of August 1998

*Attest:*

BRUCE LEHMAN

*Attesting Officer*  *Commissioner of Patents and Trademarks*